US008862879B2

(12) United States Patent
Lerner

(10) Patent No.: US 8,862,879 B2
(45) Date of Patent: *Oct. 14, 2014

(54) METHOD AND APPARATUS FOR EFFICIENT AND SECURE CREATING, TRANSFERRING, AND REVEALING OF MESSAGES OVER A NETWORK

(76) Inventor: Sergio Demian Lerner, Capital Federal (AR)

(*) Notice: Subject to any disclaimer, the term of this patent is extended or adjusted under 35 U.S.C. 154(b) by 213 days.

This patent is subject to a terminal disclaimer.

(21) Appl. No.: 13/086,208

(22) Filed: Apr. 13, 2011

(65) Prior Publication Data

US 2011/0202766 A1    Aug. 18, 2011

Related U.S. Application Data

(63) Continuation-in-part of application No. 12/904,033, filed on Oct. 13, 2010.

(60) Provisional application No. 61/251,051, filed on Oct. 13, 2009.

(51) Int. Cl.
| | | |
|---|---|---|
| H04L 9/32 | (2006.01) | |
| H04L 29/06 | (2006.01) | |
| G06F 12/14 | (2006.01) | |
| H04L 9/00 | (2006.01) | |
| H04L 9/08 | (2006.01) | |

(52) U.S. Cl.
CPC ......... *H04L 9/3218* (2013.01); *H04L 2209/608* (2013.01); *H04L 2209/04* (2013.01); *H04L 9/008* (2013.01); *H04L 9/002* (2013.01); *A63F 2300/532* (2013.01); *H04L 9/085* (2013.01); *H04L 67/38* (2013.01); *H04L 2209/46* (2013.01); *H04L 63/065* (2013.01)
USPC ........... 713/168; 713/153; 713/165; 713/171; 726/22

(58) Field of Classification Search
USPC .................... 713/168, 153, 165, 171; 726/22
See application file for complete search history.

(56) References Cited

U.S. PATENT DOCUMENTS

| | | |
|---|---|---|
| 6,951,303 B2 | 10/2005 | Petersen et al. |
| 7,035,404 B2 | 4/2006 | Furukawa |

(Continued)

FOREIGN PATENT DOCUMENTS

| | | |
|---|---|---|
| WO | 03013052 A1 | 2/2003 |
| WO | 2008068655 A2 | 6/2008 |

(Continued)

OTHER PUBLICATIONS

Dimitrios Mistriotis, "Implementing Mental Poker without a Trusted Third Party", Sep. 4, 2009, pp. 1-88.*

(Continued)

*Primary Examiner* — Aravind Moorthy
(74) *Attorney, Agent, or Firm* — Fleit Gibbons Gutman Bongini & Bianco PL; Paul D. Bianco; Gary S. Winer

(57) ABSTRACT

An encryption based method of enabling a plurality of parties to share, create, hide, or reveal message or token information over a network includes a commutative group cipher (CGC), where the underlying CGC is secure against ciphertext-only attack (COA) and plaintext attacks (KPA), and is deterministic. The protocols do not require a trusted third party (TTP), and execute rapidly enough on ordinary consumer computers as to be effective for realtime play among more than two players. Protocols are defined which include VSM-L-OL, VSM-VL, VSM-VPUM, and VSM-VL-VUM, wherein the letters V, O, SM, P, and UM represent, respectively, Verified, Locking Round, Open, Shuffle-Masking Round, Partial, and Unmasking Round.

35 Claims, 17 Drawing Sheets

(56) References Cited

U.S. PATENT DOCUMENTS

| | | |
|---|---|---|
| 7,240,195 B2 | 7/2007 | Furukawa |
| 7,322,888 B2 | 1/2008 | Singhaseni |
| 7,360,094 B2 | 4/2008 | Neff |
| 7,499,552 B2 | 3/2009 | Wilt et al. |
| 7,647,343 B2 | 1/2010 | Yamamichi et al. |
| 7,685,125 B2 | 3/2010 | Chen |
| 7,818,570 B2 | 10/2010 | Gentry et al. |
| 7,819,319 B2 | 10/2010 | Vernay et al. |
| 7,840,806 B2 | 11/2010 | Hammond, II et al. |
| 7,840,813 B2 | 11/2010 | Canard et al. |
| 2002/0007457 A1 | 1/2002 | Neff |
| 2004/0158546 A1 | 8/2004 | Sobel et al. |
| 2005/0021976 A1 | 1/2005 | Trossen |
| 2005/0269406 A1 | 12/2005 | Neff |
| 2006/0218399 A1 | 9/2006 | FitzGerald et al. |
| 2007/0174617 A1 | 7/2007 | Carrel et al. |
| 2008/0016357 A1 | 1/2008 | Suarez |
| 2008/0072056 A1 | 3/2008 | Turner |
| 2008/0137840 A1 | 6/2008 | Vanden Berghe et al. |
| 2008/0209224 A1 | 8/2008 | Lord |
| 2008/0229089 A1 | 9/2008 | Assouad et al. |
| 2008/0310621 A1 | 12/2008 | Vanden Berghe et al. |
| 2009/0019285 A1 | 1/2009 | Chen et al. |
| 2009/0094456 A1 | 4/2009 | Ruggiero et al. |
| 2009/0327706 A1 | 12/2009 | Ikeda et al. |
| 2011/0087885 A1 | 4/2011 | Lerner |

FOREIGN PATENT DOCUMENTS

| | | |
|---|---|---|
| WO | 2011/047085 A2 | 4/2011 |
| WO | WO2011047085 A2 | 4/2011 |

OTHER PUBLICATIONS

International Preliminary Report on Patentability for PCT/US2010/052550, published Apr. 17, 2012.

International Search Report published Jun. 30, 2011 for PCT/US/2010/052550, filed Oct. 13, 2010.

Written Opinion dated Jun. 28, 2011 for PCT/US/2010/052550, filed Oct. 13, 2010.

Jordi Castella-Roca et al., "On the Security of a Repaired Mental Poker Protocol." In: Proceedings of the Third International Conference on Information Technology: New Generations, ITNG 2006, Las Vegas: IEEE, Apr. 10-12, 2006, pp. 664-668.

Claude Crépeau, "A zero-knowledge Poker protocol that achieves confidentiality of the players' strategy or How to achieve an electronic Poker face", A. M. Odlyzkom, editor, Advances in Cryptology Crypto '86, vol. 263, pp. 239-250, Berlin 1986. SpringerVerlag. Lecture Notes in Computer Science.

Philippe Golle, "Dealing Cards in Poker Games", pp. 1-6, ITCC '05, 0-7695-2315-3/05 IEEE.

Tzer-Jen Wei and Lih-Chung Wang, "Fast Mental Poker Protocol", pp. 1-18, eprint.iacr.org/2009.

Jordi Castellà-Roca, "Contributions to Mental Poker", May 2005.

Kaoru Kurosawa et al, "General public key residue cryptosystems and mental poker protocols", 1991, pp. 374-388, EUROCRYPT.

Weiliang Zhao et al, "A Secure Mental Poker Protocol Over the Internet", 2003, Australian Computer Society, pp. 1-5.

Shah Goldwasser et al, "Probabilistic Encryption & How to Play Mental Poker keeping Secret All Partial Information", 1982 ACM, pp. 365-377.

Steven Fortune et al, "Poker Protocols", 1985, pp. 454-464.

Jordi Castellà-Roca et al, "Practical Mental Poker without a TTP Based on Homomorphic Encryption", INDOCRYPT 2003 pp. 280-294.

Jordi Castellà et al, "Privacy Homomorphisms for E-gambling and Mental Poker", 2006 IEEE, pp. 788-791.

Kaoru Kurosawa et al, "Reshufflable and laziness tolerant mental card game protocol", 1997, OEOCE Trans. Fundamentals, vol. E00-A, NO, pp. 1-7.

Adi Shamir et al, "Mental Poker", pp. 37-44, 1981.

Feng Bao et al, "Variations of Diffie-Hellman Problem", ICICS '03, vol. 2836 of LNCS 2003, pp. 301-312, Springer-Verlag.

Adam Barnett et al, "Mental Poker Revisited", 2003, pp. 370-383, Springer-Verlag Berlin Heidelberg.

Crépeau, Claude, "A Secure Poker Protocol that Minimizes the Effect of Player Coalitions", Advances in Cryptology Crypto "85, vol. 218 of Lecture Notes in Computer Science, pp. 73-86, Berlin. 1985. SpringerVerlag.

Zhao et al. "Efficient TTP—free Mental Poker Protocols" IEEE, 2005.

Castella-Roca et al. "Dropout-Tolerant TTP—Free Menial Poker", 2005, pp. 30-40.

ElGamal encryption—Wikipedia, the free encyclopedia, retrieved Jul. 5, 2013.

Public-key cryptography—Wikipedia, the free encyclopedia, retrieved Jul. 5, 2013.

Yvo Desmedt, Yair Frankel, "Threshold cryptosystems", Springer-Verlag, 1998.

* cited by examiner

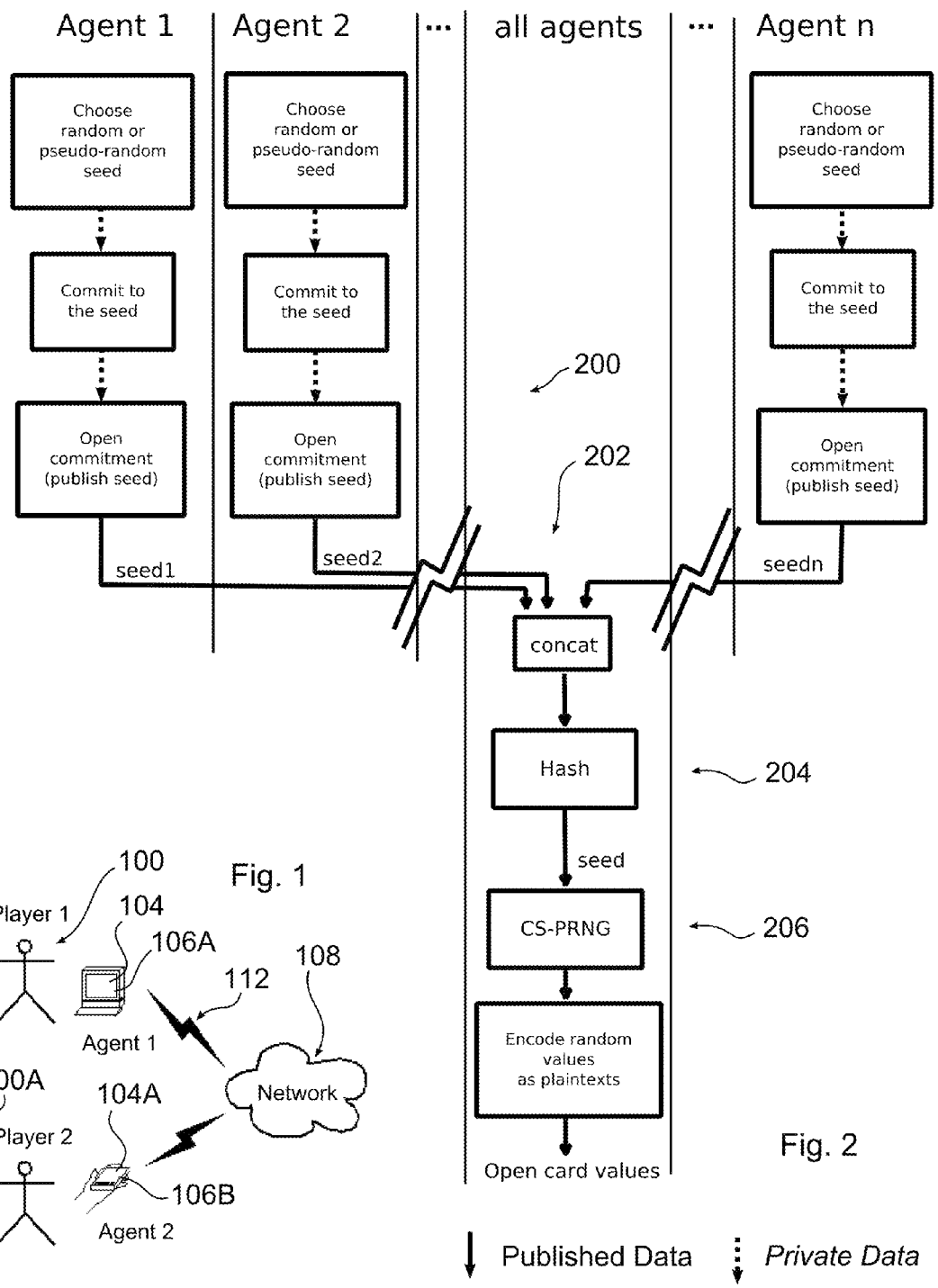

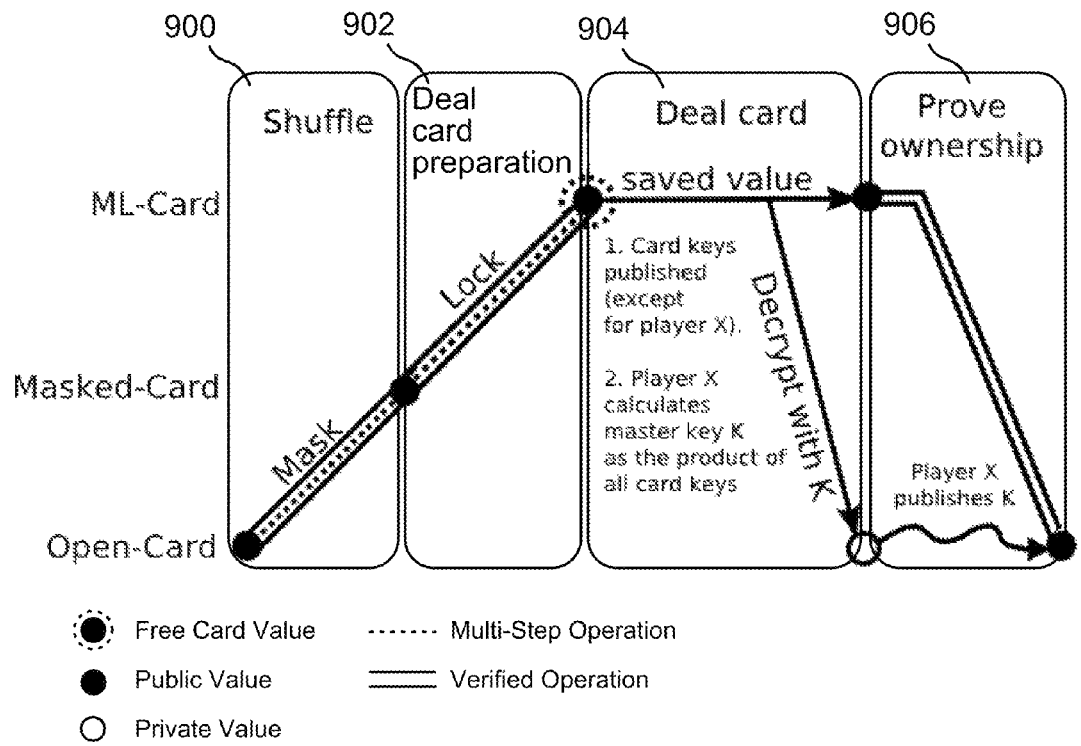
Fig. 9
Fig. 10
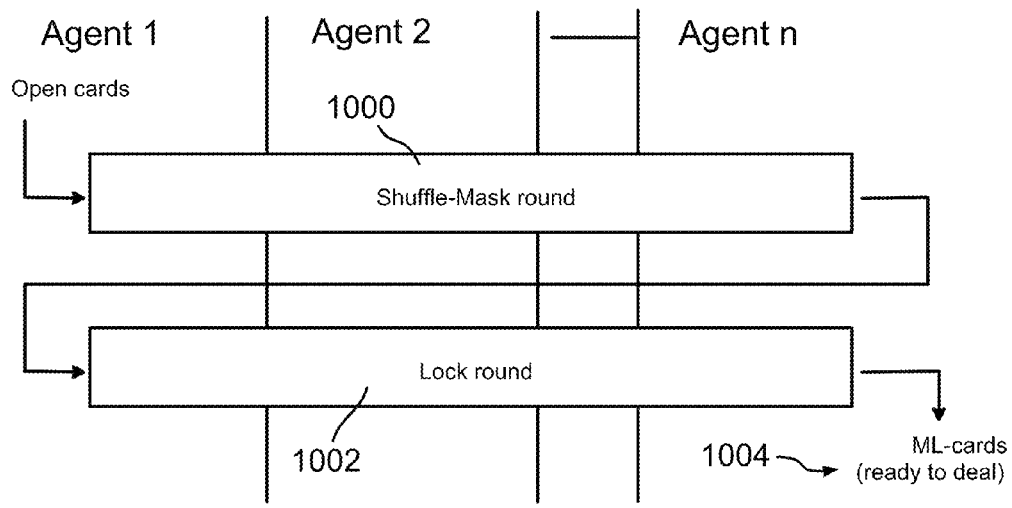

METHOD AND APPARATUS FOR EFFICIENT AND SECURE CREATING, TRANSFERRING, AND REVEALING OF MESSAGES OVER A NETWORK

CROSS REFERENCE TO RELATED APPLICATIONS

This application is a continuation-in-part of U.S. application Ser. No. 12/904,033, filed Oct. 13, 2010, and entitled "METHOD AND APPARATUS FOR EFFICIENT AND SECURE CREATING, TRANSFERRING, AND REVEALING OF MESSAGES OVER A NETWORK", which claims the benefit of related U.S. Provisional Application Ser. No. 61/251,051, filed Oct. 13, 2009, entitled "TOKEN SHUFFLE AND DISTRIBUTION PROTOCOL SYSTEM AND METHOD", the contents of each of which are hereby incorporated herein by reference.

FIELD OF THE INVENTION

The invention relates to the field of allowing multiple parties to securely share messages, such a virtual deck of playing cards, over a network, using cryptography.

BACKGROUND OF THE INVENTION

For a variety of applications, it is desired to be able to pass messages or tokenized information between multiple parties, such as a virtual deck of cards, e-voting, secure circuit evaluation schemes, and other forms of information sharing over an insecure, peer-to-peer, or broadcast medium, where the information must only be made available to specific individuals under specific constraints. A body of prior art is directed to this problem, and is commonly termed "Mental Poker" (MP), in light of the particular problems posed by Poker and other card games, particularly if gambling or the exchange of money is to take place.

To execute an MP protocol, players are required to do computations. In order to achieve acceptable security, these computations involve large numbers, are very hard to do by hand, and are almost impossible to do mentally, so each player relies on a programmed computer device that compute on his behalf. This device not only performs computations on behalf of the player, but validates the other players' computations in order to detect cheating. Each device in this protocol is termed an "agent".

MP protocols can be divided into two main groups: protocols that require a trusted third party (TTP) and protocols that do not (TTP-Free). In the former there is a third party who draws and knows the cards in each player's hand, so it is necessary that the third part is trustworthy and impartial. From the point of view of a poker player, an e-gaming site that uses an MP protocol with TTP still poses a security risk. In TTP-free protocols, only each player knows his own hand of cards, and the site operator is not able to know any player's cards. In the context of a voting scheme, a protocol with TTP means that a central private or governmental office, or a collusion of offices, could recover enough information to trace each vote to its voter, and therefore only a TTP-free protocol can provide true anonymity and adequate security for individual voters.

Reference numbers in brackets, used throughout this specification, refer to the Bibliography that follows this Background Section. All references in the Bibliography are incorporated herein by reference.

Shamir, Rivest and Adleman proposed the first TTP-Free protocol [SRA81] that achieved some of the properties desired for card games, but forced the players to reveal their hands and their strategy at the end of the game. In [Cr86], a set of requirements for an MP protocol were established, whereby if a protocol satisfied the set, the protocol would be deemed to be as secure as a "real" card game, with participants mutually present. [Cr86] also presented the first protocol that purported to satisfy the set of requirements. However the protocol is not practical, since an implementation is reported to take 8 hours to shuffle a poker deck [E94]. Other protocols were later developed [KKO90][BS03][CDRB03] [CR05], but were excessively complex, making them difficult to verify, extend, or implement.

The art described in this section is not intended to constitute an admission that any patent, publication or other information referred to herein is "prior art" with respect to this disclosure, unless specifically designated as such. In addition, this section should not be construed to mean that a search has been made or that no other pertinent information as defined in 37 CFR §1.56(a) exists.

BIBLIOGRAPHY

[BDH02] Feng Bao. Robert Deng, Huafei Zhu (2002). "Variations of Diffie-Hellman problem". In ICICS '03, volume 2836 of LNCS 2003, pages 301-312, Springer-Verlag.

[B96] Bruce Schneier. *Applied Cryptography*. John Wiley & Sons, 1996.

[BS03] A. Barnett and N. Smart. Mental poker revisited. In Proc. Cryptography and Coding, volume 2898 of Lecture Notes in Computer Science, pages 370-383. Springer-Verlag, December 2003.

[CD04] Jordi Castellà-roca and Josep Domingo-ferrer. A Non-Repudiable Bitstring Commitment Scheme Based on a Public-Key. Proceedings of the International Conference on Information Technology: Coding and Computing (ITCC'04) Volume 2-Volume 2, Page: 778.

[CR03] Jordi Castella-Roca, Josep Domingo-Ferrer, Andreu Riera, Joan Borrell. Practical Mental Poker without a TTP Based on Homomorphic Encryption (2003). Progress in Cryptology-Indocrypt'2003

[CR05] Jordi Castellà-Roca, Contributions to Mental Poker. Autonomous University of Barcelona, Doctoral Programme in Computer Science and Artificial Intelligence. Data of public reading: Sep. 9, 2005.

[Cré86] C. Crépeau. A zero-knowledge poker protocol that achieves confidentiality of the players' strategy or how to achieve an electronic poker face. In A. M. Odlyzko, editor, Advances in Cryptology—Crypto '86, volume 263, pages 239-250, Berlin, 1986. Springer-Verlag. Lecture Notes in Computer Science.

[dBo90] B. den Boer. More efficient match-making and satisfiability: the five card trick. In Advances in Cryptology: EUROCRYPT '89 Proceedings, Lecture Notes in Computer Science 434, pp. 208-217, 1990.

[E94]. J. Edwards, Implementing Electronic Poker: A Practical Exercise in Zero-Knowledge Interactive Proofs. Master's thesis, Department of Computer Science, University of Kentucky, 1994

[FIPS186] Federal Information Processing Standards, Publication 186, 1994 May 19.

[FLS90] Feige, U., Lapidot, D., and Shamir, A. 1990. Multiple non-interactive zero knowledge proofs based on a single random string. In *Proceedings of the* 31*st Annual Symposium on Foundations of Computer Science* (Oct.

22-24, 1990). SFCS. IEEE Computer Society, Washington, D.C., 308-317 vol. 1. DOI=http://dx.doi.org/10.1109/FSCS.1990.89549

[HIRLL99] A Pseudorandom Generator from any One-way Function. Johan Håstad, Russell Impagliazzo, Leonid A. Levin, Michael Luby. SIAM Journal on Computing 1999, volume 28, pages 12-24.

[K97] Neal Koblitz. *A Course in Number Theory and Cryptography*, Graduate Texts in Math. No. 114, Springer-Verlag, New York, 1987. Second edition, 1994.

[KKOT90] K. Kurosawa, Y. Katayama, W. Ogata, and S. Tsujii. General public key cryptosystems and mental poker protocols. In Ivan B. Damgšard, editor, Advances in Cryptology-Eurocrypt '90, volume 473 of Lecture Notes in Computer Science, pages 374-388. Springer-Verlag, 1990.

[Lys02] Anna Lysyanskaya. Unique signatures and verifiable random functions from the dh-ddh separation. Lecture Notes In Computer Science; Vol. 2442. Proceedings of the 22nd Annual International Cryptology Conference on Advances in Cryptology Pages: 597-612. Available from http://theory.lcs.mit.edu/anna/papers/lys02.ps.

[MRV99] Silvio Micali, Michael Rabin, and Salil Vadhan. Verifiable random functions. In 40th Annual Symposium on Foundations of Computer Science, pages 120-130, New York, October 1999. IEEE.

[N91] Moni Naor. Bit Commitment Using Pseudo-Randomness, Journal of Cryptology, 1991. Volume 5, pages 151-158.

[NIST800-57] Recommendation for Key Management—Part 1: general, NIST Special Publication 800-57. March, 2007

[NR98] V. Niemi and A. Renvall. Secure Multiparty Computations Without Computers. Theoretical Computer Science, 191(1-2):173-183, 1998.

[PS04] P. Syverson, A Taxonomy of Replay Attacks, In Proceedings of the 7th IEEE Computer Security Foundations Workshop.

[SRA81] A. Shamir, R, L. Rivest, and L. Adleman. Mental poker. Mathematical Gardner, pages 37-43, 1981.

[St01] A. Stiglic. Computations with a deck of cards. Theoretical Computer Science, 259(1-2):671-678, 2001.

[VSP06] V. Cortier, S. Delaune and P. Lafourcade. A survey of algebraic properties used in cryptographic protocols. Journal of Computer Security 14 (2006) pages 1-43, IOS Press.

[WC01] D. S. Wong and A. H. Chan, Efficient and mutually authenticated key exchange protocol for low power computing devices, in: Proc. 7th International Conference on the Theory and Application of Cryptology and Information Security (*ASIACRYPT'01*), Vol. 2248 of LNCS, Gold Coast, Australia, Springer, 2001, pp. 272-289.b

[W06] Stephen A. Weis, New Foundations for Efficient Authentication, Commutative Cryptography, and Private Disjointness Testing. Submitted to the Department of Electrical Engineering and Computer Science in partial fulfillment of the requirements for the degree of Doctor of Philosophy in Computer Science at the MIT, May 2006.

[WW09] Tzer-jen Wei and Lih-Chung Wang, Fast Mental Poker Protocol, Cryptology ePrint 2009/439.

SUMMARY OF THE INVENTION

A method for enabling a plurality of parties to create, hide, and reveal tokenized information over a network among parties is disclosed, comprising: implementing a commutative group cipher (CGC), wherein the CGC is secure against ciphertext-only attack (COA) and secure against known plaintext attacks (KPA), and is deterministic; and implementing a plurality of sub-protocols that allow a first party to securely reveal information by publishing a unique key pertaining to a revealed token to one or more other party without revealing information regarding other tokens of the first party.

In further embodiments, the method further includes an abrupt drop-out recovery protocol operative to render the plurality of sub-protocols tolerant of abrupt drop-out; a polite drop-out recovery protocol operative to render the plurality of sub-protocols tolerant of polite drop-out; the CGC is secure against chosen plaintext attacks (CPA); the CGC provides historical security.

In other embodiments, the CGC is non-malleable, with the exception of malleability imposed by commutativity; and computational uniqueness of open cards (CUOC) is achieved by a sub-protocol in an initial stage, and computational uniqueness invariant (CUI) is guaranteed by verification sub-protocols at one or more subsequent stages.

In yet further embodiments, the tokenized information is representative of playing cards, and wherein this disclosure includes representations of a Mental Poker protocol enabling a property selected from the group consisting of: uniqueness of cards, uniform random distribution of cards, cheating detection with a very high probability, complete confidentiality of cards, minimal effect of coalitions, complete confidentiality of strategy, absence of a requirement for a trusted third party (TTP), polite drop-out tolerance, abrupt drop-out tolerance.

In other embodiments, tokenized information is representative of playing cards organized into one or more decks, and can be used as a Mental Poker protocol; protocols are disclosed to support a deck having indistinguishable duplicated cards; the method is encoded on a computer readable non-transitory storage medium readable by a processing circuit operative to execute the CGC and sub-protocols; the method is implemented on an information processing system, the information processing system comprising a processor and a memory communicatively coupled to the processor, wherein the processor is operative to implement the CGC and the sub-protocols; the CGC preserves the size of the plaintext in ciphertext; the sharing of tokenized information is associated with a playing card game including wagering for money; a protocol is selected from the group consisting of VSM-L-OL, VSM-VL, VSM-VPUM, and VSM-VL-VUM; and the CGC includes a cipher selected from the group consisting of: Pohlig-Hellman symmetric cipher, Massey-Omura, Pohlig-Hellman symmetric cipher analog on elliptic curves, RSA, and RSA analogs on elliptic curves, Exponentiation over any Galois field where DDH assumption holds.

In other embodiments, the at least one sub-protocol includes a sub-protocol selected from the group consisting of: locking verification protocol, shuffle-masking verification protocol, undo verification protocol, re-locking protocol, re-shuffle-masking verification protocol, shuffle-locking verification protocol, and unmasking verification protocol; the at least one protocol includes a round selected from the group consisting of shuffle-masking round and locking round; each party performs masking and locking operations; the sub-protocols include at least one protocol selected from the group consisting of: CO-VP, FI-UniVP, CC-VRP, S-VRP, S-VRP-IC, S-VRP-MC1, S-VRP-MC2, S-VRP-MC3, P-VRP, P-VRP-MC, R-VRP, R-VRP-MC1, and R-VRP-MC2; the method includes implementing a shuffle-masking round followed by a locking round; the plurality of sub-protocols includes a sub-protocol that allows a party to verify one or more encryption or permutation operations performed by other parties under a protocol without using a cut-and-choose technique; and the plurality of sub-protocols includes a sub-protocol that enables the storage of digital representations in digital decks, keeping tokenized information associated with digital representations of the deck hidden, and allowing any party to shuffle a digital deck.

In yet further embodiments, the plurality of sub-protocols do not require a trusted third party (TTP); the plurality of sub-protocols includes a protocol to transfer tokenized information from one party to another with the consent of other parties, without revealing which tokenized information has been transferred; the plurality of sub-protocols includes a protocol to reshuffle a deck of tokenized information; the plurality of sub-protocols includes a protocol to return tokenized information to a deck of tokenized information; the plurality of sub-protocols includes one or more protocols to generate and transfer tokenized information representative of indistinguishable duplicated cards; the plurality of sub-protocols includes a protocol operative to provide protection against suicide cheating.

In another embodiment, a method enables a plurality of parties to share message information in a playing card game context, over a network, and comprises: a plurality of protocols collectively defining a commutative group cipher (CGC), wherein the underlying CGC is secure against ciphertext-only attack (COA), secure against known plaintext attacks (KPA), and is deterministic, and wherein the plurality of protocols do not require a trusted third party (TTP); wherein sharing takes place in real-time, among two or more participants, and where a first participant may not improve a position of a second participant by violating a sharing rule, without a real-time detection of the violation, and wherein the protocol uses a locking-Round.

Alternatively, a method enables a plurality of parties to share message information in a rule based context, over a network, and comprises: a plurality of protocols collectively defining a commutative group cipher (CGC), wherein the underlying CGC is secure against ciphertext-only attack (COA), secure against known plaintext attacks (KPA), and is deterministic, and wherein the plurality of protocols do not require a trusted third party (TTP); wherein a protocol is selected from the group consisting of VSM-L-OL, VSM-VL, VSM-VPUM, and VSM-VL-VUM, wherein the letters V, O, SM, P, and UM represent, respectively, Verified, Locking Round, Open, Shuffle-Masking Round, Partial, and Unmasking Round.

Another method enables a plurality of parties to securely create, transfer, and reveal tokenized information over a network, and comprises: providing a commutative group cipher (CGC), wherein the CGC is secure against ciphertext-only attack (COA) and is secure against known plaintext attacks (KPA); providing a plurality of sub-protocols useful to a Mental Poker protocol; and providing a sub-protocol to securely provide abrupt drop-out tolerance.

In a further embodiment, a method enables a plurality of parties to securely create, transfer, and reveal tokenized information over a network, and comprises: providing a commutative group cipher (CGC), wherein the CGC is secure against ciphertext-only attack (COA), and is secure against known plaintext attacks (KPA); providing a plurality of sub-protocols collectively defining a Mental Poker protocol; and providing at least one sub-protocol from the group consisting of: secure abrupt drop-out tolerance protocol, secure transfer of hidden tokenized information between parties protocol. In an embodiment, message transfers are done according to the DMPF protocol.

In yet another embodiment, a method for enabling a plurality of parties to create, hide, and reveal tokenized information over a network among parties, comprises: implementing a commutative group cipher (CGC), wherein the CGC is secure against ciphertext-only attack (COA) and secure against known plaintext attacks (KPA), and is deterministic; implementing a plurality of sub-protocols wherein the sub-protocols include at least one protocol selected from the group consisting of: CO-VP, FI-UniVP, CC-VRP, S-VRP, S-VRP-IC, S-VRP-MC1, S-VRP-MC2, S-VRP-MC3, P-VRP, P-VRP-MC, R-VRP, R-VRP-MC1, and R-VRP-MC2.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a diagram of a networking environment in which an embodiment may be implemented;

FIG. 2 is an illustration of a hash-based method in accordance with an embodiment;

FIG. 9 illustrates a VSM-VL protocol, in accordance with an embodiment;

FIG. 10 illustrates a VSM-VL shuffle between agents, in accordance with an embodiment;

DETAILED DESCRIPTION OF THE INVENTION

Figure 3:
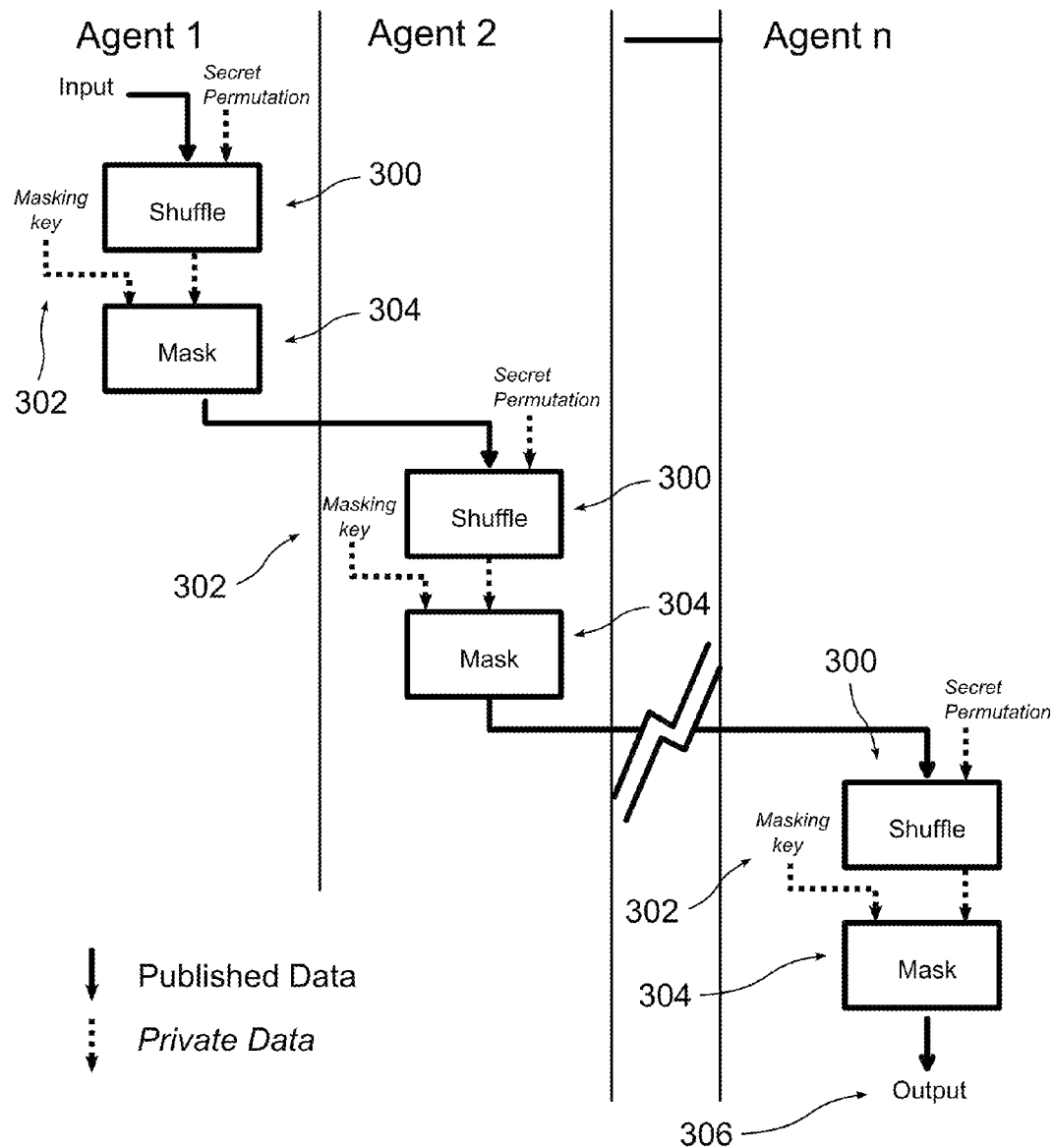
FIG. 3 is an illustration of a shuffle-masking round in accordance with an embodiment.

Headings used herein are for the convenience of the reader, and are not intended, and should not be construed, to be limiting or defining of the contents of the section which they precede. Herein, the term "we" and "our" refers to the inventor.

Overview

The instant disclosure provides an MP protocol which is relatively easy to formally verify, extend, and implement, and which solves a number of problems not defined or addressed in the prior art.

It should be understood that references to "MP" or "MP protocol" herein refers to any purpose to which one skilled in the art would apply the protocol. Further, in the examples herein, a virtual deck of cards is used as a representative example of complex message sharing; however, one skilled in the art would appreciate that the apparatus and methods of the instant disclosure are applicable to information sharing of messages, in general. More particularly, it should be understood that protocols of embodiments herein are advantageously used in a wide variety of applications, including e-cash, e-voting, secure Boolean circuit evaluation, and other applications including sharing of messages in a controlled and secure manner. Thus, an embodiment is not limited to applications including poker, card games, or decks of cards.

The term "message" or "messaging" in this application refers to any set, subset, or piece of information which is likely but not necessarily discrete or distinct, and may be part of a larger related set, or may be part of a relatively large data stream or collection of information.

Mental Poker (MP) protocols allow multiple parties to securely use a deck of virtual cards over an insecure, peer-to-peer or broadcast medium. The protocol can be a card game such as poker, or a multi-party computation that relies on virtual cards, such a some secure e-voting or secure circuit evaluation schemes. Because of this diversity of applications, there is no uniform nomenclature on the research community. For example, a secure voting ballot may support similar operations and so be homomorphic to a poker card. Accordingly, for convenience, the card game nomenclature is used herein. Accordingly, the terms "card", "token", or and "message" are synonymous, as are the terms "party", "player", and "participant". A party may be a human, an institution, an organization, a natural or legal person, or any other entity that may be involved in a transaction, such as a bank, a political party or the "house" in a casino.

To execute a mental poker protocol, numerous computations involving large numbers are required for each player. As these computations cannot be performed, ordinarily, by people, each player relies on a programmed computer device, or "agent", that performs these computations on his behalf. This agent not only performs computations pertaining to the player's actions, but validates computations performed by agents of other players. FIG. 1 depicts parties or players 100, 100A, with associated agents 104, 104A, collectively communicating over a network 108. Agents 104, 104A are depicted as residing on different types of computing platforms, including, for example, a consumer personal computer 106A, and a handheld computer 106B, although any type of computing device may be used, including a robotic player and agent, not shown. Two players 100, 100A and agents 104, 104A are depicted, although it should be understood that an embodiment can be used with any number of players, within the limits of hardware speed and connectivity. Any type of network communication method 112 may be used to connect computing platforms 106A, 106B and their associated respective agents 104, 104A, including wireless or wired, communicating over a LAN, WAN, or the internet, or other form of communication between computers, as would be understood by one skilled in the art.

Embodiments herein define a framework to create secure TTP-free mental poker protocols. The disclosure defines classes and secure operations that rely on a user-provided commutative group cryptosystem. A framework of embodiments herein also provides four base protocols, and other user-selectable options, selected based upon time/security trade-offs. The disclosure additionally includes an instantiation of the framework (PHMP) over the Pohlig-Hellman symmetric cipher. The instant disclosure together including PHMP has been calculated to be sufficiently efficient to achieve real-time performance for playing, for example, Texas Hold-em, over the Internet, for up to ten players, using personal computers and keys of 1024 bits long, with computational and communication bandwidth requirements which are far lower than the prior art.

In accordance with an embodiment, protocols are defined which functions acceptably in real-time, without a requirement of an unacceptable or unreasonable delay. Protocols of embodiments herein include drop-out tolerance, or the ability for the protocol to satisfactorily be carried out in the event a participant or player (and its "agent") ceases to participate.

Properties of Protocols of the Invention

The instant disclosure supports the following properties:

1) Uniqueness of cards: No player alone can duplicate cards. Duplicates should be detected and the cheater identified.

2) Uniform random distribution of cards: No player can predict or change the outcome of the card shuffle.

3) Cheating detection with a very high probability: The protocol must detect any attempt to cheat. Cheating is usually detected in a protocol stage in which each player (typically through the player's agent) show the others a proof of the correctness of the computations he has done. Each player must prove he has acted honestly while performing computations. A player who cannot prove honesty is presumed a cheater. Because such honesty proofs are generally the most computational expensive operation in MP protocols, some protocols allow setting a certain threshold which determines the probability of a cheating party going undetected.

In the foregoing, as in the remainder of this specification, the term "card" is a form of "tokenized information" or "message". With respect to properties (1)-(3), in some games, players are required to perform a cyclic shuffle of the deck (also known as "cutting" or "splitting" the deck). Although in practice most games require that players "cut" the deck, this action is used as a means of avoiding cheating by the dealer. In practice, properties (1)-(3) minimize the potential for cheating during dealing.

4) Complete confidentiality of cards: No information pertaining to the cards in the deck, or the cards in a player's hand, should be revealed (leaked) to any other player or party. In practice, if the protocol presents a sufficiently computationally hard problem, it becomes practically infeasible to reliably determine such information, rendering the probability of a leak sufficiently small.

5) Minimal effect of coalitions: Players should not be able to collude or work together to change the outcome of a card shuffling, to exchange cards privately, to cheat undetected, or to chat or otherwise collude to place blame on a third player.

6) Complete confidentiality of strategy: Players who decide to show their hand should be able to rely on no other strategic information being disclosed, for example the time when each shown card was dealt. Also, players who opt not to show their cards shouldn't be required to disclose any information about those cards.

7) Absence of a requirement for a trusted third party (TTP): In real-life scenarios, card games are frequently played for money; players are therefore typically uncomfortable relying on a supposed TTP who could know the cards during play. For example, a third party could be bribed, or his computer system could be hacked by another party.

With respect to property (7), it should be understood that in a network environment, and in a game or gaming context, there are numerous parties which are, in fact, trusted. Examples include internet service providers, banks, payment gateways, certification authorities, and logging and timing services. However, in the context of embodiments herein, these parties have less information than the TTP referred to in property (7), who is a third party that is participating in carrying out the protocol itself, and therefore it is more difficult for them to interfere with the integrity of the protocol. Moreover, in accordance with an embodiment, no party knows the other party's cards, which is not the case when a TTP is a participant in the protocol.

8) Polite Drop-out tolerance: If a player decides to quit the game politely, the remaining players should be able to continue playing. Cards that where in the quitting player's hand should be returnable to the deck, or set aside.

9) Abrupt Drop-out tolerance: If a player abruptly quits the game (e.g. by closing or losing his connection) the remaining players should be able to continue playing. Cards that where in the quitting player's hand should be returnable to the deck.

With respect to properties (8) and (9), it should be noted that perfect Drop-out tolerance may not be achievable without a third party, due at least to Drop-out collusion among participants, and because common knowledge cannot be gained in a distributed system with unreliable messages. Consistent with the foregoing, the instant disclosure addresses Drop-out tolerance to an extent that is satisfactory as a practical matter, without requiring a TTP.

The following properties may be considered Extended Properties, of embodiments herein:

10) Real-world comparable performance: The protocol must allow real-time play on ordinary consumer computing equipment. Real-time is defined herein as a speed which does not impose a pace of play or work that is substantially slower than a live non-virtual game or undertaking, in which the players are mutually present, or the participants are working with physical representations of messages. For example, in the context of a card game, more than ten minutes for a deck shuffle, and more than a minute between most player actions, would be considered unreasonable delay, and not real-time. This includes bandwidth usage, memory usage and CPU usage, and assumes each player has limited computing resources.

With respect to property (10), The instant disclosure provides a protocol that performs satisfactorily on a personal computer, in real time, or with reasonable delays which would be acceptable to players. The instant disclosure may take advantage of pre-processing in the background, including shuffling or other processor intensive calculations which can be made in advance. The instant disclosure may also perform delayed verifications, however this increases the potential for suicide cheating.

11) Variable number of players: The protocol must support more than 2 players, and advantageously a large number of players.

12) Card transfer actions: The functionality to return cards to a deck, reshuffle the deck, discard face-down, and transfer cards privately between players (with the other players' consent), are advantageously supported.

13) Protection against suicide cheaters: Cheating, even if discovered, cannot be used as a method to reach other goals. For example, a suicide cheater may change their own cards or other players cards when dealing, or see other players cards when they should be private, despite the knowledge that they may be caught. In some games, strategic information is of extreme importance. A protocol is protected against suicide cheating if it allows the players to detect cheating, and identify the cheating parties, without revealing private keys, private cards, or any strategic information, including strategic information regarding how a player would react to an event that would not have occurred without cheating. This implies that cheating must be detected before it can have an impact on play, which is substantially immediately after cheating occurs. If suicide cheating protection is not required, verification operations can be delayed to gain performance and responsiveness.

14) Support for a deck having indistinguishable duplicated cards: Some unusual applications and games require more than one copy of a card. For those applications, decks must support indistinguishable copies of the same card value, without revealing that such a duplicate exists in the deck. Examples include Pinoche or Bezique. The instant disclosure supports duplicate cards created at the beginning of the game, but in some embodiments, a trace of which clone is being passed may be detectable. Additionally, an embodiment enables duplicated cards during play, but in some embodiments, traces of their use may be detectable.

Measuring Performance

A key property used for protocol comparison [CR05] is the computational and communications requirements for a given configuration of players, cards and security threshold. No other resource, such as computer memory, seems to be relevant to performance in MP protocols.

Delayed Verifications

Because most the most CPU-demanding operation is verification of the shuffle [CR05], a protocol is more likely to approach or achieve realtime performance by delaying the cheating detection sub-protocols until the end of the game, once a week, or any other time in the future. Additionally, some computations and communications may be spread out over idle cycles of the CPU. However, such delay is unsatisfactory in low-trust/high-stakes scenarios, where immediate cheating detection is required. Reasons for this include a need to protect players against suicide cheating, and to avoid blocking money in the pot. With respect to the latter, money won must be blocked from further transactions until the verifications are complete; otherwise, money obtained by cheating in games that were not yet verified could be bet in following games, creating chains of games that would be required to be rolled-back when a cheater is detected, which would be highly problematic. Accordingly, an embodiment accomplishes verification in real time.

Non-Interactive Vs. Interactive Proofs

Each player must verify the correctness of other players private operations. In a game with n players, a player's proof that an operation is correct generally requires (n−1) interactive proofs, one for each remaining player. Non-interactive proofs generally take more time, but the same proof can be reused and sent to each of the remaining players. As the number of players increase, non-interactive proofs became less expensive in terms of CPU and bandwidth usage, than interactive proofs. A point where it is advantageous to use a non-interactive proof depends on the protocol and security threshold, but has been typically found to be about n=20.

External On-Line Auditing

An external on-line auditing party is generally required when not only the result, but all the events in the game itself are important. In one example, assume a tournament and n players playing will be playing a series of games together.

Suppose that 2 points are given to the winner of each game, 1 to each player involved in a draw, and 0 points to a loser. Further assume that 5 extra points are given to a winner of a game that has a poker of aces. In this scenario, a group of players may collude and gain some advantage over the remaining non-colluding players by choosing fake cards for each game, letting each player win a game with a poker of aces, and providing fraudulent proofs to an off-line auditing authority. Alternatively, without faking cards, players could exchange private key information on an external channel, and then decide which cards will be dealt to cause a specific player to obtain a poker of aces. To avoid this situation, an auditor party may need to take part in the protocol as another card shuffler, and to also take part in verification protocols as another verifier.

Hash Chains

A cryptographic hash function is a deterministic procedure that takes an arbitrary block of data and returns a fixed-size bit string, the (cryptographic) hash value, such that an accidental or intentional change to the data will change the hash value. The data to be encoded is often called the "message", and the hash value is sometimes called the message digest or simply digest [B96].

A Hash Chain is a sequence of messages where each message includes a message digest of the previous message on the chain.

If a broadcast medium is used for communication, protocol messages can be linked in a hash chain, where each message includes the digest of the previous message sent. In this way, the last messages serves as an authentication code for the whole protocol transcript. An example of a hash chain is the Distributed Notarization Chain (DNC) [CR03].

If peer-to-peer connections are allowed, then a Hash DAG (Direct Acyclic Graph) can be used. In a hash DAG, each message sent by a player may reference more than one previous message. Each message carries the hash digests of all previous messages received or sent by that player that are terminal nodes of the DAG that is constructed by the message reference relation, as known by the sender.

Theoretical Security in Mental Poker Protocols

SRA proved that a correct and fair shuffle cannot be accomplished with perfect security; rather, the best result is computational security. The instant disclosure provides a coherent and user selectable level of acceptable computational security.

Kinds of Proofs

Although perfect zero knowledge (PZN) proofs provide perfect secrecy, there is no point at which verification protocols provide greater security than other operations in the protocol, such as encryptions, for example. An attacker generally tries to crack the weakest link of the chain. If the other operations, including encryptions, are secure under computational assertions, then the verifications can also be computational-zero-knowledge-arguments, without decreasing the overall security of the protocol.

Because perfect-ZNPs are generally expensive in communication and computation requirements, the instant disclosure offers, in addition to perfect ZN proofs protocols, computational ZN arguments which rely on the same security assumptions as the ciphers used elsewhere in the protocol. In many games, a party takes symmetric roles, both proving and verifying operations, so there is no point in having a verification protocol that can withstand a computationally unbounded prover, and a computationally bounded adversary, or vice-versa. Accordingly, the instant disclosure, as an efficient protocol, advantageously relies only on computational security as a satisfactory boundary.

Verification protocols described in [KKO97], [BS03] and [CDR03], rely on cut-and-choose perfect-zero-knowledge protocols, which are inherently slow because of the need for iterative rounds to achieve a certain threshold of certainty. To gain improved performance over the prior art, the instant disclosure provides fixed round proof protocols.

Base Concepts of the Invention

For brevity, the term "MPF" refers to the instant disclosure, or a framework of protocols of the instant disclosure, and should otherwise be considered to be entirely arbitrary. "We" refers to the inventor or inventors of the instant disclosure.

MPF is a framework which defines abstract classes, operations and protocols that allow generation of new MP protocols satisfying some or all the required properties. Like SRA, MPF is defined for an ideal Commutative Group Cipher (CGC). A CGC is a commutative cipher which also provides group operation on keys, as follows, and as defined elsewhere herein.

Formally, a cipher F is a tuple (E,D) where E is a function $K \times M \rightarrow C$ noted $E_k(m)$ and D is a function $K \times C \rightarrow M$.

And for any $m \in M$, $D_k(E_k(m))=m$.

To be a CGC, a cipher F must have these other properties:

$C=M$

There exists an operator "*" for which $G=\langle K, * \rangle$ is a commutative group.

For all $x \in X$, and any $k \in K$, $E_k(E_q(x))=E_{(k*q)}(x)$

For all $x \in X$, and any $k \in K$, $D_k(x)=E_j(x)$ for $j=k^{-1}$

For all $x \in X$, $E_1(x)=x$

For each valid pair of keys $k,q \in K$, obtaining k from (k*q) must be computationally infeasible or theoretically impossible.

The security of MPF can be proven secure in the random oracle model (ROM) relying on these external security assumptions on the CGC:

1. The underlying CGC is secure against ciphertext-only attack (COA) where the ability to obtain any information about the underlying plaintext is considered a successful attack.

2. The underlying CGC is secure against known plaintext attacks (KPA).

3. The underlying CGC is secure against chosen plaintext attacks (CPA) (see note)

4. The underlying CGC is non-malleable, for a suitable definition a malleability that excludes malleability imposed by commutativity.

5. The CGC is deterministic [K97].

6. The CGC provides historical security [W06] if card transfers between players are required, and there is a need to hide the card transfer history.

Standard formal security definitions, such as semantic security or non-malleability, do not fully capture adversarial abilities when using a commutative cryptosystem. Definitions such as cascadable semantic security [W06] cannot be applied, since we rely on a symmetric deterministic cipher. The concept of historical security can be easily adapted, and we'll require so if card transfers are required.

Assumption 3 is only required for the VSM-L-OL base protocol (see detail, below), or if the validation protocols will be executed in parallel. It is required in VSM-L-OL because VSM-L-OL has a round without validation. It is required when doing parallel verifications because the output from a player calculation could be sent as input to another player before the validation protocol finished, which opens a window of time for a CPA attack.

Assumption 4 can be removed if the verification protocols are modified to withstand malleability. We'll show that this is possible imposing only a slight penalty in performance.

In many proofs given in the following sections, two additional assumptions are required (COUC and CUI). Nevertheless, these are not external assumptions. The protocols in MPF guarantee these properties hold on start, and keep true as sub-protocol postconditions as long as they hold as preconditions.

Computational Uniqueness of Open Cards (CUOC)

We'll say that a set of cards X is computationally unique (CU) if no proper subset of the players can compute a key that can encrypt/decrypt a card in the set into a different card in the set. Finding such a conversion key should be as hard as breaking the CGC. The deck, before being shuffled, consists of open cards. The CUOC property states that the initial deck is computationally unique. The CUOC is satisfied using a special protocol at startup.

This property is less stringent than the one stated in [WW09], where the requirement is that the card values are indistinguishable from independent uniform random variables, as a means to avoid known conversion keys.

Computational Uniqueness Invariant (CUI)

MPF sub-protocols processes lists of cards (inputs) and generates new lists of cards (outputs). There are two kinds of protocols: action protocols and verification protocols. Action protocols can be verified and unverified. Verification protocols verify action protocols. Every action protocol has the precondition that each input list of cards is computationally unique. Every verified action protocol guarantees that the output list of cards remains computationally unique. This invariant can be easily kept as long as all players can track the source and destination of each card value that undergoes encryption. This is done by the verification protocols executed as sub-protocols.

Because each card list used as input of a protocol is a subset of a list that was the output of another protocol (with the exception of the first protocol which creates the deck), a verified action protocol that receives an input set of cards that has been proven to be CU will produce a new set of cards that is proven CU. The CU condition spreads from the CUOC up to every card list used through verified action protocols. Verification protocols may require some input card lists to be CU, and can guarantee that another input list is CU, expanding the number of CU card lists. Verification protocols are the bridge that provides action protocols CU guarantees for their outputs. MPF allows the parallelization of sub-protocols. In a situation where a card list whose verification for CU is still pending on an unfinished protocol, and the card list is supplied as input to another protocol, the failure of the former implies nullity of the later.

One way to assure the CUOC, is by choosing open cards values at random; however it is noted that the card values chosen must still be valid plaintexts for the CGC. Computing a conversion key would be as hard as a KPA on the CGC. We give two computational protocols for creating open card values that assure CUOC.

We note that the CUOC requires that the number of open cards to be orders of magnitude smaller than the key space, to keep the probability of finding a conversion key low.

We'll define a protocol as secure in the MPF model, if it is secure relying on the external security assumptions, as well as if each input card list that needs to be CU, is indeed CU.

Types of Protocols

This paper defines and uses different kinds or types of protocols, which are detailed below, and summarized as follows:

MPF framework: MPF is a framework which defines four base protocols. Each base protocol is an abstract Mental Poker Protocol, and each represents a different way to accomplish a similar objective, with slight security and performance variations. Note that without specifying the CGC, an MPF base protocol is not by itself a complete Mental Poker protocol: the implementor must still choose a CGC from the ones provided, or choose a new CGC and provide replacements of the verification protocols if the CGC is malleable.

Base protocols: As stated, each base protocol, plus a CGC, is a complete Mental Poker protocol.

Card protocols: Card protocols operate on cards; for example dealing, opening, showing, or transferring a card.

Verification protocols: MPF requires players to privately operate on cards, and these operations need to be publicly verified to avoid cheating. Verification protocols provide a guarantee that private operations are indeed correct.

PHMP: PHMP is a concrete and fully specified Mental Poker protocol for the Pohlig-Hellman cipher.

ECMP: ECMP is a concrete and fully specified Mental Poker protocol for an elliptic curve cipher.

MPF Base Protocols

MPF offers four base protocols: VSM-L-OL, VSM-VL, VSM-VPUM and VSM-VL-VUM. The names refer to the different rounds that each base protocol applies to cards. An explanation of the meaning of each letter in the protocol name is provided in Table 1.

TABLE 1

Meaning of Letters in Protocol Names

| Letters | Meaning |
| --- | --- |
| V | Verified |
| L | Locking round |
| O | Open |
| SM | Shuffle-Masking round |
| P | Partial |
| UM | Unmasking round |

Each one of the protocols implements the Properties of embodiments herein described above, and some of them implement the Extended Properties.

MPF Instantiation

To create a specific MP protocol in MPF, the following steps are carried out:

a) Choose an appropriate CGC;

b) Choose one of the MPF base protocol;

c) Choose the verification protocols from the ones offered by MPF (see following section); and d) If desired, create ad-hoc verification protocols targeted to the specific CGC.

Verification Protocols

MPF defines seven kinds of verification protocols:

vp1) Locking Verification Protocol (LVP)

LVP is a protocol that allows a party (the prover) to prove, without revealing the keys, to other parties (the verifiers), that a list of ciphertexts are the encryption of a list of plaintexts, without any permutation. Each plaintext can be encrypted with a different key.

vp2) Shuffle-Masking Verification Protocol (SMVP)

SMVP is a protocol that allows a party (the prover) to prove to other parties (the verifiers) that a list of ciphertexts is the result of the encryption of a list of possibly permuted plaintexts with a single key, without revealing the key or the permutation function. The protocol can also generate a representative. A representative is a pair of plaintext/ciphertext which is produced and broadcast at a certain point in a protocol, and is referenced afterwards to verify a similar operation or an inverse operation.

vp3) Undo Verification Protocol (UVP)

UVP is a protocol that allows a party (the prover) to prove to other parties (the verifiers) that a list of plaintexts is the result of the decryption of a corresponding list of ciphertexts with a single key, without revealing the key. Also the protocol can prove that the key is equal to a previously used key or a product of previously used keys. To reference a previously used key, the protocol requires a representative previously generated. To execute a UVP for product keys, multiple representatives (one for each key) must be transformed into a new single product representative using the sub-protocol Build-Representative. The full UVP protocol is not required in MPF. Nevertheless, representatives are required to enable some advanced protocols, such as Return-Cards-To-Deck, or Card-Key-Verification (which is used to protect the protocol against suicide cheaters).

vp4) Re-Locking Verification Protocol (RLVP)

RLVP is a locking verification protocol of a single encryption, with a single representative. This verification protocol is used in the card protocol Build-Representative to achieve protection against suicide cheaters, for the base protocols for VSM-VL and VSM-L-OL. The base protocol VSM-VPUM does not require this verification protocol.

vp5) Re-Shuffle-Masking Verification Protocol (RSMVP)

RSMVP is a protocol that allows a party (the prover), to prove to other parties (the verifiers), that a list of ciphertexts is the result of the encryption of a list of possibly permuted plaintexts with a single key, without revealing the key or the permutation function. The key used must be equal to a masking key used before, referenced using a representative. This is actually a UVP with a representative, but using an encryption function operation instead of a decryption operation. It is only used in the card protocol Verified-ShuffleRemasking-Round, which is a sub-protocol of Return-Cards-To-Deck.

vp6) Shuffle-Locking Verification Protocol (SLVP)

SLVP is a protocol that allows a party (the prover), to prove to other parties (the verifiers), that a list of ciphertexts is the result of the encryption of a list of possibly permuted plaintexts, without revealing the keys (each encryption can be done using a different key). Shuffle-Locking verification protocols are used by players to shuffle their own hand of cards to protect strategic information, such as the transfer history of the cards, and to avoid card tracking (card protocol Shuffle-Hand(2)). Also, this protocol is used in the card protocol Show-Cards(2), which is an alternate protocol for showing cards.

vp7) Unmasking Verification Protocol (UMVP)

UMVP is a UVP which verifies encryptions with a single key, and no permutation, using only one representative (generally taken from a single shuffle-masking round). This verification protocol is used in the card protocol Verified-Unmasking-Round which is a sub-protocol of Multiple-Cards-Deal, used to deal cards for the base protocol VSM-VPUM only.

Table 2 illustrates certain differences between verification protocols.

TABLE 2

Differences between verification Protocols

| Encryption Type | Permuted | Not Permuted |
| --- | --- | --- |
| Same key | SMVP [can generate a representative] | UVP UMVP [requires |

TABLE 2-continued

Differences between verification Protocols

| Encryption Type | Permuted | Not Permuted |
| --- | --- | --- |
| | RSMVP [requires a representative] | a representative] RLVP [requires a representative] (*) |
| Different Keys | SLVP | LVP [generates many representatives] (**) |

(*) Because RLVP verifies a single encryption, the distinction between Permuted/Not permuted does not apply.
(**) Each LVP plaintext/ciphertext pair is itself a representative.

The foregoing protocols share certain features; accordingly, MPF implements these protocols as calls to a more general protocol, the Unified Verification Protocol, or UniVP, described below. Nevertheless, the implementor can replace a specific verification protocol with an alternate version, based upon performance or security considerations. For example, PHMP performs replacements.

Unified Verification Protocol (UniVP)

A Unified Verification Protocol (UniVP) is the core sub-protocol for all verification protocols. See section "Card Protocols" for a detailed description of the notation used in protocol signatures. Following are the signature definitions, and in Table 3, the notation of the UniVP protocol.

Signature: UniVP (
    private in L:Key-List,
    private in T:Permutation,
    public in X:Card-List,
    public in Y:Card-List,
    public in p:Player,
    public in Permuted:Boolean,
    public in SameKey:Boolean,
    public in RX:Card-List,
    public in RY:Card-List)

TABLE 3

UniVP Arguments

| L | L is a list of keys. Each key has been used to encrypt the element in the list X with the same index. If L has only one element, then the same keys is used for all elements in X. |
| --- | --- |
| T | The permutation applied to X before encryption into Y. |
| X | X is the list of plaintexts. If Permuted = true, the X must be CU. |
| Y | Y is the list of possibly permuted ciphertexts |
| p | p is the player who proves to operation is correct |
| Permuted | if true, allows the cards on the set Y to be permuted, and verifies the correctness of the permutation. |
| SameKey | If true, then the verifier must prove all encryptions are done using the same key. |
| RX | RX is a list of plaintexts used as input representatives If RX is empty, then no representatives are being used. If (SameKey = false) then RX must be empty. If RX is not empty each index must contain a valid plaintext for a privately pre-calculated representative. The protocol verifies that the representatives given are correct (with respect to the masking key in L). |
| RY | The ciphertexts corresponding to each element in RX. |

Note that RX is the list of required (input) representatives, and also the list of produced (output) representatives, because no protocol can have both input and output representatives.

All the verification protocols can be constructed as macro calls to the UniVP:

Locking Verification Protocol (LVP)

Protocol Signature: LVP(Key-List L, Card-List X, Card-List Y, Player p)

Definition: LVP(L,X,Y,p)=UniVP(L, Identity, X,Y,p,false, false, [ ], [ ])

Shuffle-Masking Verification Protocol (SMVP)

Protocol Signature: SMVP (Key m, Permutation T, Card-List X, Card-List Y, Player p, Card-List RX, Card-List RY)

Definition: SMVP (m,T, X,Y,p,RX,RY)=UniVP([m], T, X,Y,p, true, true, RX, RY)

Unmasking Verification Protocol (UMVP)

Protocol Signature: UMVP (Key m, Card-List X, Card-List Y, Player p, Card rx, Card ry)

Definition: UMVP(m,X,Y,p,RX,RY)=UniVP([m], Identity, X,Y,p,false, true, [ry],[rx])

Re-Shuffle-Masking Verification Protocol (RSMVP)

Protocol Signature: RSMVP (Key m, Permutation T, Card-List X, Card-List Y, Player p, Card rx, Card ry)

Definition: RSMVP(m,T, X,Y,p,rx, ry)=UniVP([m], T, X,Y,p, true, true,[rx],[ry])

Re-Locking Verification Protocol (RLVP)

Protocol Signature: RLVP(Key l, Card x, Card y, Player p, Card rx, Card ry)

Definition: RLVP(l,x,y,p,rx,ry)=UniVP([l], Identity, [x], [y],p,false,false, [rx], [ry])

Shuffle-Locking Verification Protocol (SLVP)

Protocol Signature: SLVP (Key-List L, Permutation T, Card-List X, Card-List Y, Player p)

Definition: SLVP(L,T, X,Y,p)=UniVP(M, T, X,Y,p, true, false, [ ],[ ])

LPV, UMVP and SLVP preserve the CU condition of the cards lists. If X is CU then a successful execution of the protocol guarantees that Y is CU, but does not impose that X must be CU as a precondition. SMVP requires X to be CU as a precondition, and a successful execution of the protocol guarantees that Y is CU.

MPF defines three UniVPs:

i) An interactive cut-and-choose UniVP that provides a Perfect-Zero-Knowledge Proof (I-UniVP).

ii) A non-interactive UniVP that provides a computational zero knowledge argument (NI-UniVP). This protocol is obtained from I-UniVP, applying Fiat-Shamir transformation [FLS90].

iii) A fast interactive UniVP, which provides a computational-zero-knowledge argument (FI-UniVP).

The implementor is free to choose the UniVP that suit his needs.

Ad-Hoc Verification Protocols and Malleability

A selected CGC may possess undesired properties, such as malleability, which could reduce the security of MPF. Nevertheless all protocols with the exception of some verification protocols withstand malleability present in the CGC. Verifications protocols such as the ones derived from I-UniVP and NI-UniVP withstand an homomorphic CGC. They also withstand dishonest verifiers. Well show a variation of FI-UniVP that is immune to homomorphic properties of the CGC. For other kinds of malleability, the security may have to be re-proven. If this proof fails, malleability in the CGC may render the UniVP completely insecure or insecure under a CPA. MPF may still be used if the provided UniVPs are replaced with ad-hoc protocols, specially targeted for the specified CGC to withstand malleability attacks. Also, there are other reasons to choose specific verification protocols, such as to increase the performance, or to rely on other widely analyzed protocols, whose security has been pre-established.

MPF Compared to Barnett-Smart

The main differences between Barnett-Smart protocol [BS03] and MPF are:

1. MPF uses a deterministic cipher. On the contrary, Barnett-Smart uses a probabilistic cipher (either ElGamal or Paillier's system).

2. Possibly because of 1, Barnett-Smart does not have a Abrupt Drop-out recovery protocol.

3. Barnett-Smart uses an iterated cut-and-choose protocol to verify encryptions. MPF has a non-iterated protocol (S-VRP-MC$_1$) and also an iterated alternative (e.g. PHMP) that require much less iterations.

MPF Compared to SRA

MPF includes at least four MP protocols, depending on the base protocol. Four variants include VSM-L-OL, VSM-VL, VSM-VPUM and VSM-VL-VUM. Each one of them represents a different balance of performance and security. We believe VSM-VL-VUM and VSM-VL are the most secure, although we were unable to break any of the protocols. The core of MPF can be viewed as a generalization and optimization of the repaired SRA protocol.

The are at least three differences between the MPF and SRA protocols:

a) In MPF each player encrypts each card with a different key, whereas the SRA protocol uses the same key for all cards;

b) In MPF, each codified card is guaranteed to be computationally unique, whereas the SRA protocol does not pose any restriction in the codification of the cards, nor a padding scheme; and c) MPF cannot suffer from information leakage problems (e.g. quadratic residuosity) of the card codifications because it poses restrictions on the quality of the CGC by definition.

Keys Lifetime

All encryption keys are chosen for each game, and are disposed afterwards. This ensures that the information leakage due to the computational nature of MPF security is kept to a minimum. Other cipher internal parameters (such as a common modulus) can be either fixed for long periods or generated for each game, depending on the computational cost of creating a new set of parameters. If some parameters are fixed, then they must be standardized and publicly scrutinized for trap-doors.

Open Cards Lifetime

Before shuffling, real cards values are specially encoded in bit-strings known as open cards or O-Cards. Open cards are chosen in a manner whereby no O-Card is an encryption of another O-Card. Also, all card values used during a game are rooted in one of the open cards, meaning that each card value can be traced back to an open card with a series of encryptions with player secret keys, although this doesn't mean that this trace is publicly available.

No player can bring his own deck of O-cards to play, because there is no easy way he can prove he doesn't know the conversion keys. Nevertheless, a player could bring a deck created by a publicly verifiable method (such as taking digits of phi as card values). Also, he could forward a deck created by a trusted authority (a TTP). This last scheme allows a marked deck to be used, so a central authority, such as a game operator, can track collusion of players by looking at the game transcript, but without interfering with the protocol on-line.

For maximum protection, and to protect the players from information leakage, we recommend that the deck is created by the players for each new game. If this represents a performance problem, the deck could be reused in multiple games, as long as the players are the same. Also, if a new player joins a game, the previous deck can be re-randomized (along with a proof of correctness) by that new player only.

Encoding of Open-Cards

To obtain a deck with CUOC properties, open card values will be obtained by a protocol P that satisfies these requirements:

the output of P is a list of open card values;

each party must take part in P, either by doing some computations or by providing a seed-share to some function;

no proper subset of the parties should be able to repeatedly and privately evaluate the output of P in any intermediate stage of the protocol and use that information to modify their own computations or their seed-shares that contribute to the output of P; and the output of P should be pseudo-random as long as one of the parties is honest and chooses random values when required.

We'll call such protocol a Collaborative Pseudo-Random Number Generator Protocol (CO-PRNGP). A CO-PRNGP be realized by using at least one of these three computational methods:

cm1) Verifiable pseudo-Random functions (VRFs), Distributed Pseudo-Random functions (DPRFs) or Distributed Verifiable Random Functions (DVRFs) [MRV99][Lys02].

cm2) A Hash-based approach: guarantees that no proper subset of the players can force the output values to be biased or chosen, under the random oracle model.

cm3) A locking round (see following section), which guarantees all open cards are rooted back to a single initial card, but assures the conversion key is shared among the players in such a way that no proper subset of the players can recover the key.

VRF-Based CO-PRNGP

To build a VRF based CO-PRNGP each player i creates a personal VRF f, and publishes the public parameters. A public variable d is used to count the number of decks created. Each time a new deck is required, each player publishes $x_i=f_i(d)$ along with a proof that verifies the correctness of the computation. All outputs $x_i$ are xor-ed to create a seed for a public CSPRNG, whose output is used to build the o-card values.

Hash-Based CO-PRNGP

With reference to FIG. 2, the hash-based method is diagrammed. To build a hash-based CO-PRNGP, we split the protocol into two stages 200, 202. In the first stage, each party commits to an input, and then all inputs are revealed. In a second stage, a special cryptographically secure pseudo-random number generator (CSPRNG) 206 is used to compute the pseudo-random sequence required. This generator advantageously takes a variable number of inputs as seeds. Each party should take care that the input seed provided is unpredictable by the other players. It is advantageous to use true physical random bits. If unavailable, then a suitable replacement, such as a CSPRNG with a large pool, should be used (as in Yarrow or Fortuna) to compute the seeds. Better PRNGs can be constructed from one-way functions [GGM86, HILL99] and by well studied number-theoretic assumption (such as the Blum Blum Shub PRNG). A popular such construction is due to Naor and Reingold [NR97], and is based upon the decisional Diffie-Hellman (DDH) assumption. To approximate a CSPRNG with a multiple number of seeds, we concatenate all the seeds in a fixed order to form a message, and then hash the message, using a cryptographically secure hash function. The resulting hash 204 is used as the CSPRNG seed.

MPF Rounds

In MPF most of the steps are done in rounds. A round can be of one of at least three kinds: Shuffle-Masking (SM), Locking (L), and Undo (U). Also, rounds can be verified (by MVP, LVP or UVP) or unverified. Shuffle-Masking rounds always precede locking and undo rounds, with the exception of a locking round performed to create cards encodings. Masking rounds are always verified. Rounds can be complete (all players publish their output) or partial (the last player to compute does not reveal the result). Masking rounds are always complete rounds. For simplicity, MPF does not directly use the undo round but defines two other rounds: UnLocking (UL) and Unmasking (UM). Unlocking is an undo round of a single locking round. Unmasking is an undo round of a single shuffle-masking round.

Rounds Description

Shuffle-Masking Round:

With reference to FIG. 3, in a Shuffle-Masking round (SM), each player, indicated in FIG. 3 as "Agent 1", "Agent 2", "Agent n", encrypts 304 (with a single key per player 302) and permutes 300 all the input cards. The output of a masking round is a set of masked cards or M-Cards. Masking rounds are always verified.

Figure 4:
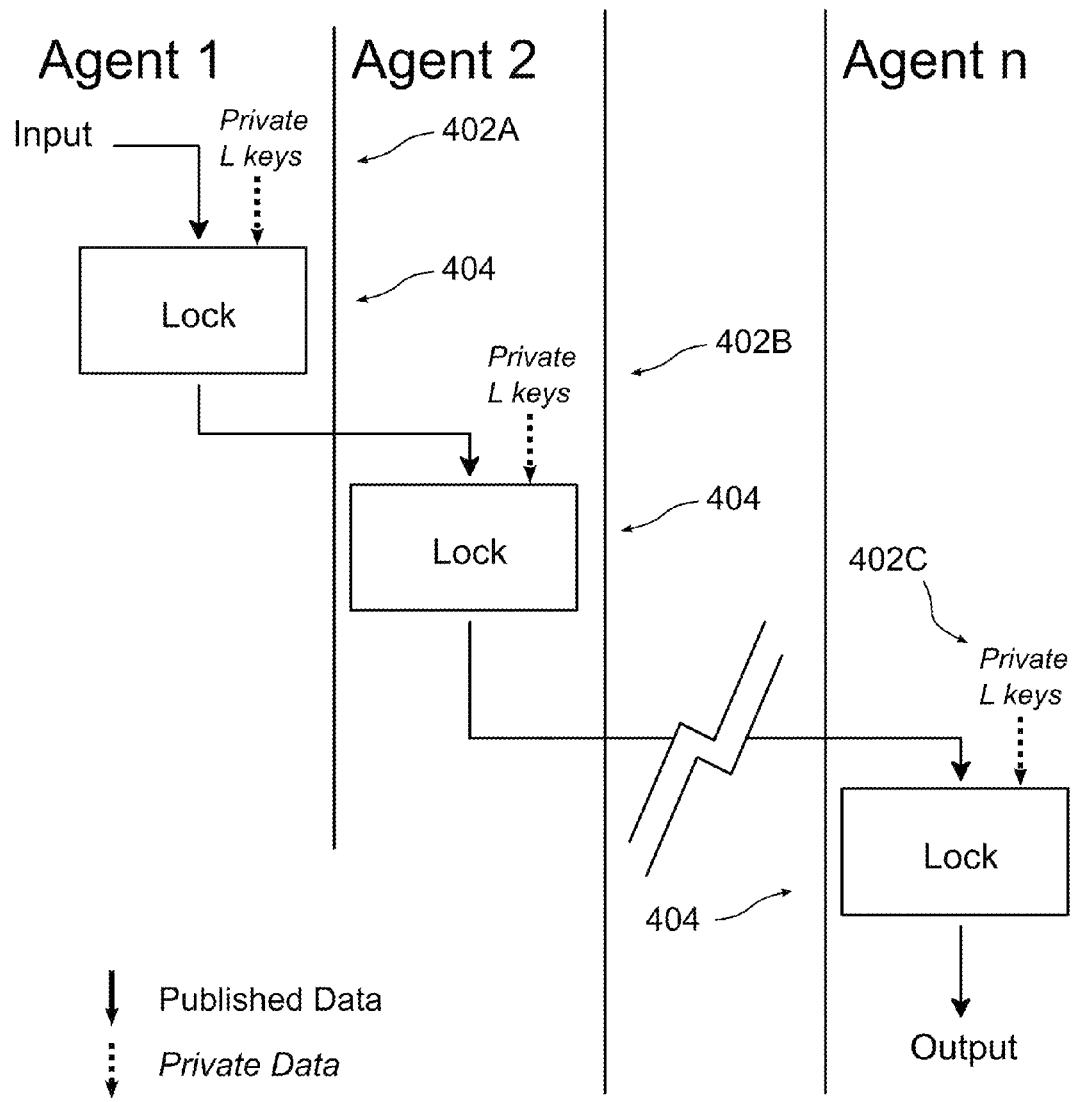
FIG. 4 is an illustration of a locking round in accordance with an embodiment.

Locking Round:

With reference to FIG. 4, in a locking round (L), each player, indicated in FIG. 4 as "Agent 1", "Agent 2", "Agent n", encrypts each input M-card 404 with a different private key 402A, 402B, 402C. Masked and locked cards are called ML-Cards (no matter how many locking/rounds have been carried out).

Figure 5:
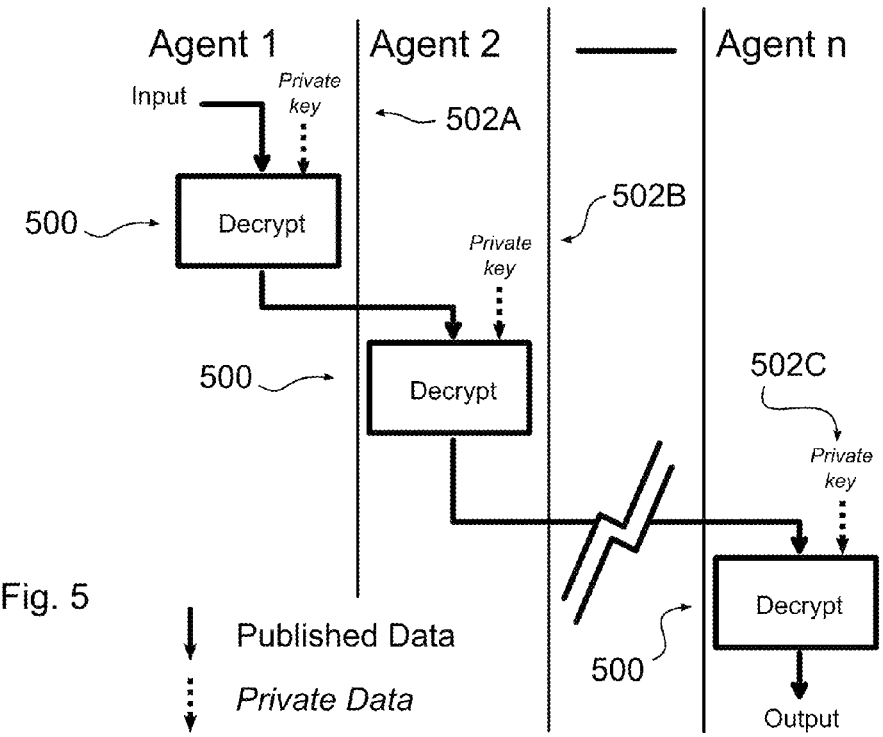
FIG. 5 is an illustration of an undo round in accordance with an embodiment.

With reference to FIG. 5, in an undo round (U), each player undoes the encryptions 500 previously done to each input card in a set of rounds S. The protocol specifies the set S. The implementation must track which keys 502A, 502B, 502C apply to which cards, to undo locking rounds.

Undo rounds can be complete (all players publish their output) or partial (the player receiving the card undo last, and the output of the last player computation, is not revealed).

In VSM-L-OL, there are 3 rounds, VSM, L1, and OL2. The last round is an "Open" round. An open round is a round which is verified, but only at the end of the game. In VSM-VL, there are only two rounds, VSM and VL. In VSM-VPUM, there are two rounds, VSM and VPUM, where VPUM is a verified partial unmasking round. In VSM-VL-VUM, there are three rounds, VSM, VL, and VUM.

Free Cards

When a card is dealt, an encrypted card is taken from the deck. This is called a Free Card or F-Card. Each player takes note of who is the holder of each F-Card, and this information is kept in a table within each player's computer memory (the Card-Holder table). To allow card exchanges, sometimes, F-Card bit strings are disposed and new ones generated. Therefore each player must keep a dynamic mapping for F-Card holders.

Any player can shuffle his own hand cards to erase any trace between the F-Cards that were given to him and a new set of F-Cards. During the shuffle, each other player disposes the old F-Cards in the Card-Holder table and adds the new F-Cards. There are two types of hand shuffles:

a. Single key shuffle (using a protocol similar to a single player shuffle-masking operation)

b. Multi key shuffle (using a protocol similar to a single player locking operation).

A single key shuffle is verified by an SMVP. A multi key shuffle is verified by an SLVP.

The reason to have two different protocols is that an SLVP can be considerably faster than SMVP, depending on the number of players, the number of cards to shuffle, and the UniVP selected.

Card Keys

The key that results from the product of a masking key and all locking keys applied to a single player to a certain card is called the Card Key. When a card is dealt, the card ends up encrypted with each player's card key. Generally, the player receiving a card keeps his card key secret, while all the others must publish them. Multiple encryptions allow players to publish a card key without revealing the masking key. Because each card key can be decomposed as a key pairs or triplets, in as many or more ways as keys in the key-space, the masking key remains secure even of the card key is published.

Card Dealing

There are two methods to deal a card to a player:

a) Key Share Disclosure Method

Figure 6:
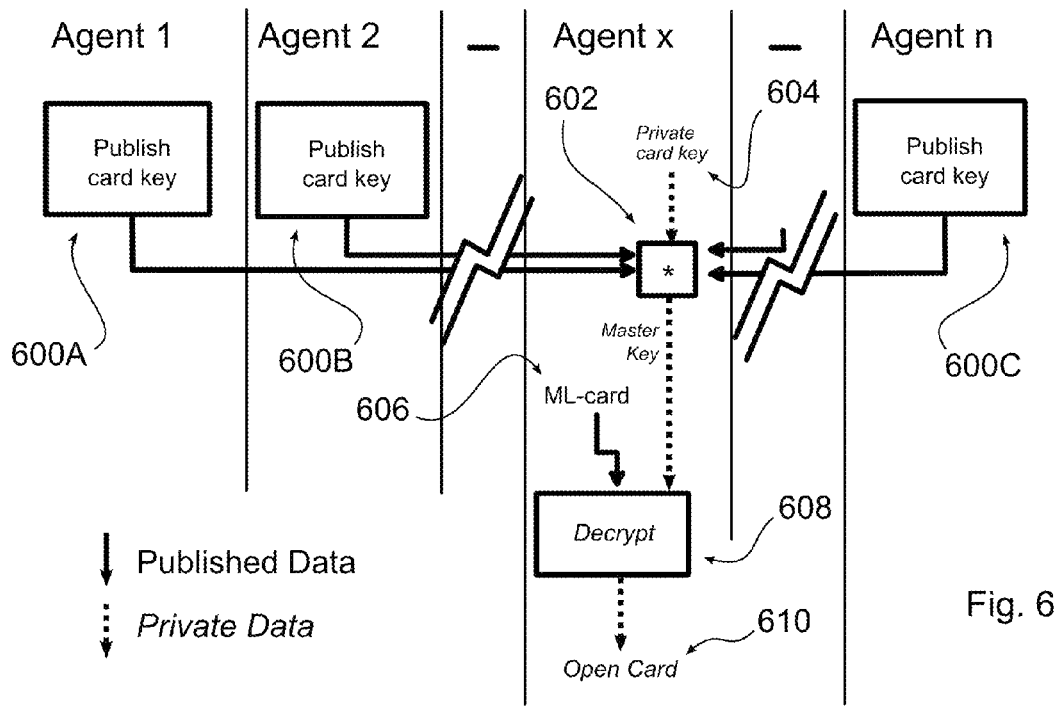
FIG. 6 illustrates how agents interact to deal a card to player x under the Key Share Disclosure method in accordance with an embodiment.

The diagram of FIG. 6 illustrates how agents interact to deal a card to player x under the Key Share Disclosure method. To open an L-card/ML-Card, all the players except the one receiving the card publish the Card Key 600A, 600B, 600C, which is the product (in G) of all locking and masking keys which haven't been undone. The player receiving the card computes a master key 602, which is the product of the published card keys with his secret card key 604 (calculated in the same way). The original L-card or ML-card 606 becomes a new F-card for that player, and the card is taken out from the deck. The F-card is privately decrypted 608 by the player to get an open card 610.

b) Partial Undo Method

Figure 7:
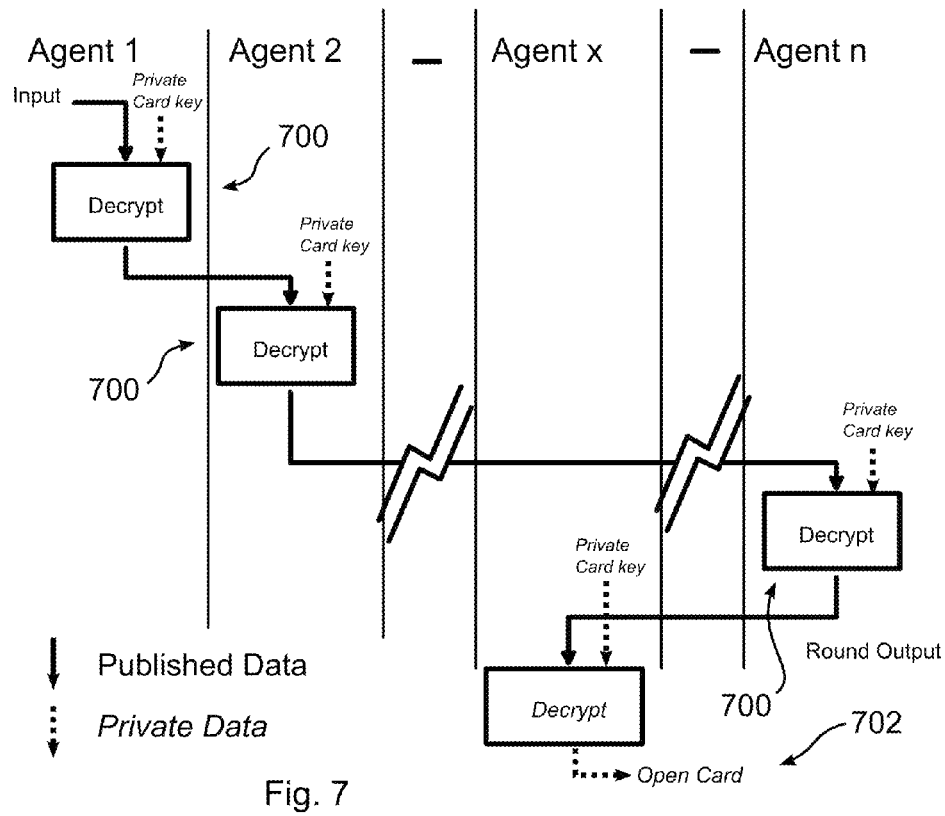
FIG. 7 illustrates how agents interact to deal a card to player x under the Partial Undo method in accordance with an embodiment.

The diagram of FIG. 7 illustrates how agents interact to deal a card to player x under the Partial Undo method. Players do a partial undo round for the set of rounds that remain to be undone for the cards to be dealt. This is achieved by a series of decryptions 700. The player receiving the card must be the last in the round. The input cards to the last player in the round are new hand cards 702 for that player (new F-cards). All undo operations must be verified.

Master Card Keys

The set of all card keys for a given F-Card are again multiplied by the player receiving the card, creating a Master Card Key for that card. Only the player who is receiving the card can compute the master key, because he is keeping his own card key secret. When a showdown takes place, he can show the master card key to prove its authenticity. Because the underlying cipher is resistant to chosen plaintext attack, a player has no way to compute a valid master key that decrypts a fully encrypted card to an O-Card without going through the dealing protocol.

Unverified Computations

In VSM-VL, VSM-VPUM, and VSM-VL-VUM, all rounds are verified so cheating cannot occur due to adulterated computations. VSM-L-OL verifies the shuffle-masking round immediately, as in the other protocol verified rounds, but does not immediately verify the following locking rounds. The locking rounds are verified at the end of the game. Adulterated computations can occur during the locking rounds, so suicide cheating is possible. Nevertheless this fact does not decrease its core security and its ability to identify the cheater.

Card Transfers

If a player wants to give a card to another player, he publicly sends the F-Card and privately sends the master key. All players must log who is the new holder of the F-Card, because only the holder of an F-Card can ultimately show its associated open card.

Suicide Cheaters

Because of the partial unmasking round in VSM-VPUM, this protocol easily provides protection against suicide cheaters: every operation can be immediately verified.

On the contrary, in VSM-L-OL, VSM-VL-VUM and VSM-VL, card keys are published during a deal. These card keys cannot be directly verified. The card holder can detect cheating if the master key obtained cannot correctly decrypt the free card into an open card. If the card holder suspects cheating, then a Card-Key-Verification protocol must be executed. The Card-Key-Verification protocol is just an UVP for the shuffle-masking and locking rounds (with product keys). The card key verification protocol can detect who is cheating without asking for a full private keys disclosure.

The protocol VSM-L-OL does not resist a suicide cheater willing to change his own cards, in the general case.

VSM-VPUM Trick

In VSM-VPUM there is no locking round during the shuffling phase. The Shuffling phase consists of only a shuffle-masking round. A partial unmasking round is done when a card needs to be dealt, and all players except the card holder sequentially unmask the card until they compute the free card which is the last published output of the round. The holding player masking key for that card becomes the free card decryption key (Master key). Because masking keys cannot be published without disclosing all private information, these free cards should be tagged by the holder as "private key". To show a "private key" free card, the card holder can do one of two things:

Use an LVP from the O-Card to the F-Card; or

Re-encrypt the F-Card into a new F-Card and publish the new F-Card. This operation must be verified by a LVP, then the new free card master key can be published.

Also note that after a hand shuffle, "private key" cards are disposed and new "non-private key" cards are created, so a hand shuffle before showing cards may suffice.

In VSM-VPUM, the unmasking round cannot be pre-computed, while in VSM-VL-VUM, it can.

VSM-L-OL, The Fastest Dealing Protocol

VSM-L-OL is a protocol specifically optimized for static games.

A static game is a game where:

a. There are no card transfers;

b. There no need to hide the dealing order of a card when it's shown; and c. The game ends with a showdown of some of the players' hand cards.

An example of a static game is Texas Hold'Em.

We'll say that a player outputs an adulterated card value x, if x cannot be obtained by the normal execution of the steps in the protocol in the MPF security model. In VSM-L-OL, the locking rounds are not immediately verified. Any player can provide an adulterated value as if it were a result of his computations during the locking rounds. Any adulterated card value will be detected during the game when a player tries to decrypt the card and it decrypts to an invalid O-Card. A player receiving an invalid card must request all players to execute a card key verification protocol and then the cheater will be inevitably detected (or the player having raised a false alarm). A cheater may go undetected in the game if:

The adulterated card was never dealt;

The adulterated card was dealt to the same player having cheated, or to a colluding player, and that player kept the adulterated card in his hand, or transferred it to a colluding player, but the card was not shown during the game.

In either case, the adulteration cannot give the malicious players any advantage, and on the contrary, can be a disadvantage, and the adulteration cannot any have measurable consequence for the rest of the players.

Assuming the verification operations are the most time consuming, VSM-L-OL can achieve the lowest possible latency from the start of the game to the showdown, on a static game: only one verified encryption is required per card.

And as in VSM-VL and VSM-VL-VUM, shuffling can be pre-processed so the each dealt card requires only that players publish the card key, with no computing taking place.

The VSM-L-OL base protocol is protected against suicide cheaters for static games. For other kinds of games, the protocol is not protected from suicide cheaters willing to change their own cards and possibly transfer the cards to other players. The cheating will be detected at the end of the game.

Card Deal Preparation Phase

In VSM-L-OL, VSM-VL and VSM-VL-VUM, dealing can be pre-processed so that each card dealt requires only that a subset of the players publish their keys, with only one decryption taking place. Theses protocols include a "Card Deal Preparation Phase". Each card to be dealt requires a preparation phase. All cards, or a subset of cards, can be prepared just after a shuffle, and some others delayed until a new cards need to be drawn.

There are situations where this can be a great advantage:

a. if a certain set of cards in the deck will always be dealt, then those cards can be prepared along the shuffling protocol. This can improve network bandwidth use because the preparation of the cards can be done simultaneously for each player, reducing the number of packets transferred—afterwards dealing is a constant time for the prepared set of cards; and b. if players know in advance they are playing multiple games together, multiple shuffles (including shuffle-masking and locking rounds) can be pre-computed.

Card Showdowns

To show a card is to reveal the open-card value associated, and to prove that the card was legally dealt. A player can show a card by two methods:

a) publishing the master key used to decrypt the F-card to an open card, but only if the key is not also a masking key); and b) Using an LVP or UVP to prove that an F-card can be decrypted to a specific open card, without revealing the key.

Advanced Card Operations

VSM-L-OL, VSM-VL and VSM-VL-VUM provide advanced card operations, such as to put a card back into the deck and re-shuffle the deck. A set of free cards can be put back in the deck by a sequence of operations. First the deck is re-masked. Then the master-key for cards to return to the deck is changed to the new masking key (all cards share a single key again). Afterwards, those cards are re-masked by the remaining players, with the last masking key. Then the cards are appended to the deck. Finally, the deck is re-shuffled to destroy any trace of the transferred cards. An alternative is to use a variation of the abrupt-drop-out protocol, with no player leaving the game, but without claiming ownership of the cards to return to the deck.

Abrupt Drop-Out Tolerance

VSM-VL and VSM-VL-VUM provide abrupt drop-out tolerance. To recover from a drop-out, players execute a recovery protocol. The recovery protocol shuffles the original deck with the same masking keys but without the masking done by the player who dropped out. Then, each player can veto the cards that are in his hand. The vetoed cards are removed from the new deck, leaving only the cards that were never dealt, and those which were in the quitting players hand. The protocol time complexity is O((d+c)*n) (for non-interactive verifications) where d is the number of cards dealt, c is the number of cards in the deck and n is the number of players. The protocol requires the calculation of recovery sets. Recovery sets can be pre-computed after shuffling, but after a player drops-out, a new recovery set must be calculated.

The computations of the protocol can be reordered in a binary tree structure to provide a slight performance gain when the number of cards is distributed in a non-uniform ways between the players.

Note that when using multiple dealing decks, an abrupt recovery does not reestablish the same distributions of cards into those decks. Cards must be split into those decks again, so any information a player may have gained regarding cards that where present in certain decks is lost.

Figure 15:
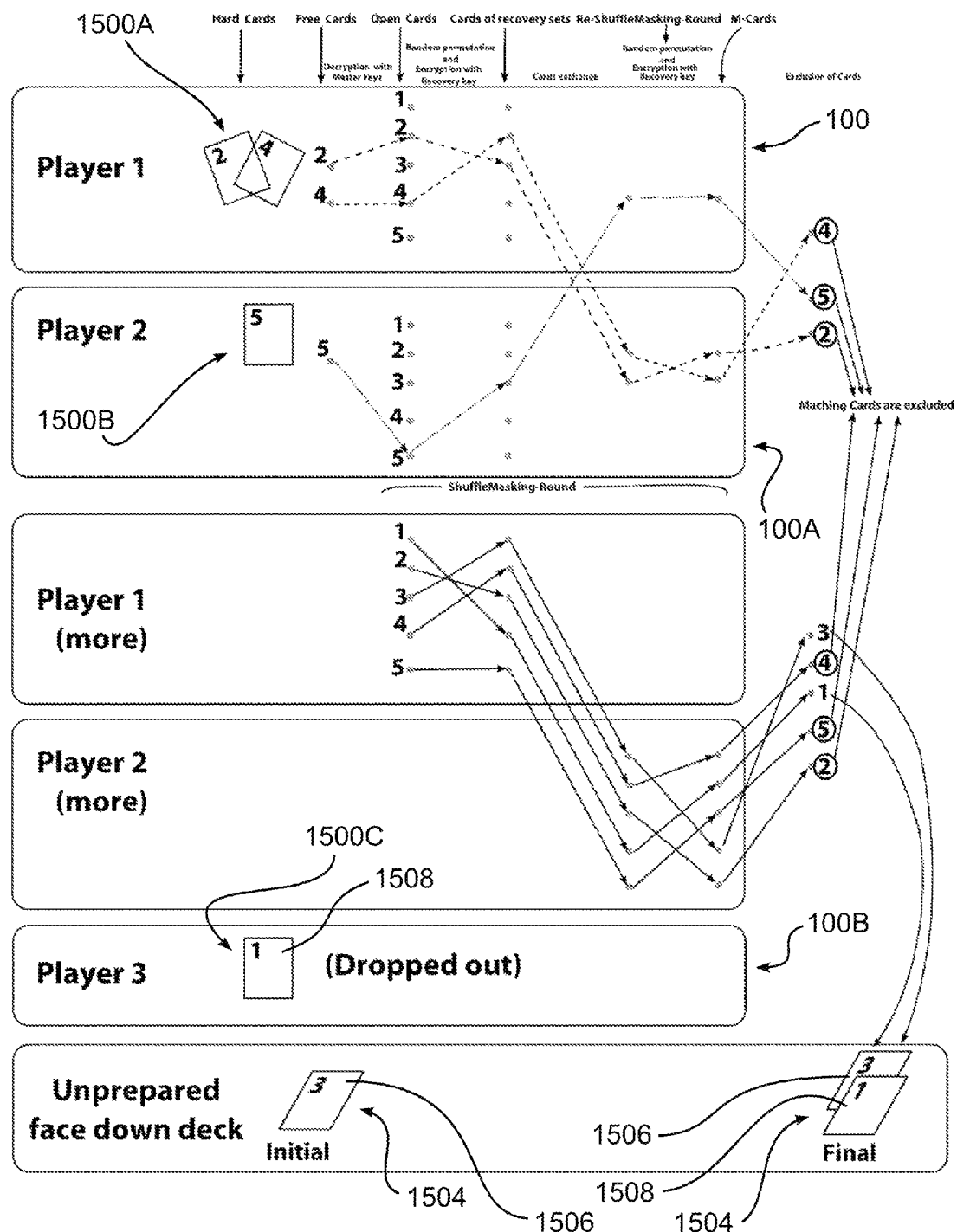
FIG. 15 depicts a sample execution of an abrupt drop-out recovery, in accordance with an embodiment.

With reference to FIG. 15, a sample execution of Abrupt Drop-out-recovery is illustrated, where two players 100, 100A, through their respective agents 104, 104A, act to recover from an abrupt drop out of a third player 100B, where player 1 has 2 cards in his hand 1500A, player 2 has only one card in his hand 1500B, player 3 had 1 card in his hand 1500C before dropping out, and there is a single card 1506 left in deck 1504. After drop-out recovery, deck 1504 contains two cards (card 1506 that was in the deck before and card 1508 that was in player 3's hand)

Duplicated Cards

Duplicated cards are cards which represent the same value. When you buy two equal card decks, then each card will be duplicated. As stated before, having a deck with duplicated cards is useful for some cards games and advanced protocols. The easiest way of working with duplicate cards in MPF is by making a set of distinct cards represent the same logical value. Note that is not the same of having exact copies of the same card. Every time you show a duplicated card, the remaining players will know which clone of the card value is being shown, so duplicates leave a trace. If you transfer a card, then the receiving player will also know which clone is it. An improvement is to follow this protocol:

At the beginning of the game, for each card value v which has duplicates, players create an open deck $Dk_v$ of distinct cards which represented the same value (v), which be call the source deck of value v.

To prove ownership of a duplicated card c without revealing any trace, a player creates a set R by a verified-shuffle-masking of the source deck $Dk_v$ with a new private masking key. Then proves that c can be encrypted to the card in R whose open-card matches c.

With this protocol, duplicate cards can be shown without leaving traces but still card transfers tell the receiver the card clone used. To archive true untraceable duplicate cards, we create the DMPF protocol. DMPF requires the creation of source decks for all cards values, even if there is just one clone of a value. The DMPF protocol works exactly like MPF, with the exception of the card transfer sub-protocols. When a set of cards needs to be transferred, the player owning the cards creates a new deck of cards. The process is called regeneration of the deck, each new deck of cards is called a generation and the player creating the generation is called the creator. To regenerate the deck, the creator must mask every card in the game with a new private regeneration masking key. This includes cards that are on face down decks, source decks, cards on other player's hand and face up in the table. Each source deck is independently shuffled along with the masking operation. The cards in the creator's hand can also be shuffle-masked. The number of cards masked should be two times the number of cards in the game. The masking operation is verified by all the remaining players, and each player replaces the F-card values with the new ones generated. Because the source decks have been masked with the same regeneration key as the F-Cards, each new F-card will decrypt to a valid card of the new generation when decrypted with the private master key that decrypted the previous F-card to a card from the previous generation. Also, both new and old cards should belong to the same source deck. The card values of the previous generation should be disposed and should never appear again afterward. The regeneration key can also be disposed by the creator. After a new generation is created, any number of cards can be freely transferred as in standard MPF from the creator to the remaining players, as long as no other player is willing to transfer cards. Because the creation of a generation is expensive compared to the simplicity of card transfers in standard MPF, it is advised to choose DMPF over MPF only if hiding duplicated card traces is of extreme importance.

To create one or more duplicate cards on the fly, players must jointly choose new open card values using any protocol as CO-PRNGP, and the new card values are appended to the corresponding source decks. Afterward every player creates a generation in turns. Also, during the drop of recovery protocol, just before the new deck is generated, each player should regenerate the cards (but is not necessary to regenerate the cards in the deck, because it will be disposed anyway).

DMPF for Small Scale E-Cash

One direct application of DMPF is to use it as an e-cash protocol for situations where all participants are online. Each bill amount is a card value. For example, we can choose bill amounts of 1,5,10,50, 100 and so on. Each party act as buyer or seller but can also be part of the Mint, generating and distributing new bills. To generate bills of a certain amount, parties create new decks of duplicated cards which represent the bill amount. To transfer bills between parties, we execute the same protocol used to transfer cards. Note that this protocol is only partially anonymous, because all parties know which parties are buying or selling with whom, although the amounts transferred remain unknown. To achieve true perfect anonymity, the protocol is extended. First, bills of zero amount, called dummy bills, are generated in a number equal to the remaining non-zero bills and uniformly distributed between parties. Second, every certain amount of time, the Full Exchange protocol is executed. During the Full Exchange protocol, each player, in turns, regenerate the deck and transfers one or more bills to each of the remaining players. The bills can be dummy bills if the two parties are not doing business together, or bills of non-zero amount if they are. In DMPF implemented over VSM-VL bill transfers are very fast, and do not require any interactive proof protocol, but the regeneration of the deck is expensive. An alternative is that, instead of periodic Full Exchange executions, only when a party wants to transfer money it executes a Partial Exchange protocol, where only that party regenerates the deck and transfers bills. With this variation, all parties will know when a party is transferring money, though the destination and amount of money transferred remains secret. Also any party can hide the fact that is not transferring money, by periodically executing a Partial Exchange using sending all dummy bills.

Real World CGCs

There are many choices to select a CGC:

Pohlig-Hellman symmetric cipher

Massey-Omura

Pohlig-Hellman symmetric cipher on elliptic curves or any other group.

RSA or other factoring based cryptosystems in any group.

Pohlig-Hellman symmetric cipher over:
    The subgroup of kth residues modulo a prime p, where $(p-1)/k$ is also a large prime (a Schnorr group). For the case of k=2, this corresponds to the group of quadratic residues modulo a safe prime.
    The set of quadratic nonresidues modulo a safe prime.
    Exponentiation over any Galois field where DDH assumption holds.

Note that the listed cryptosystems are malleable, so modified protocols, as shown in section 7, must be used.

MPF Formal Definition

We'll define abstract classes and operations an MP protocol based on MPF should implement.

Definitions

N: The number of players.

C: The number of cards in the deck.

H(x): a binary string that is a cryptographic hash of the message x.

CSPRNG: A cryptographically secure pseudo random number generator.

$E_k(x)$: The symmetric encryption of plain-text x with key k.

$D_k(y)$: The symmetric decryption of cipher-text y with key k.

Types

Block: A binary value suitable for encryption/decryption with the CGC.

Plain-text: a Block that is provided for encryption.

Cipher-text: a Block that is the result of an encryption.

Key: a binary value suitable to use as a key for the CGC.

Card: A Card is a bit string which represents a real card either encrypted or by a known mapping.

Open Card or O-Card: An open card is an public bit string which uniquely maps to a real card of a deck. Each open card must be distinct.

Group Encrypted Card: A group encrypted card is a card encrypted by a key shared between some players, but each player has only a fragment of the group key. The decryption process requires the same players to participate. Because the underlying cryptosystem is commutative, group encrypted cards are obtained by sequentially encrypting the card by each player with each player's secret key. A card encrypted by only one player is already a group-encrypted card.

Masked Card or M-Card: A masked card is a group encrypted card that was obtained sequentially encrypting with each player masking key. Each player has one masking key used for all encrypted cards.

Locked Card or L-Card: A locked Card is a group encrypted card, encrypted sequentially with the locking keys. Each player must pick a locking key for each card of the deck.

ML-Card: A Locked and Masked card.

Complete M/L/ML Card: A complete M/L/ML card is a M/L/ML-card where all the players in the game have taken part on the encryption process.

Free Card or F-Card: An card which has been dealt to a player.

Master key: A key that decrypts a free card into an open card.

Card Key: The product of all locking keys and masking keys used to encrypt a card specific card. A card key represents the share of the master key for a specific card that a player has.

A deck: a list of Cards, either Open, Masked or Locked.

A hand: a set of locked/masked/ML cards received by a player, whose values are public (F-cards) and whose associated open cards are known to the player holding the cards.

Representative: A pair (p, c) for which p is any value and c is p encrypted with the key k. Representatives are used for the verification of decryption rounds and ML keys.

Definition: Representative=record {p,c:Card}, where $E_k(p)=c$

Player: An integer value that uniquely identifies each player.

Round Number An integer value that uniquely identifies each round.

Private Data Structures

Card-Holder: a data structure that maps every F-Card to a player or the main deck (if the card is not mapped). Definition: Card-Holder:(Map[F-Card]→Player)

Card-Trace: a data structure that maps a round number and a round output card to the index of the card in the round input output/list. It's only used in VSM-L-OL at the end of game. Definition: Card-Trace:(Map[Round number, F-Card]→Index)

Master-Key: a data structure that maps encrypted cards to the key which is able to decrypt them to open cards. Normally, maps ML-cards to the unlocking and unmasking composite key. Definition: Master-Key:(Map[F-Card]→Key)

Mask-Key: a variable which holds the last used masking key. Definition: Mask-Key:Key Recovery-Set-Key: a variable which holds the last recovery-set masking key. Definition: Recovery-Set-Key:Key Recovery-Set: a structure which identifies each players recovery set. Definition: Recovery-Set:(Map[Player]→Card-List)

Lock-Key: a data structure which maps a protocol round number and a card index to locking keys. Definition: Lock-Key:(Map[Round number,Integer]→key)

Card-Key: a data structure which maps ML-Cards to card keys (product of all masking and locking keys previously used to encrypt this card for a single player). Definition: Card-Key:(Map[ML-Card]→key).

Main-Deck: A Variable which holds the main deck.

Mask-Representative: a data structure which holds the representative of the last shuffle-masking round for each player. Definition: Mask-Representative: (Map[Player]→Representative)

Recovery-Mask-Representative: a data structure which holds the representative of the recovery shuffle-masking round for each player. Definition: Recovery-Mask-Representative: (Map[Player]→Representative).

Lock-Representative: a data structure which holds the representative of the a locking round number, for a certain index, for each player. Definition: Lock-Representative:(Map [Round number, Player, Integer]→Representative).

Open-Deck: a list of cards which contain all the open-cards generated.

Miscellaneous Operations

RandomNumber(x:Integer)→bit string: returns a random bitstring of bit-length x.

RandomPermutation(n:Integer)→Permutation: returns a permutation of the integers from 1 to n.

RandomCardValue( )→Card: returns a random bitstring suitable as a plaintext for the underlying CGC.

Identity(n:Integer)→Permutation: returns a the identity permutation of the integers from 1 to n.

RandomPermutation(n,k:Integer)→Permutation: returns a permutation of the integers from 1 to n, where the first (n-k) elements are randomly permuted and the last k are not.

RandomKey( )→Key: returns a random bitstring suitable as a key for the underlying CGC.

CreateBlock(binary string x)→Block: creates a valid block that contains the binary string x or a cryptographic hash of x if x is too long to fit into the card.

RandomKeys(count:Integer)→Key-List: returns a list of "count" random bitstring suitable as a keys for the underlying CGC.

CreateCard(binary string x)→Card: similar to CreateBlock.

Product(collection:expression:Key)→Key: Multiply all key values that result from evaluating each expression from the collection given.

Union (collection:expression:Card)→Card-List: Returns a list which is the union of the lists that result from the evaluation of each expression from the collection given.

X:Card-List-Y:Card-List→Card-List: Returns a card list of all the elements in X that are not included in the list Y.

Operations on Cards

The card operations transform one bit string representing a card (either Open, Masked or Locked) into other bit string representing other type of card. Card operations are private and involve one participant.

LockCard(c:Card, k:Key)→Locked-Card
Lock a card with the player key k.
LockCard(c,k)=$E_k(c)$
EncryptCards(X:Card-List, k:Key)→Masked Card-list
Encrypts with the key k each card of X.
for each s (1<=s<=#X), EncryptCards(X,k)[s]=$E_k(X[s])$
LockCards(X:Card-List, K:Key-List)→Locked Card-list
Encrypts with the key K[i] each card of X[i].
for each s (1<=s<=#X), LockCards(X,K)[s]=$E_{k[s]}(X[s])$
DecryptCards(X:Card-List, k:Key)→Card-list
Decrypts with the key k each card of X.
for each s (1<=s<=#X), DecryptCards(X,k)[s]=$D_k(X[s])$
PermuteCards(X:Card-List, F:Permutation)→Card-list
Permutes the cards in X with the permutation function F.
for each s, PermuteCards(X,F)[s]=X[F(s)]
IsPermutationOf(X:Card-List, Y:Card-List)→boolean: returns true if X is a permutation of Y. There exists a permutation F, such as Y=PermuteCards(X,F).

IsPermutationOf(X:Card-List, Y:Card-List, fixed:Integer)→boolean: returns true if (#X=#Y) and the first (#X-fixed) elements of X are a permutation of the first (#Y-fixed) elements of Y and the last fixed elements of X are equal to the last fixed elements of #Y.

IfThenElse(cond:Boolean; T:Expression, E:Expression)→Expression: returns T if cond=true, otherwise returns E.

SORT(X:Card-List, fixed:Integer)→Card-List: returns a list which has the first (#X-fixed) elements of X sorted lexicographically, and maintains the last fixed elements in place.

SORTPERM(X:Card-List, fixed:Integer)→Card-List: returns a permutation function which, when applied to X using the PermuteCards, results in a list which has the first (#X-fixed) elements of X sorted lexicographically, and maintains the last fixed elements in place.

InversePermutation(F:Permutation)→Permutation: returns the inverse permutation of F.

ShuffleMaskCards(X:Card-List, k:Key, F:Permutation)→Masked Card-list
Encrypts with the key k each card of X, and then applies permutation F on the resulting list.
for each s, ShuffleMaskCards(X,k,F)[s]=$E_k(X[F(s)])$)
UnLockCard(c:L-Card, k:Key)→Card
Unlocks a card c with the key k.
UnLockCard(c,k)=$D_k(c)$
UnMaskCard(c:M-Card, k:key)→Card
Unmask a card with the key k.
UnMaskCard(c,k)=$D_k(c)$
OpenCard(c:F-Card, k:Key)→Card
Decrypt a card with the key master key k.
OpenCard(c,k)=$D_k(c)$ Note that UnLockCard, UnMaskCard and OpenCard implement the same operation, and are defined separately as a means to guarantee a precondition on the classes of cards accepted as input (Masked, Locked or Free).

Introduction to MPF Base Protocols

We'll first show the four MPF base protocol graphically, along with the pros and cons for each protocol. Base protocols specify the way cards are shuffled, dealt and opened.

An MPF game has up to 5 main stages:
1. Shuffle: All cards are shuffled.
2. Deal Card Preparation: A subset of the cards can be prepared to be dealt very quickly. This stage can be executed along the shuffle stage, or delayed until a card needs to be dealt, or a mixture of both.
3. Deal Card: A card is dealt to a specific known player.
4. Prove Ownership: A card is opened and the player who was holding the card proves it is legitimate.
5. End of Game: Some additional verifications takes place to assure an honest game has taken place.

Stages 2-4 can be repeated or interleaved with other card operations, such as card transfers.

VSM-L-OL

Figure 8:
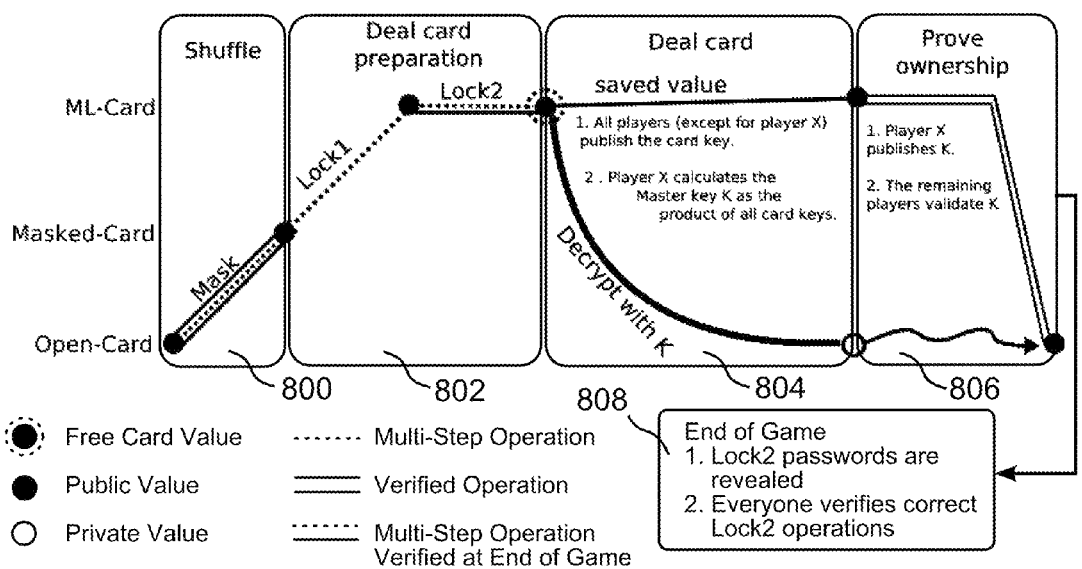
FIG. 8 illustrates a VSM-L-OL protocol, in accordance with an embodiment.

FIG. 8 illustrates the VSM-L-OL protocol, discussed further below, which includes the following a stages: shuffle 800, deal card preparation 802, deal card 804, prove ownership 806, and end of game 808.

Pros:
Only one verification round is required;
fastest variant for static games;
provides advanced card operations;
all free cards are equally treated; and
protection is provided for suicide cheating, for static games.

Cons:
For non-static games, the protocol is not protected against suicide cheating.
Is not abrupt drop-out tolerant.

Security Proof (Simplified)

Any player can provide adulterated values as results for his calculations on Lock1 or Lock2 rounds without being immediately detected. Because Lock2 keys are revealed at the end of the game, cheating during Lock2 round is a suicide cheat. The only way to cheat is to do it during the Lock1 round or during a card deal.

Let's suppose there is a cheating group (which is a proper subset of all the players) consisting of at least the player Mallory and possibly Marvin. Suppose no one tries to cheat at Lock2 round but player Mallory tries to cheat during a Lock1 round providing a chosen card value c as output, instead of the re-encryption of the value being received. Finally, after all re-encryptions of Lock1 and Lock2, the value c is going to be dealt, and converted into a free card y.

First suppose the card is dealt to a player Marvin taking part on the cheat. He won't complain on any invalid value obtained during the calculation of the master key. He will always accept the card. Later the player will try to successfully show the card. To do it, the player must possess a valid master key.

To obtain a master key K, Marvin must solve the equation:

$$D_K(y)=x_i$$

$$y=E_L(c)$$

Knowing:
Q=Product(for all i:$q_i$), where $q_i$ is the card key of player i.
L=Product(for a subset of the players i:$l_i$), where $l_i$ is the lock2 key for player i.
So $D_{K*(L^{-1})}(c)=x_i$
Because of CUOC, the only way to obtain a valid open card $x_i$ is that c is itself an encryption/decryption of the same open card $x_i$. Let $c=E_s(x_i)$ for some s. The value s must be fixed before the lock2 keys have been used.

So $D_{K*(L^{-1})*(s^{-1})}(x_i)=x_i$

The only way to solve the equation is taking K=L*s. But L cannot be derived from Q, because q values contain lock2 values multiplied by the unknown keys for the lock1 and shuffle-masking rounds. The only way to solve the equation is to do a KPA on the CGC, which is computationally infeasible under the MPF model.

Mallory cannot tamper with the dealing protocol, because the protocol security relies on the unknown Lock2 keys used to encrypt the card to be dealt. Any attempt to cheat during the dealing protocol will result in an invalid open card received, and the cheater will be caught.

VSM-VL

FIG. 9 illustrates the VSM-VL protocol, as further described below, which includes the following a stages: shuffle 900, deal card preparation 902, deal card 904, and prove ownership 906.

Pros:
Provides advanced card operations
All free cards are equally treated
Protected against suicide cheating.
Abrupt drop-out tolerant.

Security Proof (Simplified)
1. All computations are verified.
2. It's infeasible to compute the key m or l from a key q such as q=m*l and a known message encrypted with m and later with l, under the MPF model.

FIG. 10 illustrates a VSM-VL shuffle between agents, which includes all players performing a Shuffle-Mask round 1000 and a subsequent Lock round 1002, producing ML-cards 1004, all as described in detail, herein.

VSM-VPUM

Figure 11:
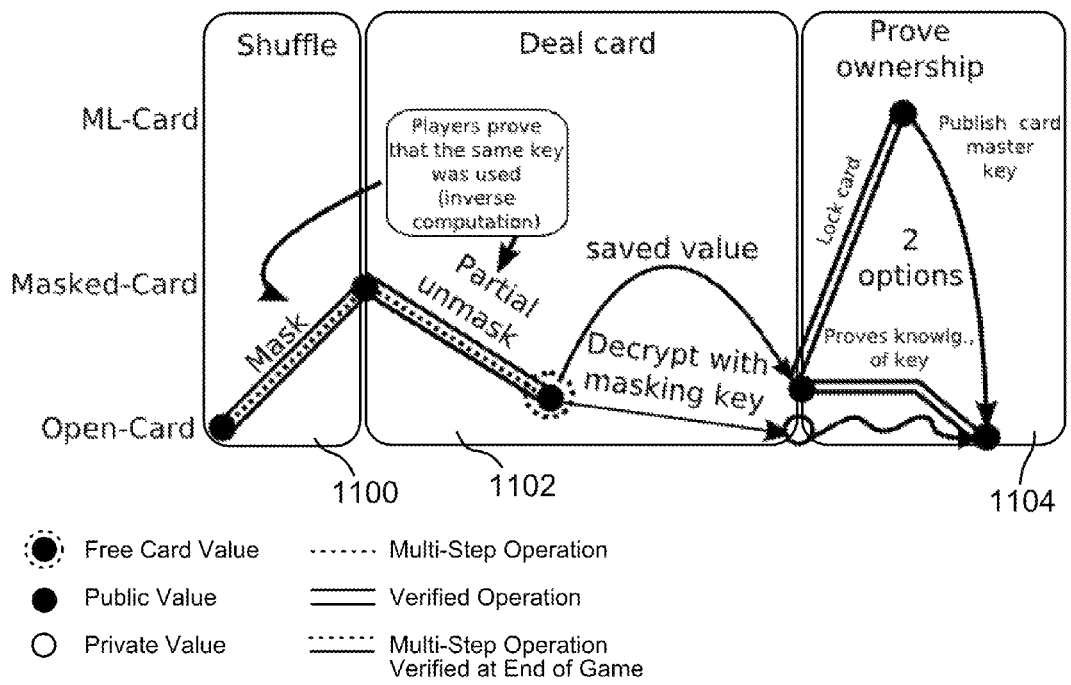
FIG. 11 illustrates a VSM-VPUM protocol, in accordance with an embodiment.

FIG. 11 illustrates the VSM-VPUM protocol, as further described below, which includes a shuffle stage 1100, a deal card stage 1102, and a prove ownership stage 1104, all as described in detail, herein.

Pros:
Protected against suicide cheating.

Cons:
2 verification rounds required
Initial free cards must be carefully treated in a special way (because they are encrypted with a "private key")
The unmasking round cannot be pre-calculated.
Does not provide advanced card operations Security Proof (Simplified)
1. All computations are verified.
2. If a card is locked afterwards, it's infeasible to an opponent to compute the key m or l from a key q such as q=m*l and a known message encrypted with m and later with l, under the MPF model.
3. If a card is opened by proving knowledge of m using a LVP, it's infeasible to an opponent to compute m.

VSM-VL-VUM

Figure 12:
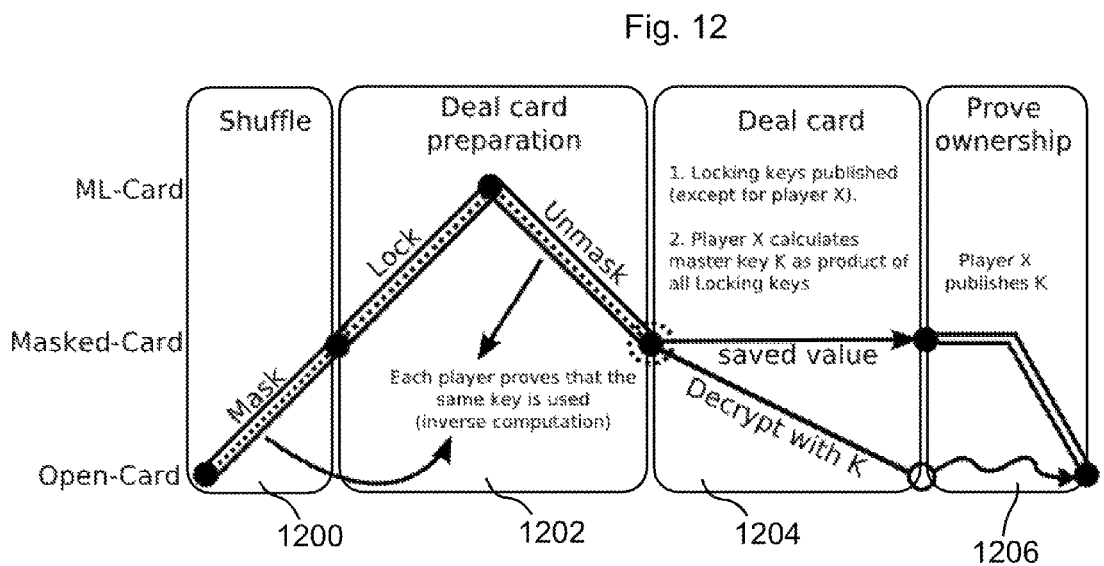
FIG. 12 illustrates a VSM-VL-VUM protocol, in accordance with an embodiment.

FIG. 12 illustrates the VSM-VL-VUM protocol, as further described below, which includes a shuffle stage 1200, a deal card stage 1202, a deal card stage 1204, and a prove ownership stage 1206, all as described in detail, herein.

Pros:
All free cards are equally treated
Provides advanced card operations
Protected against suicide cheating
Abrupt drop-out tolerant.

Cons:

3 verification rounds required

Security Proof (Simplified)

1. All computations are verified.

2. it's infeasible to an opponent to compute the key l from a known message encrypted with 1 (a KPA attack), under the MPF model.

Figure 13:
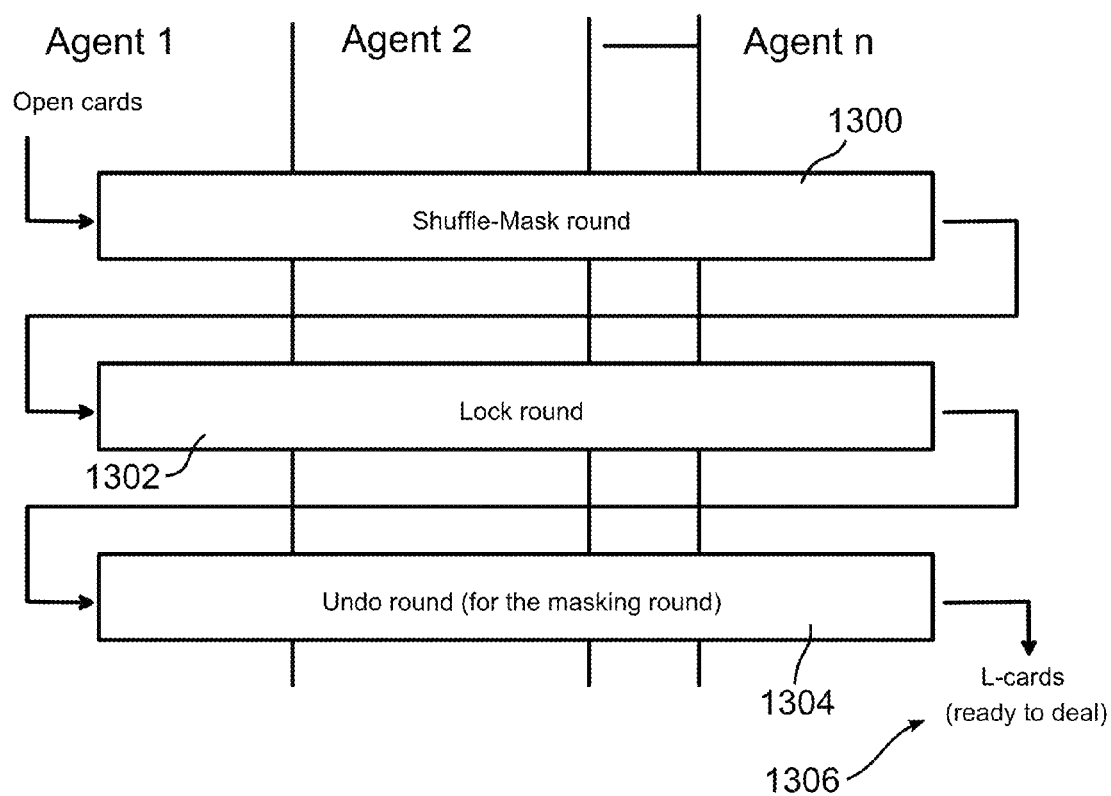
FIG. 13 illustrates the execution of all the rounds between agents under the VSM-VL-VUM protocol.

FIG. 13 illustrates the execution of all the rounds between agents under the VSM-VL-VUM protocol, which includes all players performing a Shuffle-Mask round, a subsequent Lock round 1302, and then an Undo round 1304 for the masking round, resulting in L-cards 1306, all as described in detail, herein.

Card Protocols

Protocols involve more than one participant. We'll define some basic sub-protocols which constitute the building blocks of the base protocols. A summary of protocols included in an embodiment appears in Table 5. In the following protocol detail, as well as in Table 5, numbering is provided for the convenience of the reader. It should be understood, however, that the numbering represents an embodiment, and that the sequence of certain steps may be changed with respect to other steps, as would be understood by one skilled in the art.

We'll say that a player "possesses", "has" or "holds" an open card x (or a free card y) if the player has a mapping $(y \rightarrow k)$ in his Master-Key table and $D_k(y)=x$.

For simplicity of the definitions, we'll treat card lists as sets when needed, allowing set operations (membership test, inclusion and exclusion) on lists, taking into account that no card list can have duplicates due to the CUOC assumption. Because the deck has very few cards compared to the encryptor plaintext size, and the number of computations is bounded on the number of cards, players and card transfers, the probability that duplicates appear spontaneously during computations is negligible. Anyway, players can check the lists after each shuffle to ensure no duplicates exists and redo the step, changing any random value used, if a duplicate is found.

Protocols have arguments, which are described in the protocol signature. Arguments can be in (input) or out (output). Also, arguments are public (meaning the argument is known by all players) or private (meaning the argument is only known to a certain player, and unless broadcast, remain private during the protocol). Arguments can also be multi-private, meaning that each player receives a private copy of the argument. To specify which copy is referred in the protocol steps, a subscript with the player number is used. Public arguments values are checked by all players and they cannot differ. Every player must supply exactly the same argument. Public arguments are meta-arguments and do not need to be really transferred, but can be broadcast to assert all players are willing to do the same operation.

Sub-protocol executions are requested and expected unconditionally by all players, with the exception of the Card-Key-Verification protocol, which is conditional.

Values can be transferred privately from one player to another or broadcast to all the remaining players. Values transmitted always are referred with an underscored variable name. Underscored variables are meta-variables created for the only purpose of tracking values as they are transferred through the network. Meta-variables can change their value after they have been broadcast, and it is assumed that all players can perform the same change at the same time. Because of this notation, the protocols described do not use "receive x" commands. Public values are automatically received by other players in meta-variables with the same name as the ones sent. The input and output arguments of sub-protocols can be meta-variables, so are passed as reference, which means that the actual values are not directly stored but refer to some values previously broadcast or calculated by all players. Private variables can also be passed to output multi-private arguments. In such a case each player stores the result privately in his own local variable area. Table 4 provides a reference for argument modifiers.

TABLE 4

Argument modifiers reference

| | |
|---|---|
| public | Argument is know to all players |
| private | Argument is know only to a single player |
| multi-private | Every player gets or sets a private copy of the argument. |
| in | The argument is an input to the protocol |
| out | The argument is an output from the protocol |

TABLE 5

Card Protocols Reference

Deck creation 3.7.1. Create-Deck (CO-PRNGP)
3.7.2. Create-Deck (Locking)
Deck shuffle and preparation 3.7.3. Shuffle-Deck
3.7.4. Prepare-Cards-To-Deal (for VSM-L-OL)
3.7.5. Prepare-Cards-To-Deal (for VSM-VL)
3.7.6. Prepare-Cards-To-Deal (for VSM-VPUM)
3.7.7. Prepare-Cards-To-Deal (for VSM-VL-VUM)
3.7.8. Verified-Unmasking-Round
3.7.9. Verified-ShuffleMasking-Round (using a UVP)
3.7.9B. Verified-ShuffleMasking-Round (using a VRP)
3.7.10. Locking-Round
Card deal 3.7.13. Multiple-Cards-Deal (for VSM-VPUM)
3.7.14. Single-Card-Deal (for VSM-L-OL, VSM-VL and VSM-VL-VUM)
Shuffle hand cards 3.7.11. Shuffle-Hand(1)
3.7.12. Shuffle-Hand(2)
Protect against suicide cheaters 3.7.15. Card-Key-Verification (for VSM-VL-VUM)
3.7.16. Card-Key-Verification (for VSM-VL and VSM-L-OL)
3.7.17. Build-Representative
Show cards 3.7.18. Show-Cards(1)
3.7.19. Show-Cards(2)
Deck reshuffle 3.7.20. Reshuffle-Deck (for VSM-L-OL, VSM-VL and VSM-VL-VUM)
3.7.21. Change-Hand-Cards-Key
Card transfers 3.7.22. Return-Cards-To-Deck (for VSM-L-OL, VSM-VL and VSM-VL-VUM)
3.7.23. Private-Cards-Transfer
3.7.26. Put-Card-On-Table
3.7.27. Verified-ShuffleRemasking-Round
Abrupt-Drop-out resistance 3.7.24. Abrupt-Drop-out-Recovery (for VSM-VL and VSM-VL-VUM)
3.7.25. Create-Recovery-Sets
Game finalization 3.7.28. End-Of-Game (only for VSM-L-OL)

3.7.1. Create-Deck (CO-PRNGP)
Create a fresh deck of unique cards by a CO-PRNGP.
Signature: Create-Deck
1) Each player i:
1.1) Chooses a random number $r_i$:=RandomNumber (csprng-seed-bit-length)
1.2) Computes $cr_i$:=$H(r_i)$
1.3) Broadcasts $\underline{cr_i}$ (a commitment to $r_i$)
2) Each player i:
2.1) Broadcasts $\underline{r_i}$
2.2) For each j, verifies that $\underline{cr_i}$:=$H(\underline{r_i})$
2.3) Computes S=$H(\underline{r_1};\underline{r_2};\ldots;\underline{r_n})$
2.4) Uses S as seed for a common CSPRNG.
2.5) Use CSPRNG to generate the symmetric algorithm (CGC) common parameters.
2.6) Uses the CSPRNG to generate c distinct suitable encodings of the real cards in a deck to be used as open cards. The generated cards are saved in the Open-Deck list.
2.7) Computes $dh_i$:=H(Open-Deck).
3) The first player broadcasts $\underline{dh_1}$.
4) Everybody verifies having computed $dh_i$ equal to $\underline{dh_1}$. If a player detects a mismatch, the protocol aborts.
After:
Open-Deck is a set of O-Cards.
3.7.2. Create-Deck (Locking)
Create a fresh deck of unique cards with a locking round.
Signature: Create-Deck
1) Players constructs the card list X containing c copies of a single fixed card value g.
2) Players execute the protocol Locking-Round (X, $\underline{Y}$,1, true)
3) Each player i:
3.1) Sets Main-Deck:=$\underline{Y}$
4) Every player:
4.1) Empties the Lock-Key.
4.2) Empties the Lock-Representative table
After:
Open-Deck is a set of O-Cards.
3.7.3. Shuffle-Deck
A deck of cards is mixed by all the players so that anyone is assured nobody can predict the position of an input card on the output deck.
Signature: Shuffle-Deck
Before:
Open-Deck is a list of O-Cards.
Each player's Main-Deck list is empty.
1) Players execute the protocol Verified-ShuffleMasking-Round (Open-Deck, $\underline{Y}$).
2) Each player i:
2.1) Sets Main-Deck:=$\underline{Y}$
After:
The Main-Deck is ready for a card preparation for dealing.
3.7.4. Prepare-Cards-To-Deal (for VSM-L-OL)
Some cards are prepared to be dealt. This protocol tag cards from Main-Deck.
Signature: Prepare-Cards-To-Deal (public in $\underline{v}$:Integer)
Before:
Open-Deck is a list of O-Cards.
The meta-variable v is the number of cards to prepare.
1) Let Z:=Copy (Main-Deck, $\underline{v}$)
2) Players execute the protocol Locking-Round (Z, $\underline{L}$,1, false)
3) Players execute the protocol Locking-Round ($\underline{L}$, $\underline{Y}$, 2, false)
4) Each player i:
4.1) For j from 1 to v:
4.1.1) Let k:=Mask-Key*Lock-Key[1,j]*Lock-Key[2,j]
4.1.2) Inserts the mapping ($\underline{Y}$[j]→k) in Card-Key.
4.1.3) Prepare-Card[Main-Deck[j]]:=$\underline{Y}$[j]
After:
The Main-Deck is ready for a card dealing protocol.
3.7.5. Prepare-Cards-To-Deal (for VSM-VL)
Some cards are prepared to be dealt. This protocol just moves cards from Main-Deck to Prepared-Main-Deck.
Signature: Prepare-Cards-To-Deal (public in $\underline{v}$:Integer)
Before:
Main-Deck contains at least v cards.
1) Let Z:=Copy (Main-Deck, $\underline{v}$)
2) Players execute the protocol Locking-Round (Z, $\underline{Y}$, 1)
3) Each player i:
3.1) For j from 1 to v:
3.1.1) Let k:=Mask-Key*Lock-Key[1,j]
3.1.2) Inserts the mapping ($\underline{Y}$[j]→k) in Card-Key.
3.1.3) Prepare-Card[Z[j]]:=$\underline{Y}$[j]
After:
The first v cards of the Main-Deck are prepared for dealing.
3.7.6. Prepare-Cards-To-Deal (for VSM-VPUM)
Some cards are prepared to be dealt. This protocol just moves cards from Main-Deck to Prepared-Main-Deck.
Signature: Prepare-Cards-To-Deal (public in $\underline{v}$:Integer)
Before:
Main-Deck contains at least v cards.
1) Let Z:=Copy (Main-Deck, $\underline{v}$)
2) Each player i:
2.1) For each z in Z:
2.1.1) Inserts the mapping (z→Mask-Key) in Card-Key.
2.1.2) Prepare-Card[Z[j]]:=Z[j]
After:
The Prepared-Main-Deck is ready for a card dealing protocol.
3.7.7. Prepare-Cards-To-Deal (for VSM-VL-VUM)
Some cards are prepared to be dealt.
Signature: Prepare-Cards-To-Deal (in $\underline{v}$:Integer)
Before:
Main-Deck contains at least v cards.
1) Let Z:=Copy (Main-Deck, $\underline{v}$)
2) Players execute the protocol Locking-Round(Z, $\underline{L}$, 1, true).
3) Players execute the protocol Verified-Unmasking-Round($\underline{L}$, $\underline{Y}$, −1)
4) Each player i:
4.1) For each j from 1 to $\underline{v}$:
4.1.1) Inserts the mapping ($\underline{Y}$[j]→Lock-Key[1, j]) in Card-Key.
4.1.2) Prepare-Card[Z[j]]:=$\underline{Y}$[j]
After:
The Main-Deck is ready for a card dealing protocol.
3.7.8. Verified-Unmasking-Round
This parametrized protocol implements a verified unmasking round.
Signature: Verified-Unmasking-Round(
public in $\underline{L}$:ML-Card-List,
public out $\underline{Z}$:L-Card-List,
public in skip-player:Integer)
Before:
L is a list of ML-Cards.
1) $\underline{Z_0}$=L
2) Each player i, in increasing order:
2.1) if (i=skip-player) then
2.2.1) Set $\underline{Z_i}$:=$\underline{Z_{i-1}}$
2.3) else
2.3.1) Constructs a card list $Z_i$:=UnmaskCards($Z_{i-1}$, Mask-Key)
2.3.2) Broadcast $\underline{Z_i}$.

2.3.3) Let r:=Mask-Representative[i].
2.3.4) Players execute UMVP(Mask-Key, $\underline{Z}_{i-1}$, $\underline{Z}_i$, i, r.p, r.c)
3) $\underline{Z}=\underline{Z}_i$ (where i is last player in the round).
After:
Z a list of L-Cards.
Z is public.
Note that the UMVP protocols in step 4 can be executed in parallel to increase the performance for multi-threading or multi-core CPUs.

3.7.9. Verified-ShuffleMasking-Round (Using a SMVP)
This protocol implements a verified shuffle-masking round.
Signature: Verified-ShuffleMasking-Round(
public in $\underline{D}$:O-Card-List,
public out $\underline{Z}$:M-Card-List)
Before:
D is a list of O-Cards.
R is a representative
1) For each player i, in increasing order:
1.1) If i=0 then $\underline{X}_i=\underline{D}$ else $\underline{X}_i=\underline{Y}_{i-1}$
1.2) Set F:=RandomPermutation(#D).
1.3) Set m:=RandomKey( ).
1.4) Constructs a card list $\underline{Y}_i$:=ShuffleMaskCards($\underline{X}_i$, m, F)
1.5) Broadcast $\underline{Y}_i$.
1.6) R.p:=RandomCardValue( )
1.7) R.c:=MaskCard(R.p, m);
1.8) Broadcasts $\underline{R}$
1.9) Players execute SMVP (m, $\underline{X}_i$, $\underline{Y}_i$, i,$\underline{R}$)
1.10) Sets Mask-Key:=m
1.11) All players set Mask-Representative[i]:=$\underline{R}$
2) $\underline{Z}=\underline{Y}_p$ (where p is the last player in the round)
After:
Z a list of M-Cards.
Z is public.
Z is a permutation of the cards in X, after masking.
The permutation cannot be computed by any proper subset of players.
Each player has his masking key saved.

3.7.9b. Verified-ShuffleMasking-Round (Using a VRP)
This protocol implements a verified shuffle-masking round using a VRP.
Signature: Verified-ShuffleMasking-Round(
public in D:O-Card-List,
public out Z:M-Card-List)
Before:
D is a list of O-Cards.
R is a representative
ORP is an empty public card-list
ORC is an empty public card-list
n is the number of players
1) Execute VRP({1 . . . n}, {1 . . . n},true,true,[m],F,D,Z, [ ]. [ ],true, ORP,ORC)
2) Each player i, in increasing order:
2.1) Sets Mask-Key:=m.
2.2) For each player j
2.2.1) Set Mask-Representative[j].p=ORP[j]
2.2.2) Set Mask-Representative[j].c=ORC[j]
After:
Z a list of M-Cards.
Z is public.
Z is a permutation of the cards in D, after masking.
The permutation cannot be computed by any proper subset of players.
Each player has his masking key saved.

3.7.10. Locking-Round
This parametrized protocol implements a verified shuffle-masking round.
Signature: Locking-Round (
public in $\underline{L}$:ML-Card-List,
public out $\underline{Z}$:L-Card-List,
public in lock-round:integer,
public in verified:boolean)
Before:
L is a list of Cards.
1) For each player i, in increasing order:
1.1) If i=0then Xi=L else Xi=Yi−1
1.2) Chooses a random or pseudo-random key-List K: For j from 1 to #L, set K[j]:=RandomKey( )
1.3) Constructs a card list $Y_i$:=LockCards(X, K)
1.4) Broadcast $\underline{Y}_i$.
1.5) If verified then players execute LVP(K, $\underline{X}_i$, $\underline{Y}_i$, i)
1.6) If lock-round>0 then for j from 1 to #K:
1.6.1) set Lock-Key[lock-round, j]:=K[j]
1.7) All players:
1.7.1) For j from 1 to # $\underline{X}_i$:
1.7.1.1) If lock-round>0 then
1.7.1.1.1) Lock-Representative[lock-round,ij]:={p:$\underline{X}_i$[j], c:$\underline{Y}_i$[j]}
3) $\underline{Z}=\underline{Y}_p$, where p is the last player in the round (Z is the round output).
4) All players:
4.1) For j from 1 to # $\underline{X}_i$:
4.1.1) Card-Trace[lock-round, $\underline{Z}$[j]]:=j
After:
Z a public list of L-Cards.
Each player has his locking keys saved.

3.7.11. Shuffle-Hand(1)
This is a single key hand shuffling verified by a SMVP that allows a player to mix a subset of the free cards he is holding. The mapping between the newly generated free cards and the previous free cards remains secret.
Signature: Shuffle-Hand(private in X:Card-List, public in i:Integer)
Before:
X is card list of F-Cards
X is public.
Player i will mix his hand cards.
1) Player i:
1.1) Broadcast $\underline{X}$ and $\underline{i}$.
2) Each player checks, for each x in $\underline{X}$, if Card-Holder[x]=i. If not, then player i is attempting to prove ownership for cards not given to him (cheat) and the protocol aborts.
3) Player i:
3.1) Creates a new temporary key w (w should not be the identity): Set w:=RandomKey( )
3.2) Set F:=RandomPermutation(#X).
3.3) Computes Y:=ShuffleMaskCards($\underline{X}$, w,F)
3.4) Broadcasts $\underline{Y}$.
4) Players execute SMVP (W, $\underline{X},\underline{Y}$, i, [ ], [ ])
5) Now, player i will change his master keys for the set $\underline{Y}$. Player i Inserts, for each j the mapping ($\underline{Y}$[j]→w*Master-key[X[F$^{-1}$(j)]]) in Master-key,
6) Player i removes mappings of the set $\underline{X}$ from his Master-key map.
7) All the players remove the mappings for the set $\underline{X}$ from their Card-Holder map.
8) All players insert, for each y in $\underline{Y}$, the mappings (y→i) in their Card-Holder map.

After:
Y is a set of ML-Cards
Y is public
Y is a permutation of the locked and masked cards in X.
The player shuffling the cards obtains a new set of locking keys for the newly created set Y.
Each player has updated his Card-Holder map.

3.7.12. Shuffle-Hand(2)

This is a multi-key hand shuffling verified by a SLVP that allows a player to mix a subset of the free cards he is holding. The mapping between the newly generated free cards and the previous free cards remains secret.
Signature: Shuffle-Hand(private in X:Card-List, public in i:Integer)
Before:
X is card list of F-Cards
X is public.
1) Player i:
 1.1) Broadcast $\underline{X}$ and $\underline{i}$
2) Each player checks if Card-Holder[x]=$\underline{i}$, for each x in X. If not, then player i is attempting to prove ownership for cards not given to him (cheat) and the protocol aborts.
3) Player i:
 3.1) Creates a list of random keys W, where W[j],is the key the will be used to re-encrypt the card $\underline{X}$[j] (W[j] should not be the identity). For j from 1 to #$\underline{X}$, set W[j]:=RandomKey( )
 3.2) Set F:=RandomPermutation(#$\underline{X}$).
 3.3) Computes Y:=PermuteCards(LockCards($\underline{X}$, W), F)
 3.4) Broadcasts $\underline{Y}$.
4) Players execute SLVP (W, $\underline{X}$,$\underline{Y}$, i)
5) Player i (changes his master keys for the set Y): Inserts, for each j, the mapping ($\underline{Y}$[j]→W[j]*Master-key[$\underline{X}$[F$^{-1}$(j)]]) in Master-key,
6) Player i removes mappings for the set $\underline{X}$ from his Master-key map.
7) All players remove the mappings for the set X from their Card-Holder map.
8) All players insert, for each y in $\underline{Y}$, the mappings (y→i) in their Card-Holder map.
After:
Y is a set of ML-Cards
Y is public
Y is a permutation of the locked and masked cards in X.
The player shuffling the cards obtains a new set of locking keys for the newly created set Y.
Each player has updated his Card-Holder map.

3.7.13. Multiple-Cards-Deal (for VSM-VPUM)

A player is given a set of n free cards, and the corresponding open cards.
This protocol is defined for multiple cards to take advantage of performance gain calling Verified-Unmasking-Round for multiple cards at once.
Signature: Multiple-Cards-Deal(
public in v:Integer,
public in i:Integer)
Before:
The prepared deck has at least n cards available.
The player i wants to get n cards from the deck.
1) Player i broadcasts $\underline{v}$ and $\underline{i}$.
2) All players:
 2.1) Set Q:=Copy(Main-Deck, $\underline{v}$).
 2.2) Set X:=[ ]
 2.3) For each q in Q, append Prepared-Card[q] to X.
3) Players execute Verified-Unmasking-Round(X, $\underline{Z}$, i).
4) Player i:
 4.1) Computes Y:=DecryptCards($\underline{Z}$, Mask-Key)
 4.2) Checks that each card in Y is a valid open card. if not then aborts this protocol.
 4.3) For each card y in Y, inserts the mapping (y→Mask-Key) in his Master-key map (y is a "private key" card).
5) Every player:
 5.1) For each card z in $\underline{Z}$, sets Card-Holder[z]:=i. (Z is the set of free cards obtained)
 5.2) For each card x in X, deletes the card x from the Main-Deck.
After:
The player i receives a list of O-Cards Y (private to that player)

3.7.14. Single-Card-Deal (for VSM-L-OL, VSM-VL and VSM-VL-VUM)

A player receives a free card, where the related open card is revealed only to him.
Signature: Single-Card-Deal(public in i:Integer)
Before:
The prepared main deck has at least one card available.
The player i wants to get a card from the prepared main deck.
1) Player i broadcasts $\underline{i}$.
2) All players:
 2.1) Set x:=Prepared-Card [Main-Deck[1]].
3) For each player t, such as t< >i, in increasing order:
 3.1) Sets $q_t$:=Card-Key[x]
 3.2) Broadcasts $\underline{q}_t$
4) Player i:
 4.1) Computes w:=$\underline{q}_1$* . . . *$\underline{q}_n$(the q values broadcast by the players)
 4.2) Computes y:=OpenCard(x,w)=$D_w$(x)
 4.3) Checks that y is a valid open card, if not then aborts this protocol, proclaims a cheating attempt and do the following steps:
  4.3.1) Let Q=[$\underline{q}_1$, . . . , $\underline{q}_n$] and $q_i$ is undefined.
  4.3.2) Execute Card-Key-Verification($\underline{i}$,1, Q) protocol.
 4.4) Insert the mapping (x→w) in his Master-key map.
5) Every player:
 5.1) Sets Card-Holder[x]:=i.
 5.2) Deletes the card x (at index 1) from the Main-Deck.
After:
A player gets an open card z (private to that player).

3.7.15. Card-Key-Verification (for VSM-VL-VUM)

This protocol lets a player i who has received invalid card key values to check who is cheating when dealing a card with the index j of the main deck.
Signature: Card-Key-Verification(
public in i:Integer,
public in j:Integer,
public in Key-List Q)
1) For each player p, such as p< >i do
 1.1) Set R:=Lock-Representative[1,p, j]
 1.2) Every other player checks that $E_{Q[j]}$ (R.p)=R.c. If not, then player p is cheating.

3.7.16. Card-Key-Verification (for VSM-VL and VSM-L-OL)

This protocol lets a player i who has received invalid card key values to check who is cheating when dealing a card with the index j of the main deck.
Signature: Card-Key-Verification(
public in i:Integer,
public in j:Integer,
public in Key-List Q)
1) For each player p, such as p< >i do
 1.1) Set R:=Mask-Representative[p]
 1.2) Execute Build-Representative(p, R, R, Lock-Representative[1, p, j], Lock-Key[1,j])

1.3) (Only for VSM-L-OL) Execute Build-Representative (p, R, R, Lock-Representative[2,p, j], Lock-Key[2, j])

1.4) Every other player checks that $E_{Q[j]}$ (R.p)=R.c. If not, then player p is cheating.

3.7.17. Build-Representative

Create a new representative for the union of representatives A and B, for player i.

Signature: Build-Representative(
public in i:Integer,
public out R:Representative;
public in A:Representative;
public in B:Representative;
private in k:Key)
1) All players:
1.1) Compute x:=LockCard(A.c,k)
1.2) Execute RLVP(k, A.c, x, B.p, B.c)
1.3) Set R.p:=A.p
1.4) Set R.c:=x 3.7.18. Show-Cards(1)

Allows a player to put a set of open cards on the table, and proof the legitimate possession of the cards. Legitimate possession means the card was previously drawn to a player by a deal protocol, and after any number of card transfers, the cards is now in the prover hand. This protocol only publishes master keys so it's very fast.

The protocol is generally preceded by a Shuffle-Hand protocol for all the cards in the player's hand to avoid leaving any trace that points to cards dealt or previously transferred.

Signature: Show-Cards(
public in i:Integer,
private in Y:Card-List)
Before:
Player i wants to open a list of free cards Y and he has the corresponding master keys.
1) Player i:
1.1) Broadcasts i.
1.2) For each j, from 1 to #Y:
1.3) Broadcasts a tuple (Y[j], $k_j$) where $k_j$=Master-key[Y[j]].
2) Each player j, such as j<>i:
2.2) For each j, from 1 to #Y:
2.2.1) Check that Card-holder[Y[j]]=i. If the check fails, then player i is trying to cheat.
2.2.2) Computes c:=OpenCard(Y[j], $k_j$)
2.2.3) Checks that c is a valid O-Card. If the check fails, then player i is trying to cheat.
After:
The open cards associated with Y are published.
The player i proof legitimate possession of each shown card.

3.7.19. Show-Cards(2)

This protocol allows a player to put a set of open cards on the table, and proof the legitimate possession of the cards. Legitimate possession means the card was previously drawn to a player by the Card Drawing Protocol, and after any number of card transfers, the cards is now in the prover hand. This is a slower protocol that relies on proving the knowledge of the master keys, without publishing them.

This protocol is only faster than Show-Cards(1) protocol if:
All the cards in the player's hand will be shown
The cards are not released and will be kept in the player's hand
Some of the cards will be privately transferred later.

This saves a further Shuffle-Hand protocol execution before the private transfer.

This protocol is generally preceded by a Shuffle-Hand protocol for all the cards in the player's hand to avoid leaving any trace that points to cards dealt or previously transferred.

Signature: Show-Cards(
public in i:Integer,
private in Y:Card-List)
Before:
Player i wants to open a list of free cards Y and he has the corresponding master keys.
1) Player i broadcasts i and Y.
2) Each player j, such as j<>i do:
2.1) Check that, for each y in Y, Card-holder[y]=i. If the check fails, then player i is trying to cheat.
3) Player i:
3.1) Construct the key list K. For each index j from 1 to #Y, K[j]:=Master-key[Y[j]]
3.2) Construct the card list X. For each index j from 1 to #Y, X[j]:=OpenCard(Y[j], K[j])
3.3) Broadcast X
4) Players execute SLVP(K, X,Y, i).
After:
The open cards X (associated with Y) are published.
The player i proof legitimate possession of each shown card.

3.7.20. Reshuffle-Deck (for VSM-L-OL, VSM-VL and VSM-VL-VUM)

This protocol allows the players to reshuffle the deck, keeping the permutation function unknown to any proper subset of the players. This protocol is available only for VSM-L-OL, VSM-VL and VSM-VL-VUM.

Signature: Reshuffle-Deck
1) Players execute the protocol Verified-ShuffleMasking-Round (Main-Deck, Y).
2) Each player i:
2.1) Sets Main-Deck:=Y
After:
A deck Y of ML-cards (public)
New set of card keys for all cards.

3.7.21. Change-Hand-Cards-Key

This is a protocol that allows a player to simultaneously change the key of a set of hand cards to match the last Mask-Key. This protocol must be used after a Deck-reshuffle by the player willing to put cards back in the deck.

Signature: Change-Hand-Cards-Key(
public in Card-List X,
public out Card-List Y,
public in i:Integer)
Before:
X is card list of F-Cards
X is public.
1) Each player checks, for each x in X, if Card-Holder[x]=i. If not, then player i is attempting to prove ownership for cards not given to him (cheat) and the protocol aborts.
2) Player i:
2.1) Creates a list of keys W: for each 1<=j<=#X:set W[j]:=Master-Key[X[j]]$^{-1}$*Mask-Key.
2.2) Computes Y:=LockCards(X, W)
2.3) Broadcasts Y.
3) Players execute LVP (W, X,Y, i)
4) Player i (changes his master keys for the set Y): Inserts, for each j, the mapping (Y[j]→Mask-Key) in Master-key,
5) Player i removes mappings for the set X from his Master-key map.
6) All players remove the mappings for the set X from their Card-Holder map.
7) All players insert, for each y in Y, the mappings (y→i) in their Card-Holder map.

After:
Y is a set of ML-Cards
Y is public
The player shuffling the cards obtains a new set of locking keys for the newly created set Y.
Each player has updated his Card-Holder map.

3.7.22. Return-Cards-To-Deck (for VSM-L-OL, VSM-VL and VSM-VL-VUM)

A player i take some cards from their hands and put them back on the deck. To remove any track of cards the appended to the deck, a Reshuffle-Deck protocol may be required.

This protocol is available only for VSM-L-OL, VSM-VL and VSM-VL-VUM.

Signature: Return-Cards-To-Deck(
private in Card-List X,
private in i:Integer)
Before:
Player i wants to return list of cards X to the deck
X is a list of F-cards
1) Player i broadcasts $\underline{X}$ and $\underline{i}$.
2) Execute Reshuffle-Deck (creates a new Mask-Key for every player)
3) Execute Change-Hand-Keys($\underline{X},\underline{Y}$) (force the key of the cards to put back on the deck to be the new Mask-Key).
4) Player i, for each y in $\underline{Y}$, removes all the mappings from y in Master-Key.
5) Each player j, such as j<>i:
5.1) For each y in $\underline{Y}$, verify that Card-Holder[y]=i. If not, then abort the protocol.
5.2) For each y in $\underline{Y}$, remove the all mappings from y in Card-Holder.
6) Execute Verified-ShuffleRemasking-Round($\underline{Y},\underline{Z}$,i)
7) All players:
7.1) Remove all mappings from the Prepared-Card.
7.2) Append the set $\underline{Z}$ to the Main-Deck.
After:
The main deck is appended a new list of cards Z.
The player i cannot claim he is holding the cards anymore.

3.7.23. Private-Cards-Transfer

A player i gives some cards to a player j privately, but with the approval of the rest of the players.

Signature: Private-Card-Transfer(
private in Card-List X,
private in i:Integer,
private in j:Integer)
Before
X is the list of F-cards cards in a player's i hand to give to player j.
1) Player i:
1.1) Publishes $\underline{X}$, $\underline{i}$ and $\underline{j}$.
1.2) Constructs a key list Q such as, for each t from 1 to #$\underline{X}$:Q[t]:=Master-Key[$\underline{X}$[t]]
1.3) Sends privately the list $\underline{Q}$ to player j.
1.4) For each x in $\underline{X}$, removes the mappings from x in Master-Key.
2) Player j:
2.1) Verifies that, for t from 1 to #$\underline{X}$:OpenCard($\underline{X}$[t],$\underline{Q}$[t]) is a valid open card. If not, then aborts the protocol and broadcasts $\underline{Q}$[t] to prove player i is cheating.
3) For each t from 1 to #X: sets Master-Key[$\underline{X}$[t]]:=$\underline{Q}$[t]
4) All players:
4.1) For each x in $\underline{X}$, verifies that Card-Holder[x]:=i. If not, then abort the protocol.
4.2) For each x in $\underline{X}$, sets Card-Holder[x]:=j.
After:
The card list X has been transferred from player i to player j.

3.7.24. Abrupt-Drop-out-Recovery (for VSM-VL and VSM-VL-VUM)

This protocol allows some players to recover from the drop-out of a player i.

Signature: Abrupt-Drop-Out-Recovery(public in i:Integer)
Before:
Player i quits the game
1) Private tables are rebuilt:
1.1) Every active player excludes player $\underline{i}$ from the game.
1.2) All private table records that refer to player $\underline{i}$ are discarded.
1.3) Players are renamed so player numbers are continuous and leave no gaps.
1.4) All private table records are changed according to the new player numbers.
2) If not executed before, players execute Create-Recovery-Sets.
3) Each player j:
3.1) Set Mask-Key:=Recovery-Set-Key
3.2) Set Mask-Representative:=Recovery-Mask-Representative
3.3) Set X=[ ]
3.4) For each mapping (z→j) in Card-Holder do:
3.4.1) Let s be the index such as $E_{Mask-Key}(D_{master-Key[z]}(z))$=Recovery-Set[j][s]
3.4.2) Broadcast ($\underline{z}$, $\underline{s}$)
3.4.3) All players compute q:=Recovery-Set[j][s]
3.4.4) Players execute LVP({$\underline{z}$}, {q}, j)
3.4.5) All players append q to X.
3.5) Players Execute Verified-Re-ShuffleMasking-Round (X,$\underline{Y}$, j)
3.6) All players:
3.6.1) Set Hand-Cards[j]:=$\underline{Y}$
3.6.2) Check that #$\underline{Y}$=number of cards mapped to player j in Card-Holder.
4) All players:
4.1) Compute Z:=Union (For each player j, Hand-Cards[j])
4.2) Check that #Z=number of cards dealt minus the number of cards that were in the hand of the quitting player.
5) Let T be the set of cards that are open and shown in the table.
6) Let R=Open-Deck−T
7) Players execute Verified-ShuffleRemasking-Round(R, $\underline{Q}$,−1)
This will execute a complete shuffle-masking round, validating that the previous masking keys are used again.
8) All players:
8.1) Set Main-Deck:=$\underline{Q}$-$\underline{Z}$ 3.7.25. Create-Recovery-Sets Every player create a set of masked cards from the open cards.

Signature: Create-Recovery-Sets
1) Each player i, in increasing order:
1.1) Set F:=RandomPermutation(#Open-Deck).
1.2) Set Recovery-Set-Key:=RandomKey( ). (creates a new masking key for future use)
1.3) Constructs a card list $Y_i$:=ShuffleMaskCards(Open-Deck, Recovery-Set-Key, F)
1.4) Broadcast $\underline{Y}_i$
1.5) Creates a representative R for the new masking key, R.p:=RandomCardValue( )
1.6) R.c:=MaskCard(R.p, Recovery-Set-Key);
1.7) Broadcasts $\underline{R}$
1.8) Players execute RSMVP (Recovery-Set-Key, F, Open-Deck, $\underline{Y}_i$, i, [R.p], [R.c])

1.9) Every player j:
1.9.1) Set Recovery-Set[i]:=$\underline{Y}_i$
1.9.2) Set Recovery-Mask-Representative[i]:=$\underline{R}$ 3.7.26. Put-Card-On-Table This protocol allows a player to put a card on the table. The card put can be face up (if the card was opened before) or face down (if the card was not opened)

Signature: Put-Card-On-Table(private in Card x, private in i:Integer)

Before:

Player i wants to put the card x on the table

1) Player i broadcasts $\underline{x}$ and $\underline{i}$
2) Every player:
2.1) Checks that Card-Holder[$\underline{x}$]=i. If not, abort.
2.2) Sets Card-Holder[$\underline{x}$]=0. (0 is a special value meaning "on the table")

After:

Player i no longer has the card x in his hand.

3.7.27. Verified-ShuffleRemasking-Round

This protocol implements a verified re-shuffle-masking round, skipping a certain player, who has already masked the cards. The masking key is checked to be the one previously used. This protocol is a sub-protocol of Return-Cards-To-Deck. If p is not a valid player number, then no player is skipped.

Signature: Verified-ShuffleRemasking-Round(
public in $\underline{D}$:O-Card-List,
public out $\underline{Z}$:M-Card-List,
public in p:Integer)

Before:

D is a list of O-Cards.

1) Each player i, such as i<>p, in increasing order:
1.1) If i=0 then X=$\underline{D}$ else $\underline{X}_i$=$\underline{Y}_{i-1}$
1.2) Set F:=RandomPermutation($\underline{X}_i$).
1.3) Constructs a card list $\underline{Y}_i$:=ShuffleMaskCards($\underline{X}_i$, Mask-Key, F)
1.4) Broadcast $\underline{Y}_i$.
1.5) Players execute RSMVP (Mask-Key, F, $\underline{X}_i$, $\underline{Y}_i$, i, Mask-Representative[i].p, Mask-Representative[i].c)

1.6) $\underline{Z}$=$\underline{Y}_p$, where p is the last player in the round (Z is the round output).

After:

Z a list of M-Cards.

Z is public.

Z is a permutation of the cards in D, after masking.

The permutation cannot be computed by any proper subset of players.

3.7.28. End-Of-Game (only for VSM-L-OL)

This protocol ensures the correctness of the second locking round

Signature: End-Of-Game

1) Each player i:
1.1) For each card c such as (c,i) is in Card-Holder table.
1.1.1) Set card_index:=Card-Trace[2, c]
1.1.2) Let k:=Lock-Key[2,card_index]
1.1.3) Broadcast $\underline{c}$ and $\underline{k}$
1.2) Each other player j:
1.2.1) Check that (c,i) is in Card-Holder table. If not, then player i is cheating.
1.2.2) Checks that (2,c) is in Card-Trace. If not, then the Card-Trace table is corrupt.
1.2.3) Set card_index:=Card-Trace[2, c].
1.2.4) Let R:=Lock-Representative[2, i, card_index]
1.2.5) Check that LockCard(R.p, $\underline{k}$)=R.c. If not, then player i is cheating.

Sample VSM-VL Run for Texas Hold'Em

Suppose two players want to play Texas Hold'em. This is a log of all protocols executed if there is no attempt to cheat and both players arrive to the showdown. Player 1 plays the game and also acts as a dealer.

| | |
|---|---|
| Create-Deck | |
| Shuffle-Deck | |
| Prepare-Cards-To-Deal (8) | (prepared cards for fast deal) |
| [ Pre-flop betting round ] | |
| Single-Card-Deal(1) | ($1^{st}$ card to player 1) |
| Single-Card-Deal(1) | ($2^{nd}$ card to player 1) |
| Single-Card-Deal(2) | ($1^{st}$ card to player 2) |
| Single-Card-Deal(2) | ($2^{nd}$ card to player 2) |
| Single-Card-Deal(1) | (flop 1 card given to player 1 (the dealer)) |
| Single-Card-Deal(1) | (flop 2 card given to player 1) |
| Single-Card-Deal(1) | (flop 3 card given to player 1) |
| Show-Cards(1, { the 3 flop cards } ) | (flop cards are shown on table) |
| [ Betting round ] | |
| Single-Card-Deal(1) | (the turn card given to player 1) |
| Show-Cards(1, { the turn card } ) | (turn card is shown on table) |
| [ Betting round ] | |
| Single-Card-Deal(1) | (the river card given to player 1) |
| Show-Cards(1, { the river card } ) | (turn river is shown on table) |
| Betting round | |
| [ Showdown ] | |
| Show-Cards(1, { all cards player 1 holds } ) | |
| Show-Cards(2, { all cards player 2 holds } ) | |

Pre-Defined UniVPLs

This section describes 3 protocols that implement a UniVP. Protocols are secure in the MPF security model. The second provides a Perfect-Zero-Knowledge proof. The rest provide Computational-Zero-Knowledge arguments of encryption and permutation of a computationally unique set of cards. The last protocol CO-VP is not strictly an UniVP, but can be used in cases where all players execute a locking or masking round and want to verify all others players' operations. Table 6 summarizes certain external functions, for reference.

TABLE 6

External Functions

| | |
|---|---|
| H(variable-len-bit-string) -> fixed-length-bit-string | H is a function that models a random oracle To implement the protocol, a secure one-way cryptographic hash function is used instead. |
| EncryptCards(Card-List X, Key-List L) | Returns a card list for which each element is an encryption of the element in X and the key in M with the same index. If L has only one element, then the same keys is used for all elements in X. |
| #X | Returns the number of elements in the list X. |
| X[i] | Returns the i-th element of the list X. |
| X + Y | Returns the concatenation of the list X with the list Y. |
| Union(V, P) | The union of the sets V and P. |
| RandomPermutation(n: Integer) | Returns a random or pseudo-random permutation of the integers from 1 to n. |
| Random(A: Set) | Returns a random or pseudo-random integer in the set A. |
| RandomKey( ) | Returns a random bitstring suitable as a key for the underlying CGC. |
| RandomBits(bit-length) -> bit-string | Returns a random or pseudo-random bit-string of specified length. |
| Commit(X) --> C | Returns a non-interactive commitment to X. We assume for simplicity that the commitment scheme is deterministic and perfectly binding. |
| Check(X, C) --> Boolean | Returns True if the commitment C is valid when compared to the revealed information X. |
| Permute(C: Card-List, P: Permutation) -> Card-List | Permutes the card-list C using the permutation P. We extend the function so that if P is a special symbol SORT, then C is lexicographically sorted. |
| AppendCard(C: Card-List, x: Card) --> Card-List | Returns a card-list with the item x appended to the input card-list C. |
| IfThenElse(cond: Boolean; T, E) | Returns T if cond = true, otherwise returns E. |

External Constants s: the security threshold for interactive proofs (cheating probability).

$s_{ns}$: the security threshold for non-interactive proofs (cheating probability).

5.1 Protocol FI-UniVP

Figure 14:
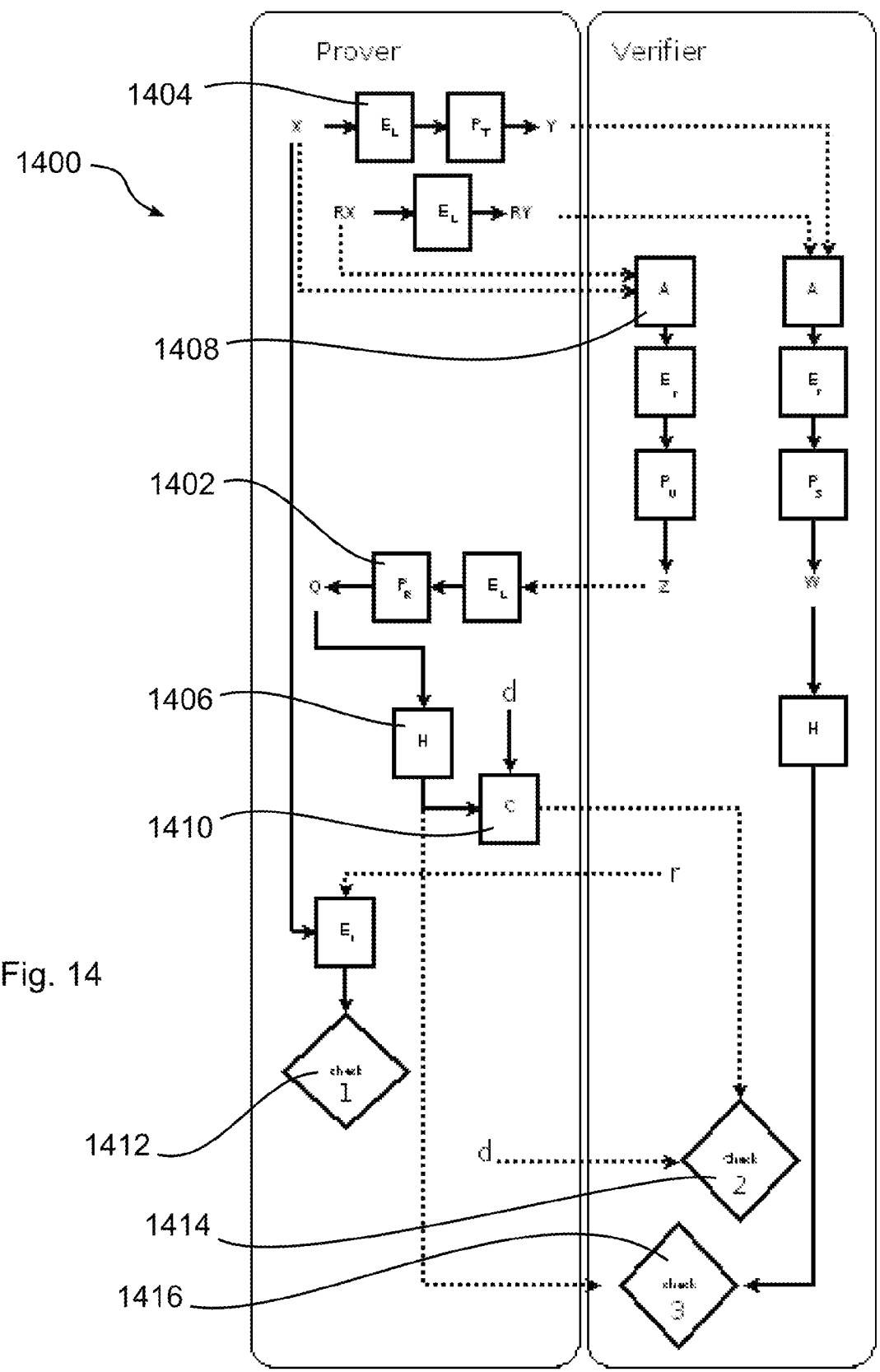
FIG. 14 illustrates an FI-UNIVP protocol, in accordance with an embodiment.

With reference to FIG. 14, an FI-UNIVP protocol 1400 is illustrated, corresponding to a Challenge-Response protocol which uses the commutativity property of the CGC. The verifier challenges the prover to re-do the encryption he is trying to prove on a different card-list. The challenge consists of a re-encryption and a permutation of X using a single key. The basic scheme is the following:

P boxes 1402 are permutations.

E boxes 1404 are encryptions.

H 1406 boxes are hash functions.

A 1408 is a card-list append operation.

C 1410 is a message commitment.

Depending on the arguments of the protocol, the U, L and P permutations are used or not.

Dotted lines represent transmitted information.

Time flows from top to bottom.

If a check fails, the protocol aborts and no additional information is sent.

Check 1 (1412): Checks that the challenge valid before opening the commitment on the result of the encryption. This stage prevents CPA attacks.

Check 2 (1414): Checks that the committed response sent by the prover is correct. This check prevents the prover from changing the response after he knows the challenge.

Check 3 (1416): The verifier checks that the response to the challenge is correct.

Commitments can be implemented in a number of ways [HIRLL99] [N91] [CS04]. We will use a simple scheme based on a cryptographic one-way hash function. The function must not only be one-way but must hide any information regarding the pre-image of a message digest.

Because we only use the commutativity property, this protocol cannot withstand malleability of the CGC. For a interactive protocol that withstand CGC malleability, see the protocol HMVP.

The permutations L, U and S vary depending on the protocol arguments, the three possibilities are a sort, the repetition of the permutation T, or the identity, as shown in Table 7.

TABLE 7

Variation in Permutations L, U, and S

| | Permuted | Not Permuted |
|---|---|---|
| Samekey, no representatives | SMVP (*) U = RandomPermutation S = Sort R = Sort U = RandomPermutation S = U R = T | Not required |
| Samekey, with representatives | SMVP and RSMVP U = RandomPermutation S = Sort R = Sort | UVP, UMVP and RLVP U = RandomPermutation S = Sort R = Sort T = Identity |
| Not samekey | SLVP (*) U = Identity S = Sort R = Sort U = Identity S = Identity R = T | LVP U = Identity S = Identity R = Identity T = Identity |

(*) For this case there are two possibilities.

Proof Watermarking

If parallel runs of these protocols will be used during a game, then an additional security measure must be applied. The identity of the prover must be embedded in the proof in a process similar to a cryptographic watermark. This prevents the proof to be forwarded.

Verifier Nonce Watermarking

An alternate way to avoid parallel runs is that random keys chosen by the verifier are watermarked. The prover must verify the identity embedded in the key before giving away the proof Here is the protocol to obtain a random watermarked key r:
1. Choose a random value v.
2. Construct the message m=H(<verifier identity>|v).
3. Choose a valid key r which includes in an unambiguous representation of m. If necessary, pad with extra random bytes.

If decryption keys are not unique, then the step 3 of this method can open the door to attacks. A better way would be to supply m as the seed for a CSPRNG, and use the generator to produce the random key r.

Protocol FI-UniVP
Signature: FI-UniVP (
private in L:Key-List, private in T:Permutation, public in X:Card-List,
public in Y:Card-List, public in p:Player, public in Permuted:Boolean,
public in SameKey:Boolean, public in RX:Card-List, public in RY:Card-List)
1) For each player v in increasing order, such as v<>p do
1.1) Execute FI-UniVP-TP (L,T, X+RX, Y+RY, p, v, Permuted, SameKey)

Protocol FI-UniVP-TP
Signature: FI-UniVP-TP (private in L:Key-List, private in T:Permutation, public in X:Card-List, public in Y:Card-List, public in p:Player, public in v:Player, public in Permuted:Boolean, public in SameKey:Boolean)
1) If (SameKey) then
1.1) Set f:=1
1.2) Repeat until (f<s)
1.2.1) Set f:=f*(1/#X)
1.2.2) Execute FI-UniVP-Core (L, T, X, Y, p, v, Permuted, SameKey)
2) else
2.1) Execute FI-UniVP-Core (L, T, X, Y, p, v, Permuted, SameKey)

Procedure FI-Q
This procedure has many side effects, as it modifies the private variables R, Q', Q, $h_q$, $h_s$ and d.
Signature: FI-Q (macro)
1) Computes Q':=EncryptCards(Z, L).
2) Set R:=IfThenElse(Permuted,SORT,Identity)
3) Set Q:=Permute(Q', R)
4) Computes $h_q$:=H(<prover identity>|Q)
5) Chooses a random fixed length string d.
6) Computes $h_s$:=H($h_q$|d)
7) Broadcasts $\underline{h_s}$ (a commitment)

Procedure FI-Z
This procedure has many side effects, as it modifies the private variables r, Z', S,Z, W, and $h_w$.
1) r:=RandomKey( )
2) Computes Z':=EncryptCards(X,r)
3) Set U:=IfThenElse(SameKey,RandomPermutation(#X),Identity(#X))
4) Set S:=IfThenElse(Permuted,SORT,U)
5) Set Z:=Permute(Z', U)
6) Broadcast $\underline{Z}$.

Procedure FI-Check-Z
1) If r is watermarked, verifies the identity of the sender. If a mismatch is found, aborts.
2) Let G:=EncryptCards(X,r).
3) If (not SameKey) then
3.1) If not ($\underline{Z}$=G) then 3.1.1) Player v is cheating, trying to do a chosen plaintext attack.
4) else
4.1) If not IsPermutationOf($\underline{Z}$, G) then
4.1.1) Player v is cheating, trying to do a chosen plaintext attack.

Protocol FI-UniVP-Core
Signature: FI-UniVP-Core (
private in L:Key-List, private in T:Permutation,
public in X:Card-List, public in Y:Card-List, public in p:Player,
public in v:Player,
public in Permuted:Boolean, public in SameKey:Boolean)
L=Length(X)=Length(Y)
1) Player v:
1.1) Call FI-Z
1.2) Computes W':=EncryptCards($\underline{Y}$,r)
1.3) Set W:=Permute(W',S)
1.4) Computes $h_w$:=H(<prover identity>|W)
2) Player p:Call FI-Q.
3) Player v:
3.1) Broadcasts r.
4) Player p:
4.1) Call FI-Check-Z
4.2) Broadcasts $\underline{h_q}$ and $\underline{d}$
5) Player v:
5.1) Verifies that $h_w$=$h_q$ and that $h_s$=H($\underline{h_q}$|$\underline{d}$). If they are not equal, then player p is cheating.

5.2. Protocol FIG-UniVP

This protocol is similar to FI-UniVP but uses the CGC encryptor to make the verifier commitments. To it, we'll use the group property of the CGC and not only commutativity.

Protocol FIG-UniVP
Signature: FIG-UniVP (
private in L:Key-List,
private in T:Permutation,
public in X:Card-List,
public in Y:Card-List,
public in p:Player,
public in Permuted:Boolean,
public in SameKey:Boolean,
public in RX:Card-List,
public in RY:Card-List)
1) For each player v in increasing order, such as v<>p do
1.1) Execute FIG-UniVP-TP (L,T, X+RX, Y+RY, p, v, Permuted, SameKey)

Protocol FIG-TP
Signature: FIG-TP (private in L:Key-List, private in T:Permutation,
public in X:Card-List,
public in Y:Card-List, public in p:Player, public in v:Player,
public in Permuted:Boolean, public in SameKey:Boolean)
1) If (SameKey) then
1.1) Set f:=1
1.2) Repeat until (f<s)
1.2.1) Set f:=f*(1/#X)
1.2.2) Execute FIG-UniVP-Core (L, T, X, Y, p, v, Permuted, SameKey)
2) else
2.1) Execute FIG-Core (L, T, X, Y, p, v, Permuted, SameKey)

Protocol FIG-Core
Signature: FIG-Core (
private in L:Key-List, private in T:Permutation,
public in X:Card-List, public in Y:Card-List, public in p:Player, public in v:Player,
public in Permuted:Boolean, public in SameKey:Boolean)
L=Length(X)=Length(Y)
1) Player v: Call FI-Z
2) Player p:
2.1) Let t:=RandomKey( )
2.2) Computes G as, for each 1<=i<=#L, G[i]:=L[i]*t
2.3) Computes Q':=EncryptCards(Z, G').
2.4) Set R:=IfThenElse(Permuted,SORT,Identity)
2.5) Set Q:=Permute(Q', R)
2.6) Computes $h_s$:=H(<prover identity>|Q)
2.7) Broadcasts $\underline{h_s}$(a commitment)
3) Player v:
3.1) Broadcasts r.
4) Player p:
4.1) Call FI-Check-Z
4.2) Broadcasts $\underline{t}$
5) Player v:
5.1) Computes Y' as, for each 1<=i<=#$\underline{Y}$, Y'[i]:=$\underline{Y}$[i]*$\underline{t}$
5.2) Computes W':=EncryptCards(Y',r)
5.3) Set W:=Permute(W',S)
5.4) Computes $h_w$:=H(<prover identity>|W)
5.5) Verifies that $h_w$=$h_s$. If they are not equal, then player p is cheating.

5.3. Protocol I-UniVP

This is a multi-round cut-and-choose protocol. In each round verifier does the following operations: $X \rightarrow E_L \rightarrow P_T \rightarrow Y \rightarrow E_r \rightarrow P_U \rightarrow W$. E is encryption (with single or multiple keys), P is and optional permutation. R is a random key. W is transmitted to the verifier. Afterwards the verifier chooses to be sent the keys that encrypt X into W or the keys that encrypt Y into W (but not both).

Protocol I-UniVP
Signature: FI-UniVP (private in L:Key-List, private in T:Permutation, public in $\underline{X}$:Card-List,
  public in $\underline{Y}$:Card-List, public in p:Player, public in Permuted:Boolean,
  public in SameKey:Boolean, public in $\underline{RX}$:Card-List, public in $\underline{RY}$: Card-List)
1) For each player v in increasing order, such as v< >p do
1.1) Execute TI-UniVP (M, X+RX, Y+RY, p, v, Permuted, SameKey)

Protocol TI-UniVP
Signature: TI-UniVP (private in $\underline{L}$:Key-List, private in $\underline{T}$:Permutation, public in $\underline{X}$:Card-List, public in $\underline{Y}$:Card-List, public in p:Player, public in v:Player,
  public in Permuted:Boolean, public in SameKey:Boolean)
1) Set f:=1
2) Repeat until (f<s)
2.1) Set f:=f*(1/2)
2.2) Execute CI-UniVP (L, T, X, Y, p, v, Permuted, SameKey)

Protocol CI-UniVP
Signature: CI-UniVP (private in $\underline{L}$:Key-List, private in $\underline{T}$:Permutation,
  public in $\underline{X}$:Card-List, public in $\underline{Y}$:Card-List, public in p:Player, public in v:Player,
  public in Permuted:Boolean, public in SameKey:Boolean)
1) Player p:
1.1) Set r:=RandomKey( )
1.2) Set W':=EncryptCards(Y,r)
1.3) If Permuted then
1.3.1) Set U:=RandomPermutation(#X)
1.4) If (not Permuted) then
1.4.1) Set U:=Identity
1.5) Set W:=Permute(W', U)
1.6) Broadcasts $\underline{W}$ 2) Player v:
2.1) Set c:=Random({0,1}) (A random integer value similar to a coin flip)
2.2) Broadcasts $\underline{c}$
3) Player p:
3.1) If (c=0) then
3.1.1) If SameKey then
3.1.1.1) Set g:=r*L[1]
3.1.1.2) Broadcasts $\underline{g}$
3.1.2) If (not SameKey) then
3.1.2.1) Set G:=r*L (scalar product of vector L)
3.1.2.2) Broadcasts $\underline{G}$
3.2) if (c< >0) then
3.2.1) Set g:=r
3.2.2) Broadcasts $\underline{g}$
4) Player v:
4.1) If (c=0) then
4.1.1) If SameKey then
4.1.1.1) Computes Q:=EncryptCards($\underline{X}$, g)
4.1.2) if (not SameKey) then
4.1.2.1) Computes Q:=EncryptCards($\underline{X}$, G)
4.2) if (c< >0) then
4.2.1) Computes Q:=EncryptCards($\underline{Y}$, g)
4.3) If Permuted then
4.3.1) Check that Q is a permutation of W. If not, then player v is cheating,
4.4) if (not Permuted) then
4.4.1) Check that Q=W. If not, then player v is cheating, 5.4. Protocol NI-UniVP This protocol is obtained by modifying the I-UniVP protocol using the Fiat-Shamir transformation.
1) Player p:
1.1) Let F be a binary stream.
1.2) Save the prover identity into the stream F.
1.3) Repeat $s_{ni}$ times
1.3.1) Execute Step 1 of protocol I-UniVP locally (witting the broadcast outputs into the stream F)
1.4) Compute $h_f$:=H (F)
1.5) For i from 1 to $s_{ni}$ do
1.5.1) Take c to be the i-th bit of $h_f$ (the message digest $h_f$ must be long enough)
1.5.2) Execute Step 3 of protocol I-UniVP locally (writing the broadcast outputs into a stream T)
1.6) Construct the message (F, T) (the non-interactive proof).
1.7) Broadcasts ($\underline{F}$, $\underline{T}$)
2) All other players:
2.1) Compute u:=H ($\underline{F}$)
2.2) Read the prover identity from the stream F and check it. If not equal, abort.
2.3) For i from 1 to $s_{ni}$ do
2.3.1) Take c to be the i-th bit of u
2.3.2) Read the values G or g (depending on the protocol arguments) from the stream $\underline{F}$. If the stored value is of an invalid type (e.g: reads G expecting g) abort.
2.3.3) Execute Step 4 of protocol I-UniVP.

5.5. Protocol CO-VP

This is a cut-and-choose protocol to verify a round that can be either a locking round or shuffle-masking round. All the players act as provers and verifiers.
1) Players execute a unverified round (Locking or Shuffle-Masking) that transforms the card-list $\underline{X}$ into $\underline{Y}$ where $K_i$ is the list of key used by player i. Every player has taken part and want to verify the round.

2) Repeat a number of times until a security threshold has been achieved:
2.1) Each player i chooses a new single key or list of keys $R_i$ (depending on the kind of round)
2.2) Players re-execute the (still unverified) round with card-list $\underline{Y}$ as input and creates $\underline{Z}$ as output.
2.3) Each player commits to a value 0 or 1, similar to a coin-flip.
2.4) All players open the commitments and calculate a value c as the exclusive-or of all committed values.
2.5) If (c=0) then every player i:
2.5.1) Publishes $R_i$
2.5.2) Check that the operations done by each other player in the last round are correct.
2.6) If (c=1) then every player i:
2.6.1) Calculates S, as the item-by-item product of $K_i$ and $R_i$
2.6.2) Commits to $S_i$
2.6.3) Waits until all commitments have been done.
2.6.4) Opens the commitment and publishes $S_i$
2.6.5) After all commitments have been opened, computes S as the product of all $S_i$ values.
2.6.6) Checks that X can be transformed into Z by encrypting with S. The transformation may require a permutation if the round to verify is a Shuffle-Masking round.

Predefined VRPs

Several verification protocols have been defined so far. Theses protocols require that each player performs some private operations (like encryptions, decryptions and permutations of lists of cards) and that these operations are verified by the remaining players, without forcing the former player to reveal any secret key used during the operation. We've defined a generic and abstract protocol called UniVP to do so, and then we've specified different concrete protocols that can be used as UniVP (e.g. FI-UniVP). We've also described some protocols where each player from a subset performs a private operation on a list of cards and then pass the resulting card list to the following player in the set, who also performs the same kind of operation (e.g. Shuffle-Mask), and so on. All the private operations are verified by the remaining players.

This protocol structure was defined as an encryption round. We'll extend the UniVP concept to more efficiently handle encryption rounds. Instead of inserting each corresponding verification protocol just after each private operation, we can build protocols where many verifications are glued together in a single protocol, reducing the total number of encryptions done per player. As UniVPs have a single prover and multiple verifiers, we extend the UniVP concept to allow players to collaboratively and simultaneously prove many private operations (multiple provers), have multiple verifiers, and allow any prover to be verifier at the same time. To allow any combination of provers and verifiers, we specify the set of provers (P) and the set of verifiers (V) in the protocol signature. We call the resulting protocol a Verified Round Protocol (VRP).

VPRs can verify locking, masking of shuffle-masking rounds. One way to do so is to specify that all players are provers and verifiers at the same time (V=P), a mode we define as "(n→n)". If n is the number of players, then another way of getting a similar result is by repeating n times a VRP setting each possible prover as a single element in the set P, and specifying the remaining players as the V set (a mode we define as "n*(1→(n−1))". A third way is by repeating n times a VRP iterating a single verifier and the remaining players as provers, a mode we define as "n*((n−1)→1)". A fourth way is by repeating n*(n−1) times a VRP with a single prover and a single verifier, going through every possible pair where P<>V. Using this mode, the P-VRP protocol is almost identical to the FI-UniVP protocol. For every VRP, we can define an UniVP implemented as a single call to a VRP, using a single prover and the remaining players as verifiers (mode "1→(n−1)"). Instead of reimplementing the UniVPs, we can replace the round sub-protocols to take advantage of the (n→n) mode, which is generally more efficient.

We present many VRPs, one derived from the cut-and-choose UniVP already described (I-UniVP) and the rest derived from the FI-UniVP. The VRPs derived from FI-UniVP presented here have three variants regarding the resistance against homomorphic operator in the CGC:
No resistance (NR)
Resistant by inclusion of an unpredictable card in the challenge list. (IC)
Resistant by multiplying the challenge list by an unpredictable card value. (MC)

The method IC can only be used if the operation is Mask or Shuffle-Mask, but not Lock. The method MC can reduce considerable the number of repetitions (up to a single repetition) of the core sub-protocol, so the number of encryptions in the VRP becomes linear in n*c (where n is the number of players and c is the number of cards). Because we've developed several ways of applying the method MC in the VRPs, we've named each method $MC_1$, $MC_2$, and so on.

VRP protocol signature:
Signature: VRP(
   public in Player-Set P,
   public in Player-Set V,
   public in Permuted:Boolean,
   public in SameKey:Boolean,
   multi-private in L:Key-List,
   multi-private in T:Permutation,
   public in $\underline{X}$:Card-List,
   public in $\underline{Y}$:Card-List,
   public in $\underline{IRX}$:Card-List,
   public in $\underline{IRY}$:Card-List,
   public in $\underline{GOR}$:Boolean,
   public out $\underline{ORX}$:Card-List,
   public out $\underline{ORY}$:Card-List)

| | |
|---|---|
| P | The set of players that operate cards in a chain and want the operation to be verified. |
| V | The set of players that want to verify the chained operations. |
| Permuted | if true, permutes the cards on the set X, and verifies the correctness of the permutation. |
| SameKey | If true, then the encryptions are done using the same key. |
| L | L is the key-list each player will use to encrypt the elements in the list X. If SameKey = true, then the list must have only one element. |
| T | The permutation applied to X before encryption with M. |
| X | X is the list of plaintexts. X must be CU. |
| Y | Y is the list of shuffle-masked ciphertexts |
| IRX | IRX is a list of plaintexts used as input representatives. If RX is empty, then no representatives are being used. |
| IRY | The ciphertexts corresponding to each element in RX. |
| GOR | True to generate representatives (one per player). |
| IRX | ORX is a list of plaintexts used produced as output representatives<br>If GOR = false, the list will be empty. |
| IRY | The ciphertexts corresponding to each element in ORX. |

Auxiliary Sub-Protocols

In this section, some required sub-protocols are defined.
Sub-Protocol CoRandomValue This protocol chooses a pseudo-random value or bit-string collaboratively, so that no player can force the outcome. The shown protocol is one of the many possible ways of achieving this result.

Figure 17:
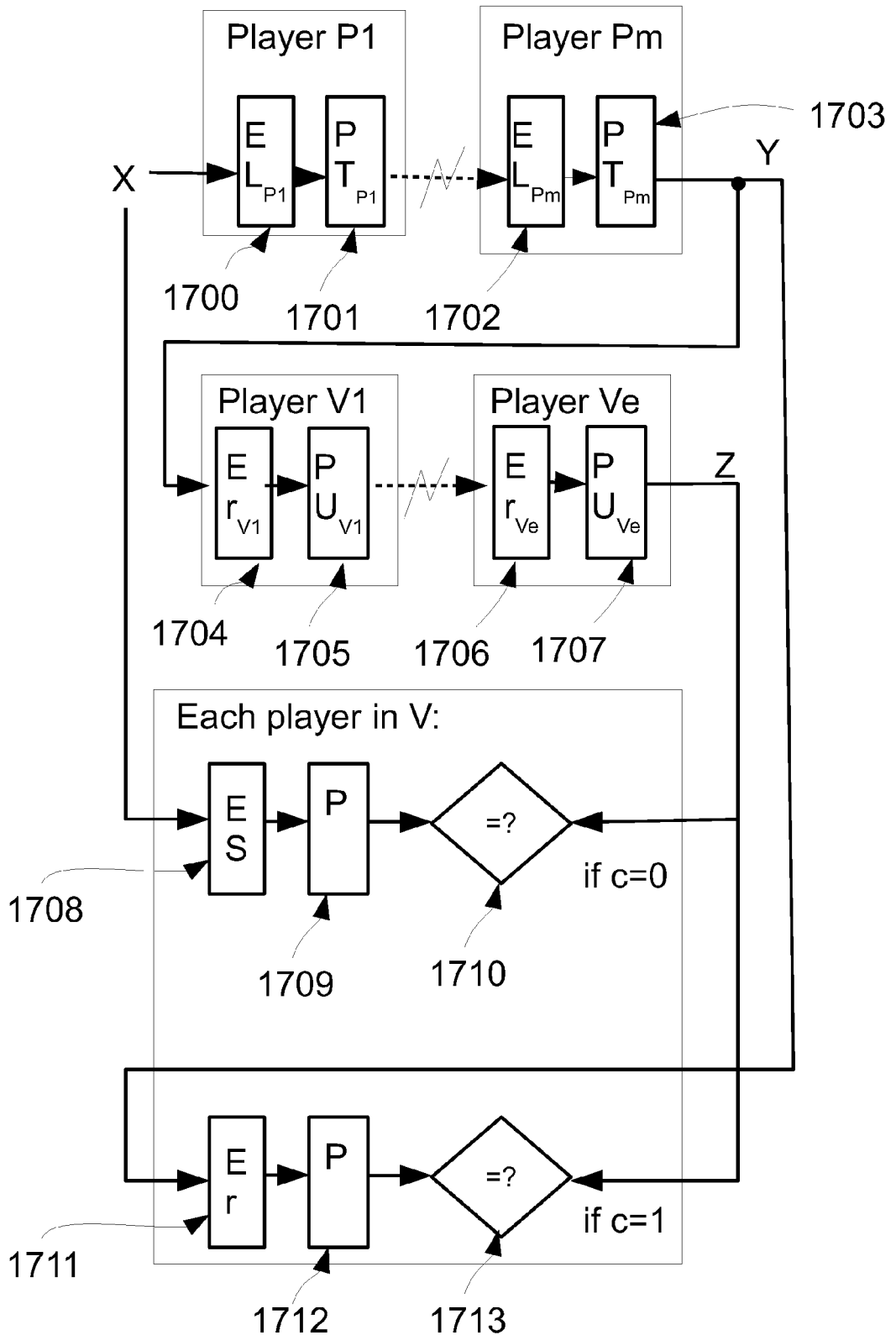
FIG. 17 illustrates a CC-VRP protocol, in accordance with an embodiment.

Signature: CoRandomValue(public in plyrs:Player-Set; public out v:bit-string)
  1) Each player i in plyrs:
    1.1) Chooses a fixed-length random number $r_i$:=RandomNumber( )
    1.2) Computes $cr_i$:=Commit($r_i$)
    1.3) Broadcasts $cr_i$ (a commitment to $r_i$)
  2) Each player i in plyrs:
    2.1) Broadcasts $r_i$ (opens the commitment)
    2.2) For each j, verifies that $cr_j$=Commit($r_j$)
    2.3) Computes v:=H($r_1$;$r_2$; . . . ;$r_n$)
Protocol: Sub-Protocol CoRandomCardValue
  This protocol chooses a pseudo-random card value collaboratively, so that no player can force the outcome. The shown protocol is one of the many possible ways of achieving this result. Another alternative is by executing a locking round starting with a single initially fixed card.
Signature: CoRandomCardValue(public in plyrs:Player-Set; public out v:Card)
  1) Execute CoRandomValue(plyrs,s)
  2) Computes v:=CreateCard(s)
Sub-Protocol UnverifiedRound
Executes an unverified round that can generate representatives, but where representatives plaintexts cannot be arbitrarily chosen by players.
Signature UnverifiedRound(
  public in Player-Set P,
  public in Permuted:Boolean,
  public in SameKey:Boolean,
  multi-private in L:Key-List,
  multi-private in T:Permutation,
  public in/out X:Card-List,
  public out fixed:Integer,
  public out Y:Card-List,
  public in GOR:Boolean,
  public out ORX:Card-List,
  public out ORY:Card-List)
  1) Set fixed:=0
  2) if (GOR) then
    2.1) Execute CoRandomCardValue({1 . . . n}, v)
    2.2.) Set X:=AppendCard(X,v) (Appends the element v element to the end of the list)
    2.3) Set fixed:=1
  3) Set $Y_0$:=X
  4) Each player i in P, in increasing order:
    4.1) $T_i$:=IfThenElse(Permuted,RandomPermutation(#X,fixed),Identity(#X))
    4.2) Set $L_i$:=IfThenElse(SameKey,RandomKeys(#X),RandomKeys(1))
    4.3) Constructs a card list $Y_i$:=LockCards(Permute($Y_{i-1}$,$T_i$), $L_i$)
    4.4) Broadcast $Y_i$.
  5) if (GOR) then
    5.1) All players, for each valid index i do:
      5.1.1) Set ORX[i]=$X_i$[#X]
      5.1.2) Set ORY[i]=$Y_i$[#X]
  6) Y=$Y_p$ (where p is the last player in P in the round)
Note that if GOR is true, then X is modified and the returned X value has one element appended.
Protocol CC-VRP
  This is a cut-and-choose protocol to verify a round that can be a either a locking round or shuffle-masking round. With reference to FIG. 17, the CC-VRP protocol is diagrammed. The diagram show the data flow between private player operations. Time flows downward. Boxes marked with a letter P in the upper half are permutations (the permutation is specified in the lower half). Boxes marked with letter E in the upper half are encryptions (the encryption key is specified in the lower half).
  Boxes marked with letter M in the upper half are multiplications (the value that multiplies each card in the input list is specified in the lower half). Boxes marked with letter A in the upper half mean that a card is be appended to the card-list (the card that is appended is specified in the lower half). In sequences of operations drawn horizontally, time flows according to the precedence of operations on data. The set of verifiers is V, and verifiers are always named V1 to Ve. The set of provers is P, and the provers are named P1 to Pm. A verifier can also be a prover.
  The diagram shows the XY-ROUND (1700 to 1703) and a single iteration of the YZ-Round sub-protocol (1704 to 1713). First, during XY-ROUND, provers do private encryptions (1700, 1702) along with private permutations (1701, 1703). Afterwards the sub-protocol YZ-Round is iterated until a security threshold is achieved. In the YZ-Round protocol, verifiers re-encrypt Y (1704, 1070) and permute Y (1705, 1707) to get Z. The kind of permutation applied in 1705 and 1707 depends on the arguments of the protocol ("Permuted", "SameKey" and "GOR") and can be a sort, a random permutation or the identity.
  After Z is constructed, verifiers execute a sub-protocol (CoCoinFlip) similar to the thrown of a virtual coin to produce a pseudo-random value c collaboratively. If c=0, then players execute the protocol Validate-XZ, in which verifiers construct a key-list S. The verifiers encrypt X with key-list S (1708) and permute the resulting card-list according to rules based on the protocol arguments (1709), and finally check he result against Z (1710). If both card-lists are equal, no cheating has occurred in that iteration of the protocol. If c=1, then players execute the protocol Validate-YZ, in which verifiers construct a key r. The verifiers encrypt Y with key r (1711) and then permute the resulting card-list according to rules based on the protocol arguments (1712), and finally check he result against Z (1713). If both card-lists are equal, no cheating has occurred in that iteration of the protocol. The use of commitments thwarts the possibility of a subset of verifiers colluding with provers to cheat another subset of verifiers.
  Sub-Protocol: CoCoinFlip (out c:Integer)
    1) Each player i in V:
      1.1) Set $c_i$:=Random(2) (similar to a coin-flip)
      1.2) Set $f_i$:=Commit($c_i$)
      1.3) Publish $f_i$ (publishes the commitment)
    2) Each player i in V:
      2.1) Publish $c_i$ (opens the commitment)
    3) Each player i:
      3.1) For each player j in V, verify that CHECK($c_j$, $f_j$). If false, then player j is cheating.
    4) All players: Set c:=exclusive-or of all $c_j$ values, for all verifiers j.
  Sub-Protocol Validate-YZ (macro)
    1) Every player i in P:
      1.1) Publishes $r_i$
    2) Option 1: Check that the operations done by each other player in the YZ-ROUND are correct. This check must take into account the "permuted" and "samekey" flags.
    3) Option 2:
      3.1) Computes r:=product of all $r_i$ values, for all i in P.
      3.2) Compute Z':=EncryptCards(Y,r)
      3.3) Set pass:=IfThenElse(Permuted,IsPermutationOf(Z',Z,fixed),Z=Z')
      3.4) Check pass=true. If not, then a player is cheating.

Figure 18:
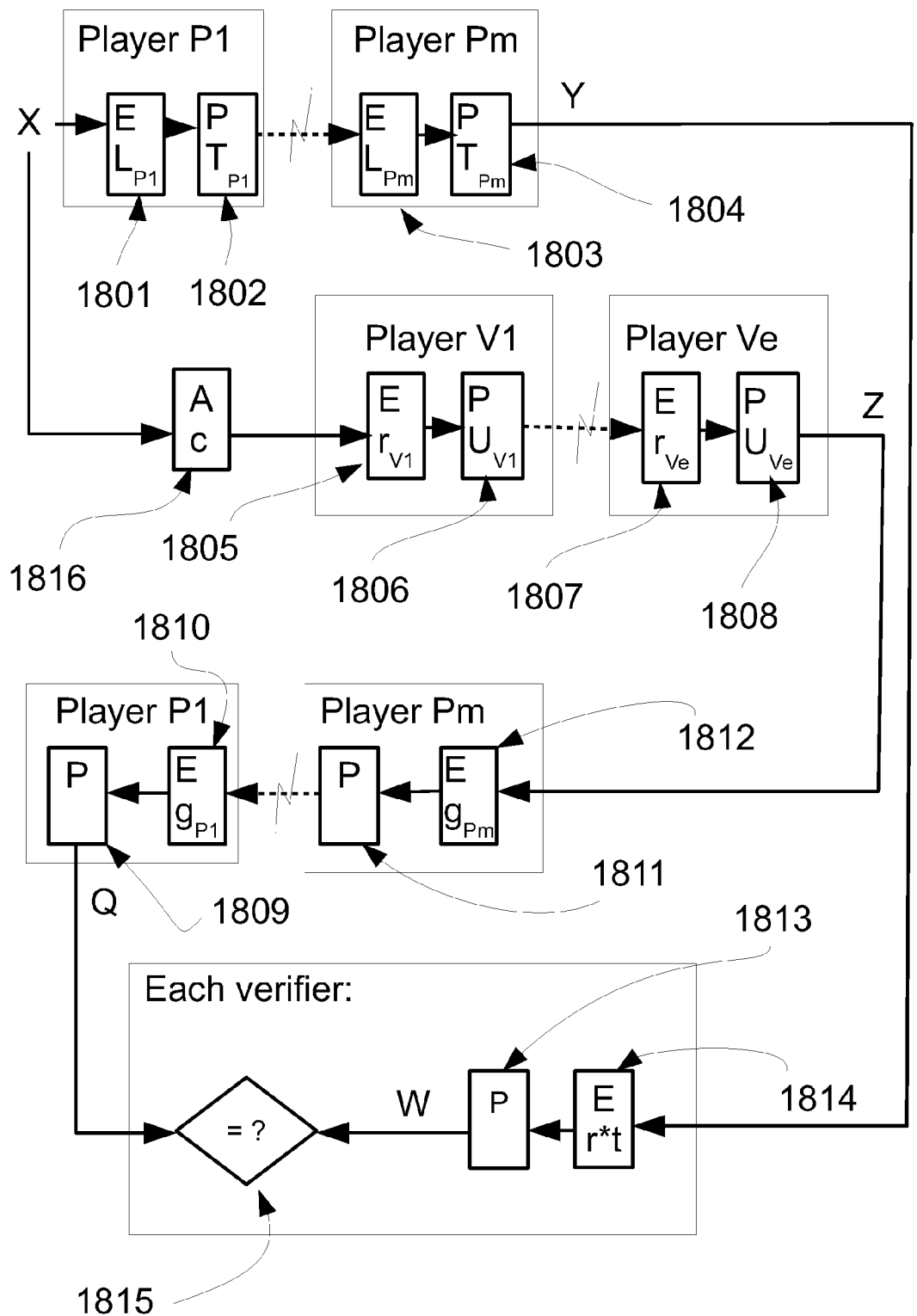
FIG. 18 illustrates an S-VRP protocol, in accordance with an embodiment.

Sub-Protocol Validate-XZ
1) Every player i in P:
1.1) Calculates $S_i$ as the item-by-item product of $L_i$ and $r_i$.
1.2) Set $h_i$:=Commit($S_i$)
1.3) Publish $\underline{h_i}$ (publishes the commitment to $S_i$)
2) Every player i in P:
2.1) Publish $\underline{S_i}$ (opens the commitment)
3) Each player i in V:
3.1) For each player j in P, verify that CHECK($\underline{S_j}$, $\underline{h_j}$). If false, then player j is cheating.
4) Every player j in V:
4.1) Computes $\underline{S}$:=product of all $S_i$ values, for all i in P.
4.2) Compute $\underline{Z'}$:=EncryptCards($\underline{X}$,$\underline{S}$)
4.3) Set pass:=IfThenElse(Permuted,IsPermutationOf($\underline{Z'}$, $\underline{Z}$,fixed),$\underline{Z}$=$\underline{Z'}$)
4.4) Check pass=true. If not, then a player is cheating.
Sub-Protocol YZ-Round (Macro)
1) UnverifiedRound (P,Permuted, true, $r_i$,Q,$\underline{Y}$, fixed2, $\underline{Z}$, false,[ ], [ ]).
2) Execute CoCoinFlip(c)
3) If ($\underline{c}$=0) then
3.1) Execute Validate-YZ
4) If ($\underline{c}$=1) then
4.1) Execute Validate-XZ
Protocol CC-VRP
1) Check that SameKey=true or Permuted=False. This protocol cannot execute a round where SameKey=false and Permuted=True.
2) Execute XY-ROUND
3) Set f:=1
4) Repeat until (f<s)
4.1) Set f:=f*(1/2)
4.2) Execute YZ-Round
Protocol S-VRP
S-VRP is an extension of FI-UVP where some players operate on the cards in a round and some other set of the players verify the operations done. With reference to FIG. 18, the S-VRP protocol is diagrammed. The diagram uses the same nomenclature as FIG. 17. The diagram shows the XY-ROUND (1801 to 1804) and a single iteration of the S-Core sub-protocol (1805 to 1813). First, during XY-ROUND, provers do private encryptions (1801, 1703) along with optional private permutations (1802, 1804).

The S-Core sub-protocol is iterated until a security threshold is achieved. The S-Core sub-protocol has three stages.

In the first stage, all verifiers operate on the card-list X in a round to get the card-list Z (the "challenge") in sub-protocol XpZ-ROUND. The operations include encryptions (1805, 1807) and permutations (1806,1808). In the second stage (sub-protocol ZQ-ROUND), provers re-encrypt Z (1812, 1810) and permute the resulting card-list (1809, 1811) to obtain Q (the "response"). Verifiers then prove the correctness of the XpZ-ROUND round by executing the protocol CHECK-XpZ-ROUND. Then verifiers build the key r using the information published by remaining verifiers. Players execute CHECK-ZQ-ROUND to verify the correctness of the calculation of Q and verifiers compute the key t using information published by the provers. Verifiers obtain W by re-encrypting Y with the key r*t (1814), and applying a permutation to the resulting card-list (1813). Finally, the verifiers check the response. This is done by comparing Q against W (1815). Cheating has occurred if the comparison fails. The operation 1816 is bypassed on protocol S-VRP. The protocol is protected against suicide cheating. Note that a similar protocol can be obtained by switching the roles of X and Y for the S-Core sub-protocol. This is true for all VRP protocols described herein.

Figure 19:
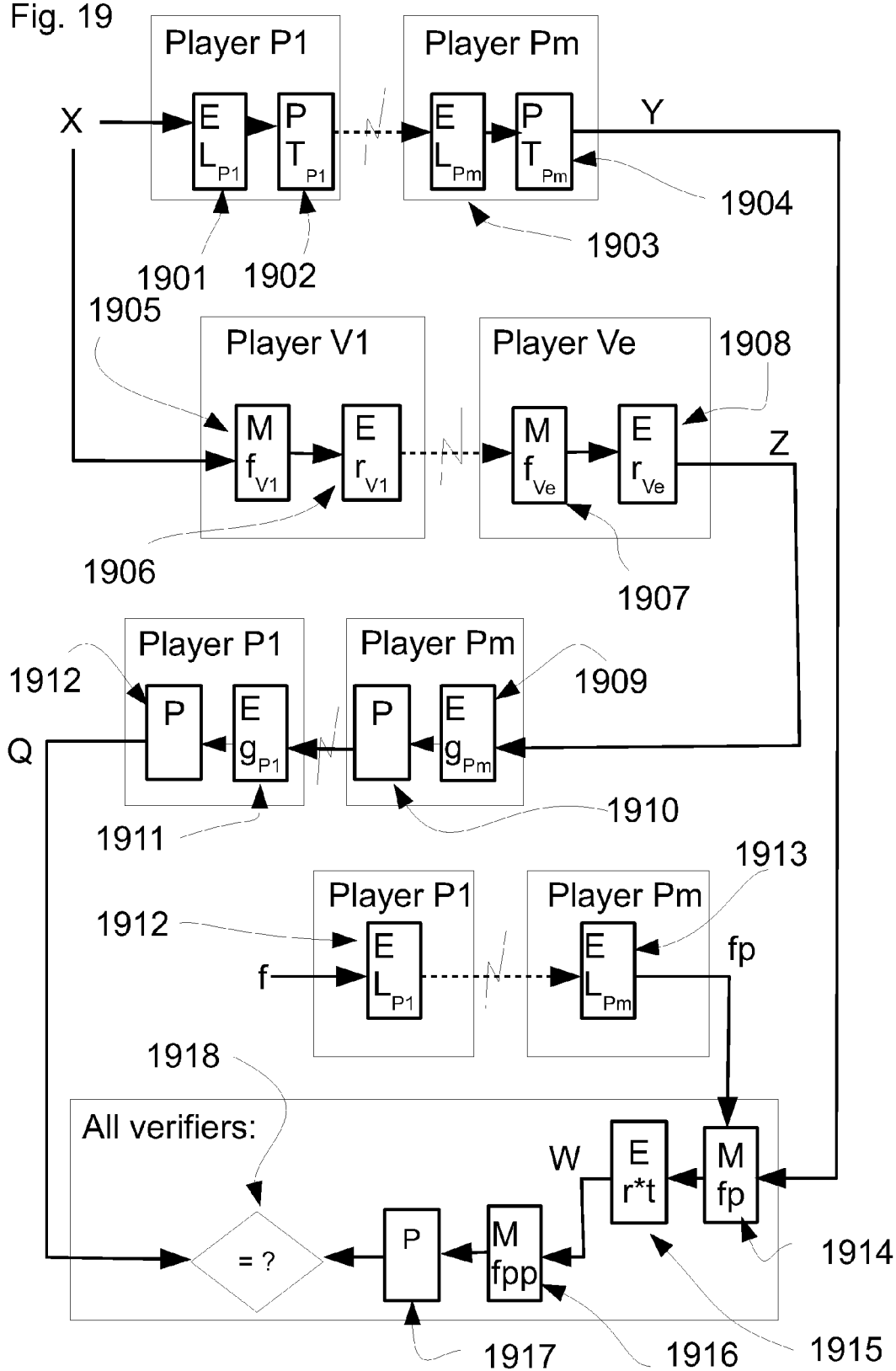
FIG. 19 illustrates an S-VRP-$MC_1$ protocol, in accordance with an embodiment.

Sub-Protocol XpZ-ROUND (Macro)
1) Let $\underline{Z_0}$=$\underline{X}$
2) Each player v, in increasing order
2.1) If not (v in V) then
2.1.1) Set $\underline{Z_v}$:=$\underline{Z_{v-1}}$
2.2) else
2.2.1) Let $r_v$:=RandomKey( )(can be watermarked)
2.2.2) Set $c_v$:=Commit($r_v$)
2.2.3) Publish $c_v$
2.2.4) Computes $\underline{Z'_v}$:=EncryptCards($\underline{Z_{v-1}}$*$f_v$,$r_v$)
2.2.5) Set $U_v$:=IfThenElse(PermuteOnXZ,RandomPermutation(#X,fixed),Identity(#X))
2.2.6) Set $Z_v$:=Permute($Z_v'$, $U_v$)
2.2.7) Broadcast $\underline{Z_v}$.
3) Let $\underline{Z}$=$\underline{Z_c}$, where c is the highest numbered player.
Protocol S-VRP
1) Execute XY-ROUND
2) If (SameKey) then
2.1) Set fac:=1
2.2) Repeat until (fac<security-threshold)
2.2.1) Set fac:=fac*(1/#Y)
2.2.2) Execute S-Core
3) else
3.1) Execute S-Core
Procedure BUILD-QP (macro)
1) if (SameKey) then
1.1) if (RedoXYPermutationOnZQ) then
1.1.1) $QP_i$:=$T_i$.
1.2) else if (Permuted) then
1.2.1) Option 1: $QP_i$:=SORTPERM($Q_i'$, fixed).
1.2.2) Option 2: $QP_i$:=RandomPermutation(#$Q_i'$, fixed).
1.3) else
1.3.1) Set $QP_i$:=Identity
2) else
2.1) Set $QP_i$:=Identity
Procedure BUILD-G (macro)
1) For each in such as (1<=i<=#L):$G_i[i]$:=$L_i[i]$*$t_i$
Sub-Protocol ZQ-ROUND (macro)
1) Let $Q_0$:=$\underline{Z}$
2) Each player i in P, in increasing order:
2.1) Set $t_i$:=RandomKey( )
2.2) Call BUILD_QP
2.3) Call BUILD_G
2.4) Computes $Q_i$:=EncryptCards($Q_{i-1}$, $G_i$)
2.5) Computes $Q_i$:=PermuteCards($Q_i$, $QP_i$)
2.6) Set $h_i$:=Commit($t_i$)
2.7) Publish $\underline{h_i}$
2.8) Publish $Q_i$
3) Each player i in V:
3.1) Broadcasts $r_i$ and $f_i$.
Sub-Protocol FIND-f (Macro)
1) If the main protocol is S-VRP-$MC_1$ or S-VRP-$MC_3$:
1.1) If (fixed>0) or (not Permuted) then
1.1.1) Set f:=Z[#Z]*$E_r$(X[#X])$^{-1}$
1.2) Else (this case is fixed=0 and permuted=true)
1.2.1) Find d (1<=d<=#Z) so that f=Z[d]*$E_r$(X[1])$^{-1}$ and IsPermutationOf($\underline{Z'}$*f,$\underline{Z}$). If f cannot be found, then cheating has occurred.
2) if the main protocol is S-VRP or (not SameKey):
2.1) Set f:=1
Sub-Protocol BUILD_U (Macro)
1) If RedoXYPermutationOnZQ then
1.1) Build the composition permutation U used to transform Xp into Z using the calculated r value.
2) else if (not permuted) then
2.1) Set U:=Identity 3) else
3.1) U:=SORTPERM(Zpp, fixed)
Sub-Protocol CHECK-XpZ-ROUND (Macro)
1) Each player i in Union(P,V) does:
1.1) Compute $r$:=Product(each player number v:$r_v$)
1.2) Compute Zp:=EncryptCards(Xp,r).
1.3) Execute FIND_f
1.5) Let Zpp:=f*Zp.
1.6) Execute BUILD_U
1.7) Zpp:=Permute(Zpp, U)
1.8) if (Z<>Zpp) then
1.8.1) There is a player that is cheating, trying to do a chosen plaintext attack, find out which player is it check that each EncryptCards( ) operation done in XpZ-ROUND is correct.
1.9) For each player v: If $r_v$ value is watermarked, then the identity of each sender is verified. If a mismatch is found, abort.
Sub-Protocol FIND-fpp (Macro)
1) Set fpp:=1
2) If caller protocol is S-VRP-MC$_1$ or S-VRP-MC$_3$ then
2.1) If (fixed>0) or (not Permuted)
2.1.1) Set fpp:=W[#W]$^{-1}$*Q[#Q]
2.2) else
2.2.1) Find d (1<=d #Q) such as fpp=W[d]$^{-1}$*Q[1] and IsPermutationOf(fpp*W',Q, fixed). If fpp cannot be found, then cheating has occurred.
3) if protocol caller is S-VRP-MC$_2$ and SameKey then
3.1) Set fpp:=LockCard(fp, r*t)
Sub-Protocol BUILD_WP (Macro)
1) WP:=IfthenElse(permuted,SORTPERM(W,fixed),W)
Sub-Protocol CHECK-ZQ-ROUND (Macro)
1) Each player i in P:
1.1) Broadcasts $t_i$
2) Each player i in V does:
2.1) For each player j: Verify that CHECK($t_j,h_j$) is true (verifying the commitment).
2.2) Compute $t$:=Product(each player j, $t_j$)
3) Compute W:=EncryptCards(Y, r*t)
4) Execute FIND-fpp
5) Set W:=fpp *W'
6) Execute BUILD_WP
7) W:=Permute(W,WP)
Sub-Protocol CHECK-WQ (Macro)
1) Each player i in V does:
1.1) Compare W to Q. If not equal, then a player is cheating. To identify the cheating player, each player proves to the others that the operation "$Q_i$:=EncryptCards( . . . )" done in protocol S-ZQ-ROUND is correct.
Protocol S-Core (Macro)
1) Set Xp:=X
2) Set PermuteOnXZ:=SameKey
3) Set RedoXYPermutationOnZQ:=(not permuted) and samekey.
4) Execute XpZ-ROUND
5) Every player v in V: Set $f_v$:=1
6) Execute ZQ-ROUND
7) Execute CHECK-XpZ-ROUND
8) Execute CHECK-ZQ-ROUND
9) Execute CHECK-WQ
Protocol S-VRP-IC
S-VRP-IC is a variation of S-VRP. The main difference is that a new card is appended to the card list X (creating a new card-list Xp) in each iteration, in order to prevent the use of the homomorphic properties of the CGC to cheat. With reference to FIG. 18, the S-VRP-IC protocol is diagrammed. In 1816 players append a randomly and collaboratively chosen card to the list. The card is specially treated during the final check in 1815. The remaining references correspond to those described along with protocol S-VRP.
Protocol S-VRP-IC
1) Execute XY-ROUND
2) If (SameKey) then
2.1) Set fac:=1
2.2) Repeat until (fac<security-threshold)
2.2.1) Set fac:=fac*(1/#Y)
2.2.2) Execute S-Core-IC
3) else
3.1) Execute S-Core-IC
Protocol CHECK-WQ-IC (Macro)
1) Each player i in V does:
1.2) Check that #Q=#W+1.
1.3) Check that there is a single element in Q that is not included in W.
1.4) Check that all elements from W are included in Q.
5) If these conditions are not met, cheating has occurred. To identify the cheating player, each player proves to the others that the operation "$Q_i$:=EncryptCards( . . . )" done in ZQ-ROUND is correct.
Protocol S-Core-IC (Macro)
1) if (not SameKey) then abort
2) Execute CoRandomCardValue(P,c)
3) Set Xp:=AppendCard(X,c)
4) Set PermuteOnXZ:=true
5) Set RedoXYPermutationOnZQ:=(not permuted)
6) Execute XpZ-ROUND
7) Execute ZQ-ROUND
8) Execute CHECK-XpZ-ROUND
9) Execute CHECK-ZQ-ROUND
10) Execute CHECK-WQ-IC
Protocol S-VRP-MC$_1$
Protocol S-VRP-MC$_1$ is a variation of S-VRP which uses the homomorphic properties of a CGC in order to avoid the need of iterations that S-VRP requires to achieve a security threshold. With reference to FIG. 19, the S-VRP-MC$_1$ protocol is diagrammed. The diagram uses the same nomenclature as FIG. 17.

The protocol has four stages. First, the protocol XY-ROUND is executed (1901 to 1904), and provers do private encryptions (1901, 1903) along with private permutations (1902, 1904). In the second stage, provers choose collaboratively a random card s and afterwards all verifiers operate on the card-list X in a round to get the card-list Z (the "challenge") in sub-protocol XpZ-ROUND. The operations include the multiplication of each card by a constant unknown to the rest of the players (1905, 1907) but which depends on the s value previously chosen by provers, followed by encryptions (1906,1908).

Depending on the protocol arguments, permutations during this round may be allowed but are not required. In the third stage (sub-protocol ZQ-ROUND), provers re-encrypt Z (1909,1911) and permute the resulting card-list (1910, 1912) to obtain Q (the "response"). Verifiers then prove the correctness of the XpZ-ROUND round by executing the protocol CHECK-XpZ-ROUND. Then verifiers build the key r using the information published by verifiers. Players execute CHECK-ZQ-ROUND to verify the correctness of the calculation of Q and verifiers compute the key t using information published by the provers. Verifiers compute the factor fpp (sub-protocol FIND-fpp) by one of two different methods, depending on protocol arguments.

Verifiers obtain W by re-encrypting Y with the key r*t (1915), multiplying the factor fpp (1916), and applying a permutation to the resulting card-list (1917). Finally, the verifiers check the response. This is done by comparing Q against W (1917). Cheating has occurred if the comparison fails. The operations 1912, 1913 and 1914 are bypassed in protocol S-VRP-MC$_1$. The protocol is protected against suicide cheating.

Protocol SETUP-X-MC$_1$ (Macro)
1) if (#X>1) and (SameKey) then
 1.1) Each player i in V:
  1.1.1) Set u$_i$:=RandomCard( )
  1.1.2) cu$_i$:=Commit(u$_i$)
  1.1.3) Publish cu$_i$,
 1.2) Execute CoRandomCardValue(P,s)
 1.3) Each player i in V:
  1.3.1) Set f$_i$:=s*u$_i$
2) else
 2.2) Every player v in V:
  2.2.1) Set f$_v$:=1
3) Set Xp:=X
Protocol S-VRP-MC$_1$
1) if (#X>1) and (not SameKey) and (Permuted) then abort
2) Execute XY-Round
3) Execute SETUP-X-MC$_1$
4) Set PermuteOnXZ:=false
5) Set RedoXYPermutationOnZQ:=false
6) Execute XpZ-ROUND
7) Execute ZQ-ROUND
8) Execute CHECK-XpZ-ROUND
9) Execute CHECK-ZQ-ROUND
10) Execute CHECK-WQ
Protocol S-VRP-MC$_2$ Protocol S-VRP-MC$_2$ is another variation of S-VRP which uses the homomorphic properties of a CGC in order to avoid the need of iterations that S-VRP requires to achieve a security threshold. With reference to FIG. 19, the S-VRP-MC$_2$ protocol is diagrammed. The diagram uses the same nomenclature as FIG. 17. In the protocol S-VRP-MC$_2$ only the first verifier multiplies the X (1905) with a pseudo-random value f chosen collaboratively between all players.

The remaining multiplication operations of this round are bypassed (1907). Also, the fpp factor is not used (operation 1916 is bypassed) and the fp factor is used instead for multiplication (1914). Instead of letting each verifier compute the factor privately as in S-VRP-MC$_1$, the sub-protocol FP-ROUND is executed. During this sub-protocol, the fp value is calculated progressively and sequentially by re-encrypting the value f. Afterwards the provers prove the correctness of the private encryptions done in FP-ROUND to the remaining players.

The proof can be accomplished by any other LVP. The FP-ROUND can also be carried out by recursively calling S-VRP-MC$_2$. Note that FP-ROUND is only executed if #X>1 so that the recursion is not infinite. Operation 1915 is bypassed. All the remaining operations have already been described along with S-VRP-MC$_1$. The protocol is protected against suicide cheating.

Sub-Protocol SETUP-X-MC$_{23}$ (Macro)
1) Every player v in V:
 1.1) Set f$_v$:=1
2) if (#X>1) and (SameKey) then
 2.1) Execute CoRandomCardValue(Union(P,V),f)
  2.1.1) Let i be the first player in V in the round. Player i does:
   2.1.1.1) Set f$_i$:=f
3) Set Xp:=X
Sub-Protocol FP-ROUND (Macro)
1) if (#X>1) and (SameKey) then
 1.1) Option 1: Execute S-VRP recursively to prove an encryption round from f to fp with:
  1.1.1) Execute S-VRP(P,Union(P,V),false,false,L,Identity, [f],F',[ ].[ ],false,[ ].[ ])
  1.1.2) Set fp:=F'[1].
 1.2) Option 2: Process the round without using an S-VRP:
  1.2.1) Set b$_0$:=f.
  1.2.2) Set idx:=1
  1.2.3) For each player i in P, in increasing order:
   1.2.3.1) Compute b$_{idx}$:=LockCard(b$_{idx-1}$,L$_i$)
   1.2.3.2) Execute any LVP to prove the remaining players that each b$_{idx-1}$ encrypts to b$_{idx}$ with key L$_i$.
   1.2.3.3) Set idx:=idx+1
  1.2.4) Set fp:=b$_{idx-1}$
Protocol S-VRP-MC$_2$
1) if (#X>1) and (not SameKey) and (Permuted) then abort
2) Execute XY-ROUND
3) Execute SETUP-X-MC$_2$
4) Set PermuteOnXZ:=false
5) Set RedoXYPermutationOnZQ:=false
6) Execute XpZ-ROUND
7) Execute ZQ-ROUND
8) Execute CHECK-XpZ-ROUND
9) Execute FP-ROUND
10) Execute CHECK-ZQ-ROUND
11) Execute CHECK-WQ
Protocol S-VRP-MC$_3$ Protocol S-VRP-MC$_3$ is another variation of S-VRP which uses the homomorphic properties of a CGC in order to avoid the need of iterations that S-VRP requires to achieve a security threshold. With reference to FIG. 19, the S-VRP-MC$_3$ protocol is diagrammed. The diagram uses the same nomenclature as FIG. 17. As in S-VRP-MC$_2$, only the first verifier multiplies the X (1905) with a pseudo-random value f chosen collaboratively between all players.

The remaining multiplication operations of this round are bypassed (1907). The operation 1914 is bypassed (the factor fp is not used). Instead, each verifier compute the factor fpp privately as in S-VRP-MC$_1$. Operation 1914 is bypassed. All the remaining operations have already been described along with S-VRP-MC$_1$. The protocol is protected against suicide cheating.

Figure 20:
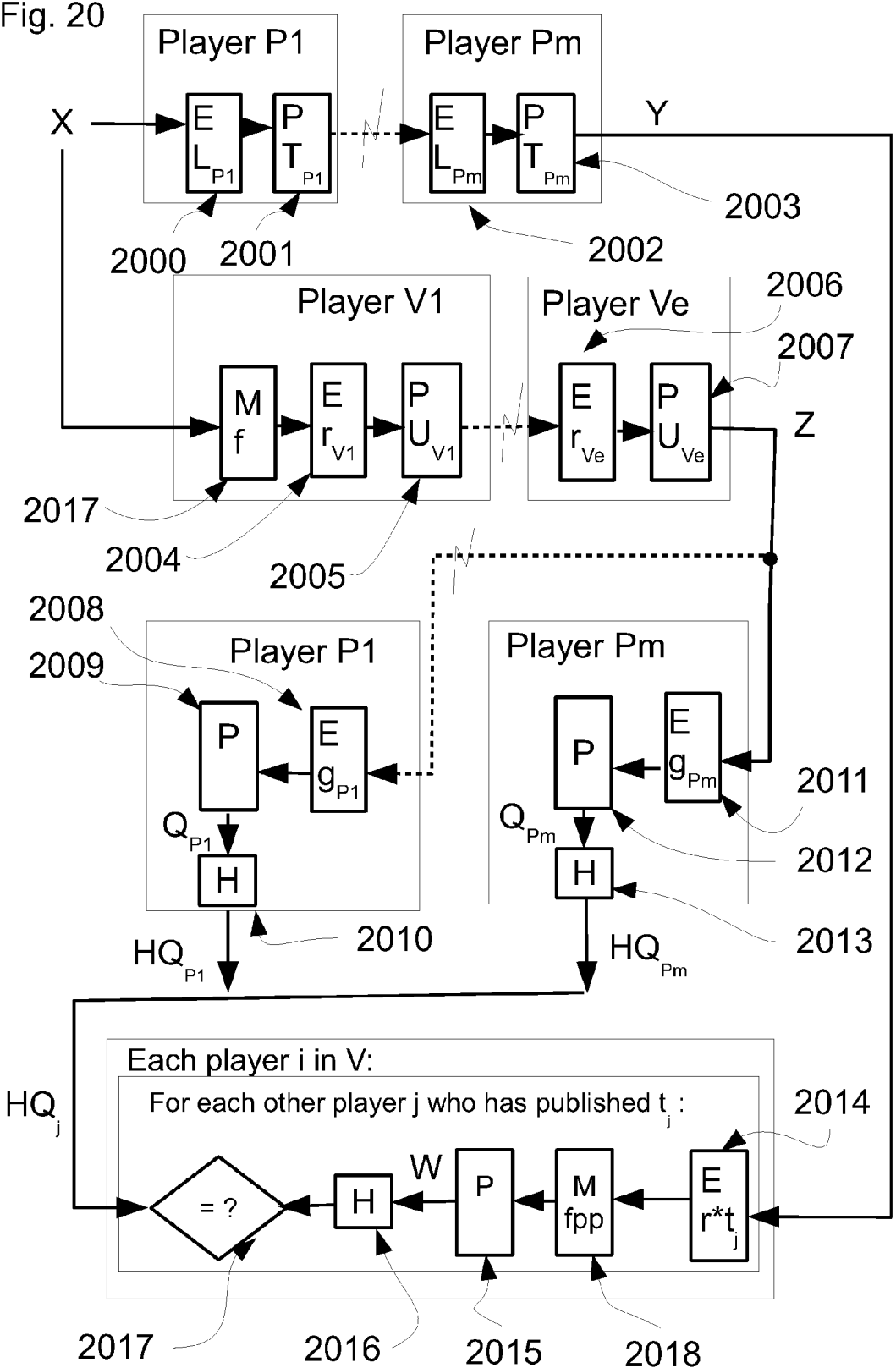
FIG. 20 illustrates a P-VRP protocol, in accordance with an embodiment.

Protocol S-VRP-MC$_3$
1) if (#X>1) and (not SameKey) and (Permuted) then abort
2) Execute XY-ROUND
3) Execute SETUP-X-MC$_{23}$
4) Set PermuteOnXZ:=false
5) Set RedoXYPermutationOnZQ:=false
6) Execute XpZ-ROUND
7) Execute ZQ-ROUND
8) Execute CHECK-XpZ-ROUND
9) Execute CHECK-ZQ-ROUND
10) Execute CHECK-WQ
Protocol P-VRP P-VRP is another extension to the FI-UVP protocol. The protocol has three stages. The first two are similar to the first two stages of S-VRP. The third stage is a parallel stage, where each prover generates its own response independent from the other provers responses. P-VRP will only outperform S-VRP when the computing power is not limiting, the communication bandwidth is limited or there are many cards in the deck. S-VRP generally outperforms P-VRP if there are very few cards to shuffle or the computing power is a limiting factor. The protocols is protected against suicide cheating. With reference to FIG. 20, the P-VRP protocol is diagrammed. The diagram uses the same nomenclature as FIG. 17. The diagram shows the XY-ROUND (2000 to 2003) and a single iteration of the P-Core sub-protocol (2004 to 2018). First, during XY- ROUND, provers do private encryptions (2000,2002) along with private permutations (2001, 2003) depending on the protocol arguments.

The P-Core sub-protocol is iterated until a security threshold is achieved. The P-Core sub-protocol has three stages.

In the first stage, all verifiers operate on the card-list X in a round to get the card-list Z (the "challenge") in sub-protocol XpZ-ROUND. The operations include encryptions (2004, 2006) and permutations (2005,2007). In the second stage (sub-protocol P-ZQ), each prover i re-encrypt Z (2008, 2011) and permute the resulting card-list (2009, 2012) to obtain $Q_i$ and then cryptographically hashes it (2010,2013) to obtain $HQ_i$ (the "response"). $HQ_i$ is published. Each prover process Z in parallel so it's not an encryption round. Verifiers then prove the correctness of the XpZ-ROUND round by executing the protocol CHECK-XpZ-ROUND. Each verifier build the key r using the key information published by all verifiers. Players execute P-CHECK-WQ to verify the correctness of the calculation of $HQ_j$ for each prover j. For each prover j, verifiers obtain a new $W_j$ value by re-encrypting Y with the key $r*t_j$ (2014), and applying a permutation to the resulting card-list (2015), and then hashing the result (2016) to obtain $HW_j$. Finally, the verifiers check the response. This is done by comparing $HQ_j$ against $HW_j$ (2017). Cheating has occurred if the comparison fails. The operation 2018 and 2017 are bypassed in protocol P-VRP.

Protocol P-VRP
1) Execute XY-ROUND
2) If (SameKey) then
2.1) Set fac:=1
2.2) Repeat until (fac<security-threshold)
2.2.1) Set fac:=fac*(1/#Y)
2.2.2) Execute P-Core
3) else
3.1) Execute P-Core
Sub-Protocol P-ZQ (Macro)
1) Let $\underline{Q_0}:=\underline{Z}$
2) Each player i in increasing order:
2.1) Set $t_i$:=RandomKey( )
2.2) Call BUILD-QP
2.3) Call BUILD-G
2.4) Computes $\underline{Q_i}$:=EncryptCards($Q_{i-1}, G_i$)
2.5) Computes $\underline{Q_i}$:=PermuteCards($Q_i, QP_i$)
2.6) Set $h_i$:=Commit($t_i$)
2.7) Publish $\underline{h_i}$
2.8) Set $HQ_i$:=$H(Q_i)$
2.9) Publish $HQ_i$
Sub-Protocol P-CHECK-WQ (Macro)
1) Each player i (in parallel):
1.1) Broadcasts $t_i$
1.2) For every other player j, after it has published $t_j$:
1.3) Verify that CHECK($t_j,h_j$) is true (verifying the commitment).
1.4) Compute $\underline{W_j'}$:=EncryptCards($\underline{Y}, r*t_j$)
1.5) If main protocol is P-VRP-MC:
1.5.1) Set $fpp_j$:=EncryptCard($f_j, r*t_j$)
1.5.2) Set $\underline{W_j'}$:=$\underline{W_j'}$*$fpp_j$
1.6) $W_j'$:=IfThenElse(Permuted,SORT($\underline{W_j'}$,fixed),$\underline{W_j'}$)
1.7) Set $HW_j$:=$H(\underline{W_j})$.
1.8) Compare $\underline{HW_j}$ to $\underline{HQ_j}$. If not equal, then the player j is cheating.
Sub-Protocol P-Core (Macro)
1) Set PermuteOnXZ:=SameKey
2) Set RedoXYPermutationOnZQ:=(not permuted) and samekey.
3) Execute XpZ-ROUND
4) Each player i in P: Set $f_i$:=1
5) Execute P-ZQ
6) Execute CHECK-XpZ-ROUND
7) Execute P-CHECK-WQ
Protocol P-VRP-MC Protocol P-VRP-MC is a variation of P-VRP which uses the homomorphic properties of a CGC in order to avoid the need of iterations that P-VRP requires to achieve a security threshold. With reference to FIG. 20, the P-VRP-MC protocol is diagrammed. Before the XpZ-ROUND takes place, players choose a pseudo-random card value f collaboratively. The card list X is multiplied by f before entering XpZ-ROUND. At any time before CHECK-XpZ-ROUND, provers execute the protocol F-ROUND. During F-ROUND, each prover j computes a factor $f_j$ and broadcasts it. Proves are not required to prove of correctness of the locking operation done during F-ROUND, although provers could also provide such a proof. The factor $f_j$ is used by each verifier to compute $fpp_j$, that multiplies the card-list in 2018.

Figure 21:
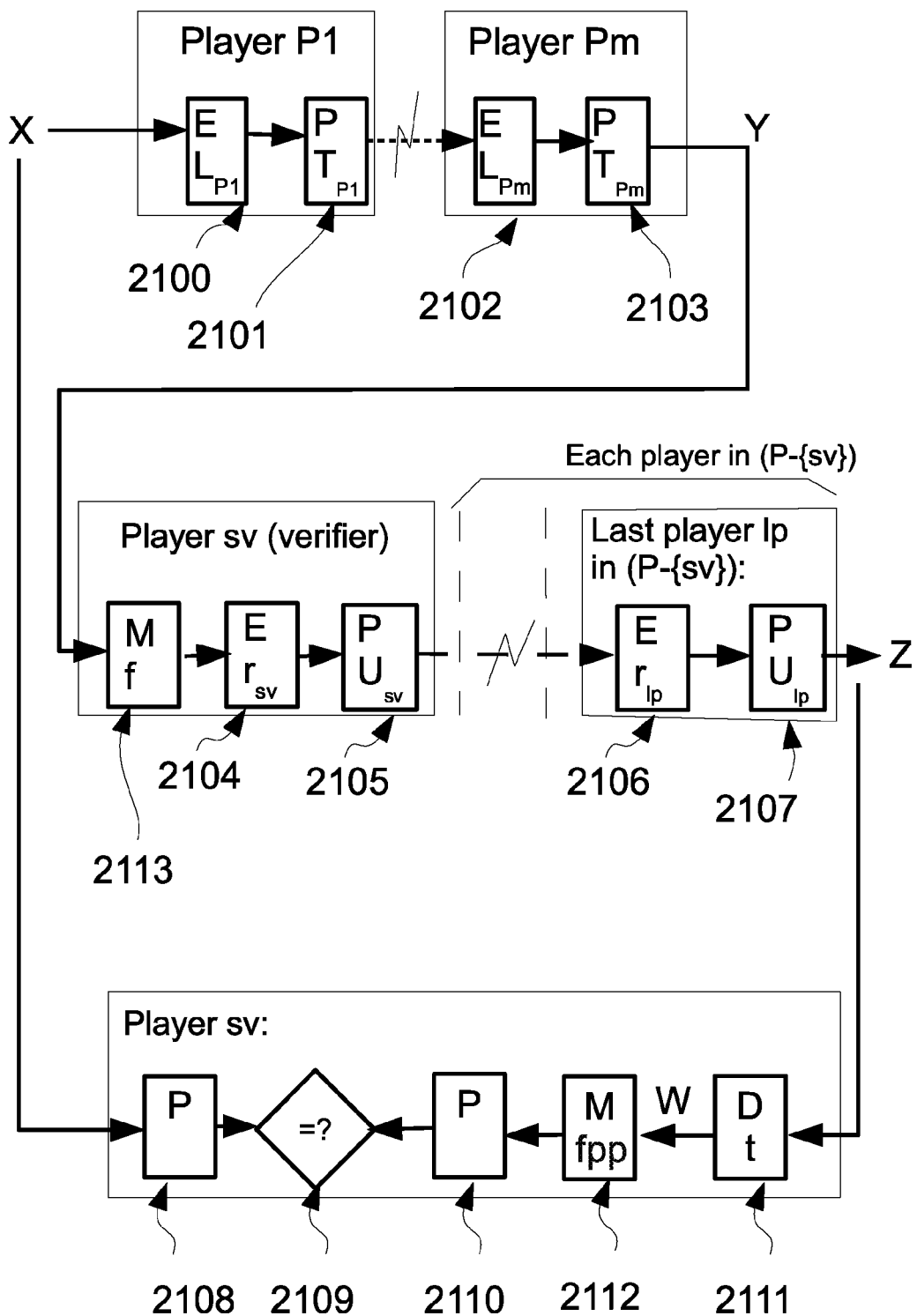
FIG. 21 illustrates an R-VRP protocol, in accordance with an embodiment.

Sub-Protocol F-ROUND (Macro)
1) if (#X>1) and (SameKey) then
1.1) Each player j in P (in parallel):
1.1.1) Compute $f_j$:=LockCard($f,L_j$)
1.1.2) Broadcast $f_j$
Protocol P-VRP-MC
1) if (#X>1) and (not SameKey) and (Permuted) then abort
2) Set PermuteOnXZ:=false
3) Set RedoXYPermutationOnZQ:=false
4) Execute CoRandomCardValue(Union(P,V), f)
5) Execute XpZ-ROUND
6) Execute F-ROUND
7) Execute P-ZQ
8) Execute CHECK-XpZ-ROUND
9) Execute CHECK-ZQ-ROUND
10) Execute P-CHECK-WQ
Protocol R-VRP Protocol R-VRP is also an extension to FI-UVP, but instead of requiring two rounds (one for challenge an another for response) it combines the two into a single challenge-response round with a single verifier per iteration. The verifier must be the first player to encrypt the cards in the challenge-response round, and each verifier must be the first many times to achieve the security threshold. With reference to FIG. 21, the R-VRP protocol is diagrammed. The diagram uses the same nomenclature as FIG. 17. The diagram shows the XY-ROUND (2100 to 2103) and a single iteration of the R-Core sub-protocol (2104 to 2113). First, during XY-ROUND, provers do private encryptions (2100,2102) along with private permutations (2101, 2103) depending on the protocol arguments.

The R-Core sub-protocol is iterated until a security threshold is achieved. In each iteration, a verifier sv is selected to be the first of the round. The R-Core sub-protocol has three stages. In the first stage, sub-protocol R-YZ-ROUND is executed, in which the verifier sv re-encrypts the card-list Y (2104) and permutes the resulting card-list according to protocol arguments (2105). Afterwards, each prover, with the exception of player sv (if is also a prover), re-encrypts (2016) and permutes (2107) the resulting card-list in a round. In the second stage, R-CHECK-YZ-ROUND is executed. During this protocol, the player sv computes the key t, using key information published by all the players. Finally, R-CHECK-WX is executed. During this protocol the card-list X is decrypted with key t (2111), and permuted according to protocol arguments (2110) to obtain W. Also X is possibly permuted (2108) and finally compared to W (2109). Cheating has occurred if the comparison fails. Operations 2112 and 2113 are skipped in this protocol.

Sub-Protocol R-FIND-Fpp
1) Set fpp:=1
2) If caller protocol is R-VRP-MC$_1$ or R-VRP-MC$_2$ then
2.1) If (fixed>0) or (not permuted) then
2.1.2) Set fpp:=X[#X]*(D$_t$(Z[#Z])$^{-1}$
2.2) else
2.2.1) Find d (1<=d<=#X) such as fpp=X[1]*(D$_t$(Z[d])$^{-1}$ and IsPermutationOf(fpp*W',X),If fpp cannot be found, then cheating has occurred.
Sub-Protocol R-CHECK-YZ-ROUND
1) Each player i in Union(P, {sv}):
1.1) Broadcasts t$_i$
2) Each player i in Union(P, {sv}):
2.1) For each player j: Verify that CHECK(t$_j$,h$_j$) is true (verifying the commitment).
3) Player sv:
3.1) Compute t:=Product(each player j, t$_j$)
3.2) Compute W':=DecryptCards(Y, t)
4) Execute R-FIND-Fpp
7) Set Wpp:=fpp*W'
8) W:=IfthenElse(SameKey,SORT(Wpp,fixed),Wpp)
Sub-Protocol R-CHECK-WX (Macro)
1) Player sv does:
1.1) Compare W to X. If not equal, then a player is cheating. To identify the cheating player, players execute a protocol where each player proves to the others that the operation "Z$_i$:=EncryptCards( ... )" done in protocol R-YZ-ROUND is correct.
Procedure YZ-TURN
1) Let r$_v$:=RandomKey( )
2) Set c$_v$:=Commit(r$_v$*L$_v$)
3) Publish c$_v$
4) Computes Z'$_{idx}$:=EncryptCards(Z$_{idx-1}$,r$_v$)
5) if (UndoXYPermutationOnXZ) then
5.1) Set U$_v$:=InversePermutation(T$_v$)
6) else
6.1) Set U$_v$:=IfThenElse(PermuteOnXZ,RandomPermutation(#X,fixed),Identity(#X))
7) Set Z$_{idx}$:=Permute(Z$_{idx}$', U$_v$)
8) Broadcast Z$_{idx}$.
Sub-Protocol R-YZ-ROUND (Macro)
1) Set Z$_0$:=Y*f
2) Set idx:=1
3) Set v:=sv
4) Call YZ-TURN
5) Set idx:=idx+1
6) Each player v in (P-{sv}), in increasing order:
6.1) Call YZ-TURN
6.2) Set idx:=idx+1
7) Let Z=Z$_{idx-1}$
Sub-Protocol R-Core
1) Set UndoXYPermutationOnXZ:=(not SameKey) and permuted
2) Set PermuteOnXZ:=permuted
3) Players Union(P,{sv}):
3.1) Set f:=1
3.2) Execute R-YZ-ROUND
3.3) Execute R-CHECK-YZ-ROUND
3.4) Execute R-CHECK-WX
Protocol R-VRP
1) Execute XY-ROUND
2) For each player sv in V:
2.1) Set fac:=1
2.2) Repeat until (fac<security-threshold)
2.2.1) Set fac:=fac*(1/#X)
2.2.2) Execute R-Core
3) else
3.1) Execute R-Core
Protocol R-VRP-MC$_1$ Protocol R-VRP-MC$_1$ is a variation of R-VRP which uses the homomorphic properties of a CGC in order to avoid the need of iterations that R-VRP requires to achieve a security threshold. With reference to FIG. 21, the P-VRP-MC$_1$ protocol is diagrammed. Before the R-YZ-ROUND protocol takes place, the player sv and the provers choose a pseudo-random card value f collaboratively. The card list X is multiplied by f (2113) before the card-list enters the R-YZ-ROUND. The factor fpp is computed by player sv and it is used to multiply the card-list in (2112). Note that it is also possible to proceed as S-VRP-MC$_2$ to obtain the fpp value, by a sub-protocol similar to F-ROUND. The remaining operations were described along with the R-VRP protocol.

Figure 22:
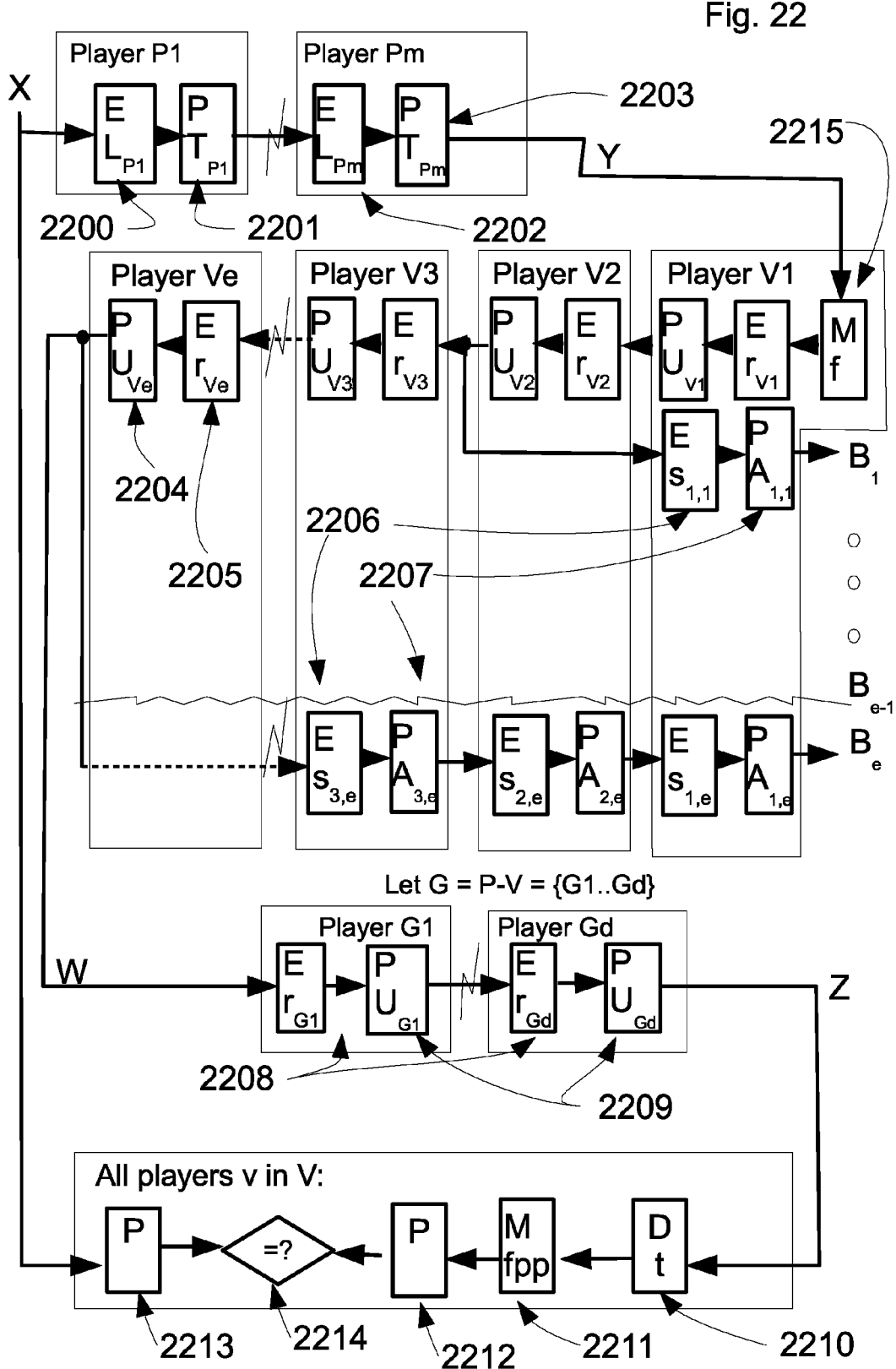
FIG. 22 illustrates an R-VRP-$MC_2$ protocol, in accordance with an embodiment.

Protocol R-Core-MC$_1$
1) if (#X>1) and (not SameKey) and (Permuted) then abort
2) Set UndoXYPermutationOnXZ:=false
3) Set PermuteOnXZ:=permuted
4) Players Union(P, {sv}):
4.1) Execute CoRandomCardValue(Union(P, {sv}),f)
4.1) Execute R-YZ-ROUND
4.2) Execute R-CHECK-YZ-ROUND
4.3) Execute R-CHECK-WX
Protocol R-VRP-MC$_1$
1) Execute XY-ROUND
2) For each player sv in V:
2.2) Execute R-Core-MC$_1$
Protocol R-VRP-MC$_2$ Protocol R-VRP-MC$_2$ is another variation of R-VRP which uses the homomorphic properties of a CGC in order to avoid the need of iterations that R-VRP requires to achieve a security threshold. With reference to FIG. 22, the R-VRP-MC$_2$ protocol is diagrammed. The diagram uses the same nomenclature as FIG. 17. The set of provers that are not verifiers is G, and the elements of G are G1 to Gd. The diagram shows the XY-ROUND (2200 to 2203) and an additional round. Before the R-YZ-ROUND-MC$_2$ protocol takes place, all the players choose a pseudo-random card value f collaboratively. The card list Y is multiplied by f (2215) before the card-list enters the R-YZ-ROUND-MC$_2$ protocol.

The sub-protocol is divided in two parts. During the first part, each verifier encrypts (2205) and permutes (2204) the card-list Y sequentially. Also, and possibly in parallel, the protocol R-VERIFY is executed one time for each verifier, in which the intermediate results of the round YZ are sent back to be re-encrypted (2206) and re-permuted (2207) by all the previous verifiers. In the R-VERIFY protocol players compute, for each intermediate card-list that is received by the player V(i+1), the card-list B. Player V(i+1) checks the correctness of B$_i$ and doing so validates the correctness of the partial encryption from Y to the point it was received to process in the operations 2205.

In the second part, all provers that are not verifiers keep encrypting (2208) and permuting (2209) the card-list, until Z is produced. Finally, all verifiers construct the key t with key information published by all the players. Each verifier computes the fpp factor using the sub-protocol R-FIND-Fpp. Note that it is also possible to proceed as S-VRP-MC$_2$ to obtain the fpp value, using a sub-protocol similar to F-ROUND. Then, R-CHECK-WX-MC$_2$ is executed. During this protocol the card-list Y is decrypted with key t (2210), multiplied by the factor fpp (2211) and permuted according to protocol arguments (2212) to obtain W. Also X is possibly permuted (2213) and finally compared to W (2214). Cheating has occurred if the comparison fails. Note that a similar protocol can be achieved exchanging the roles of X and Y, and applying a protocol similar to R-YZ-ROUND to X instead of Y. This setting, used in S-VRP and P-VRP, has the advantage that the verification round can start before the XY-ROUND is finished.

Sub-Protocol R-VERIFY (Macro)
1) $Q_{i,i+1} := Z_{idx}$
2) for j:=i downto 1 do:
 2.1) Player $v_j$ do:
  2.1.1) Set $A_{j,i}$:=IfThenElse(PermuteOnYZ,RandomPermutation(#X,fixed), Identity(#X))
  2.1.2) Set $s_{j,i}$:=RandomKey( )
  2.1.3) Set $k_{j,i}$:=$s_{j,i} * r_{vj}$
  2.1.4) Set $ck_{j,i}$:=Commit($k_{j,i}$)
  2.1.5) Publish $ck_{j,i}$
 2.2) Compute $Q_{i,j}'$:=EncryptCards($Q_{i,j+1}, s_{j,i}$)
 2.3) Set $Q_{i,j}$:=Permute($Q_{i,j}', A_{j,i}$)
 2.4) Broadcast $Q_{i,j}$.
3) Set $B_i' := Q_{i,1}$
4) for j:=1 to i do
 4.1) Player $v_j$:
  4.1.1) Publish $k_{j,i}$
5) Player $v_i$:
 5.1) For each player j<i: Verify that CHECK($k_{j,i}, ck_{j,i}$) is true (verifying the commitment).
 5.2) Compute $z_i$:=Product(1<=j<i, $k_{j,i}$)
 5.3) Compute Q':=EncryptCards(f*$\underline{Y}$, $z_i$)
 5.4) Q:=IfThenElse(PermuteOnYZ,SORT(Q',fixed),Q')
 5.5) $B_i$:=IfThenElse(PermuteOnYZ,SORT($B_i'$,fixed),$B_i'$)
 5.6) If (Q<>$B_i$) then one of the players {$v_1, \ldots, V_{i-1}$} is cheating.

Sub-Protocol R-YZ-ROUND-MC$_7$ (Macro)
1) Set $\underline{Z_0} := \underline{Y} * f$
2) Set idx:=1
3) Let $\overline{V} = \{v_1, v_2, \ldots, v_e\}$
4) For i:=1 to e do:
 4.1) Player $v_i$ does: Call YZ-TURN
 4.2) Players {$v_1, \ldots, v_i$} do: Execute R-VERIFY
 4.2) Set idx:=idx+1
5) Each player i in (P-V), in increasing order:
 5.1) Call YZ-TURN
 5.2) Set idx:=idx+1
6) Let $\underline{Z} = Z_{idx-1}$ Sub-Protocol R-CHECK-WX-MC$_2$ (Macro)
1) Every verifier does:
 1.1) Compare W to X. If not equal, then a player is cheating. To identify the cheating player, players execute a protocol where each player proves to the others that the operation "Zi:=EncryptCards( . . . )" done in protocol R-YZ-ROUND-MC$_2$ is correct.

Protocol R-VRP-MC$_2$
1) if (#X>1) and (not SameKey) and (Permuted) then abort
2) Set UndoXYPermutationOnXZ:=false
3) Set PermuteOnYZ:=permuted
4) Players Union(P,V) do:
 4.1) Execute R-YZ-ROUND-MC$_2$
 4.2) Execute R-CHECK-YZ-ROUND-MC$_2$
 4.3) Execute R-CHECK-WX Security of MPF The security of protocols that based on algebraic properties of its building blocks are difficult to prove formally [VSP06]. We won't attempt such a formalization herein. Nevertheless well analyze the protocol against the most common attacks:
1) Communication channel: Eavesdropping, Impersonation, Message Injection, Man-In-The-Middle, etc.
2) Algebraic properties of the CGC
3) Card Protocols Design
4) Verification Protocols Design Attacks on the Communication Channel MPF does not necessarily provide authenticity and privacy for the messages exchanged. MPF is therefore advantageously run over secure communication channels, such as SSL. If secret keys are used for the communication channel, and are reused in MPF, this can decrease overall security.

Attacks on the Algebraic Properties of the CGC

In this paper UniVPs are not proven secure. Nevertheless, there exists proofs for soundness, completeness and zero knowledge.

In VSM-VL, VSM-VPUM and VSM-VL-VUM protocols, attacks on the algebraic properties of the CGC are impossible due to the fact that all private computations are verified by executions to UniVP. Chosen plaintext attacks are also avoided by UniVPs.

In VSM-L-OL, the Lock1 round is not explicitly verified. Nevertheless, Lock1 is a round in which every player encrypts each card with a distinct random key, so no information can leak. MPF security assumes CPA for VSM-L-OL, so the Lock1 key cannot be recovered by an active attacker.

Attacks on the Card Protocols Design

The most common attack on a protocol design is the replay attack [PS04]. Replay attacks often require interleaved runs of the protocol. MPF prevents replay attacks in two ways:
a. Private keys for each game are randomly chosen out of each player's CS-PRNG.
b. All steps in the MPF, with the exception of UniVPs, are defined to be executed sequentially.

UniVPs can be securely parallelizable, because they withstand dishonest verifiers. The result of all operations performed by the prover is passed through a one-way hash function, and the prover never performs decryptions. Also the prover does not provide any additional computationally distinguishable information to the verifier (computational zero knowledge property), so parallel runs of the UniVPs can never be used to obtain any secret information. Also, parallel runs cannot be used to impersonate a prover and provide a valid proof of knowledge for a unknown fact, as in a man-in-the-middle attack. This is prevented by design because free card values are attached to a certain player in the Card-Holder table. Also we use of two additional protective techniques: prover watermarking and verifier Nonce watermarking. The former binds a proof to the prover identity, so it cannot be reused. The later binds all nonces sent by the verifier to its identity, and nonces source is verified by the prover before any information is given.

Example Attacks

During the design stage of MPF we identified a number of possible attacks. MPF has countermeasures for these attacks. Nevertheless, the leakage of even some bits information throw an external channel or additional exploits can make these attacks feasible. The following sections contain of attacks against MPF in general and against MPF implemented on a homomorphic cipher.

Tracking Attack

The masking key should never be used twice to encrypt a list of cards: there should a single masking round for a masking key. Suppose is Alice's turn to shuffle-mask a card list X and output a card list Y. Suppose that Mallory is the previous player on the masking round order. If Mallory knows a pair (x,y) such as $E_m(x) = y$ such as x belongs to X, and m is Alice's private masking key, then he can track the position of y in Y, revealing some information regarding the secret permutation.

Sandwich Tracking Attack Against CO-VP

If the CGC is homomorphic, Mallory can improve the tracking attack during a CO-VP protocol. He needs to collude with the player Oscar following Alice order in the round. Suppose Mallory knows a list of pairs (a[i],b[i]) $E_m$(a[i])=b[i] ($1<=i<=n/2$) (although he may know what actual card values map to). Suppose Mallory's input card-list is W. For simplicity, let's assume that Mallory's private key and permutation are the identity. Let P be Alice's permutation function. When is Mallory's turn, he chooses a set of cards w[i+k] from W ($1<=i<=k$) that he knows the card values that they map to, and he wants to track them. He outputs a card list X such as:

X=<a[1]*w[k+1], . . . , a[2]*w[k+2], a[k]*w[2*k], w[k+1], . . . , w[n]>

Then, after Alice encrypts and permutes the list X, she outputs the set:

Y={$E_m$(a[1]*w[k+1]), . . . , $E_m$(a[2]*w[k+2]), $E_m$(a[k]*w[2*k]), $E_m$(w[k+1]), . . . , $E_m$(w[n]) }=

Y={$E_m$(a[1])*$E_m$(w[k+1]), . . . ,$E_m$(a[2])*$E_m$(w[k+2]),$E_m$(a[k])*$E_m$(w[2*k]),$E_m$(w[k+1]), . . . ,$E_m$(w[n])}=

Y={b[1]*$E_m$(w[k+1]), . . . , b[2]*$E_m$(w[k+1]), b[k]*$E_m$(w[2*k]), $E_m$(w[k+1]), . . . $E_m$(w[n])}=

Now Oscar can detect Alice's permutation function for the values w[k+1], . . . ,w[2*k]. For example, to recover P[k+t] (output index of the element w[k+t]) Oscar searches for two indexes i,j such as $y[i]*y[j]^{-1}$=b[t]. Then P[k+t]=j. He can reconstruct a valid Y' to transfer to the following player in the round by replacing the terms b[t]*$E_m$(w[k+t]) with the known b[t].

Comparison with Other Mental Poker Protocols

Table 8, considered in conjunction with the following Key, compares properties of various protocols, including those of embodiments herein, and two of the prior art.

We will create:

the CGC function (E);

a protocol to create the cipher parameters from a stream of random bytes;

a protocol to create the a cipher key from a stream of random bytes;

a protocol to create a single card (Create-Deck by Locking);

a protocol to create random card values from a stream of random bytes (Create-Deck by CO-PRNGP); and ad-hoc protocols.

Note that PH is a malleable cipher, and because of this the protocol FI-UniVP becomes completely insecure, because plaintext products commute with the encryption required to build the challenge card-list. We'll describe a modified protocol to fix this problem, keeping the number of modular exponentiations low.

To be used as CGC, the external assumptions described in section 2 must hold. If we were to encrypt a single plaintext/ciphertext pair, security against COA, KPA and CPA can be obtained by relying on the difficulty of the Discrete Logarithm Problem. However, MPF reuses keys, and any statistical information regarding the distributions of ciphertexts, gained after a shuffle, can be considered a successful attack. Accordingly, PH security in MPF is guaranteed by the difficulty of the Decisional Diffie-Hellman in the polynomial samples setting, which is shown in [BDH02] to be equivalent to 4-DDH, and therefore also equivalent to DDH. The Decisional Diffie-Hellman (DDH) assumption is a computational hardness assumption. Let G be a multiplicative cyclic group of order q, with a generator g. The DDH assumption states that, given $g^a$ and $g^b$ for randomly-chosen a,b$\in Z_p$, the value $g^{ab}$ is computationally indistinguishable from a random ele-

TABLE 8

Comparison of Properties Among Protocols of the Invention and the Prior Art

| Protocol | R1 | R2 | R3 | R4 | R5 | R6 | R7 | R8 | R9 | R10 | R11 | R12 | R13 | R14 |
|---|---|---|---|---|---|---|---|---|---|---|---|---|---|---|
| VSM-VL-VUM | ✓ | ✓ | ✓ | ✓ | ✓ | ✓ | ✓ | ✓ | ✓ | ✓ | ✓ | ✓ | ✓ | ✓ |
| VSM-VL | ✓ | ✓ | ✓ | ✓ | ✓ | ✓ | ✓ | ✓ | ✓ | ✓ | ✓ | ✓ | ✓ | |
| VSM-VPUM | ✓ | ✓ | ✓ | ✓ | ✓ | ✓ | ✓ | ✓ | ✓ | ✓ | ✓ | | ✓ | |
| VSM-L-OL | ✓ | ✓ | ✓ | ✓ | ✓ | ✓ | ✓ | | ✓ | ✓ | ✓ | | | |
| KKOT90 | ✓ | ✓ | ✓ | ✓ | ✓ | ✓ | ✓ | | | | ✓ | | | |
| BS03 | ✓ | ✓ | ✓ | ✓ | ✓ | ✓ | ✓ | | | | ✓ | ✓ | ✓ | ✓ |
| CSD05 | ✓ | ✓ | ✓ | ✓ | ✓ | ✓ | ✓ | ✓ | ✓ | | ✓ | | ✓ | |
| SRA81 | ✓ | ✓ | | | ✓ | | ✓ | ✓ | | | ✓ | | | |

Key for Table 8:
R1. Uniqueness of card
R2. Uniform random distribution of cards
R3. Cheating detection with a very high probability
R4. Complete confidentiality of cards
R5. Minimal effect of coalitions
R6. Complete confidentiality of strategy
R7. Absence of trusted third party
R8. Polite Drop-out tolerance
R9. Abrupt Drop-out tolerance
R10. Real-world comparable performance
R11. Variable number of players
R12. Card transfers
R13. Protection against suicide cheaters PHMP (MPF VSM-VL with Pohlig-Hellman as CGC)

In this section we present PHMP, an implementation of PHMP that uses the Pohlig-Hellman symmetric cipher [PH78] as the underlying CGC for the MPF with the VSM-VL base protocol.

As stated before, to create a MPF protocol we must specify a CGC and ad-hoc protocols, if desired.

ment in G. Note that DDH is an assumption of many common cryptographic schemes. For example, ElGamal cryptosystem has semantic security only if DDH holds.

Definition of E

Encryption: $E_k(m)=m^k \pmod p$

Commutation: $E_k(E_q(m))=m^{qk} \pmod p = m^{kq} \pmod p = E_q(E_k(m))$

Composition: $E_k(E_q(m))=m^{qk} \pmod p = E_{k*q}(m)$

Inversion: $k^{-1}$ is such that $k*k^{-1}=1$ (mod p−1)
Where 1<m<p, and m belongs to Z.

Cipher Parameters Creation

Pohlig-Hellman cipher requires a strong prime or pseudo-prime p. We'll use a strong prime in the format p=2*q+1, where q is a big prime number. To create p from a PRNG we use the process described in the standard [FIPS186].

An integer y is called a quadratic residue or QR modulo p if it is congruent to a perfect square (mod p). Otherwise, y is called a quadratic nonresidue or QNR. Formally y is QR if there exists an integer x such that: $x^2$=y (mod p). There are two possibilities for the plaintext space, either use a Schnorr group, the subgroup of quadratic residues (where DDH assumption has been studied more) or use the set of quadratic non-residues. If the later is used, then keys must be odd. If the QR subgroup is used, then each even key e<q has an equivalent odd key e'=q+e (mod p), and every even key d>q has an equivalent odd key d'=d−q (mod p). This equivalence allows any key k<p to be used. We present both schemes.

Finding Fixed Generators

Because p=2*q+1, then p≡3 (mod 4) and then −1 is a nonresidue (mod p). This implies that the negative of a residue (mod p) is a nonresidue and the negative of a nonresidue is a residue. Also the only generator of the subgroup of order 2 is (p−1). For any p>5, then 4 is a quadratic residue because $4=2^2$ (mod p) and so 4 is generator of the QR subgroup. Then (p−4) is always a generator of (Z/pZ)*. These generators can be used to create the deck with the procedure "Create-Deck by Locking".

Card Creation

To create the cards, we have two choices:

a) Execute repeatedly the procedure for finding random generators. The random number source stream is generated with the CO-PRNG protocol "Create-Deck by CO-PRNGP".

b) Generate a single fixed generator of the group and then create the rest of the cards by executing the protocol "Create-Deck by Locking".

Using Quadratic Residue Cards: Finding a Random Generator of the QR Subgroup

We describe a procedure that can be used to create a random generator g of order q of the QR subgroup.

To generate g:

Step 1. Set g:=a random integer, where 1<g<p−1 and g differs from any value previously tried.

Step 2. If (g<=1) or (g=p−1) then Set g:=g+1 (p−1) and go to step 2.

Step 3. Set $v:=g^q$ (mod p).

Step 4. If v< >1 then Set g:=g+1 (p−1) and go to step 2.

Note that as p grows large the factor of generators g approximates ½.

Using Quadratic Residue Cards: Key Creation

To create a valid key k, find an integer value k in the range 1<k<p such as gcd(k,q)=1.

Using Quadratic Non-Residue Cards: Finding a Generator of (Z/pZ)*

We describe a procedure that can be used to create a random generator g of order 2*q. To generate g:

Step 1. Set g:=a random integer, where 1<g<p−1 and g differs from any value previously tried.

Step 2. If (g<=1) or (g=p−1) then Set g:=g+1 (p−1) and go to step 2.

Step 3. Set $v:=g^q$ (mod p).

Step 4. If v=1 then Set g:=g+1 (p−1) and go to step 2.

Using Quadratic Non-Residue Cards:Key Creation

To create a valid key k, find an integer value k in the range 1<k<p such as gcd(k,2*q)=1. Note that all valid keys are odd.

Additional Checks

We'll say that the k is an identity key if for any input card x, $y=E_k(x)=x$. It is possible, although unlikely, that an identity card key is created by composing non identity keys. If an identity key is obtained either privately or jointly, then the last protocol must be redone to create a new non-identity key. The same check can be applied for other sets of weak keys, like small keys or keys having too many zeros. Nevertheless, the probability of creating a weak key is negligible.

If a player violates the key creation protocol and chooses a key k=0 or a key k that divides q, then the following protocols will fail. Therefore, card-values equal to 1 or 0 should not be accepted by players. When using the QR subgroup, it's impossible that a QNR card will appear. Using QNR cards, the even keys and the key q will turn cards into quadratic residues. Each player should check that the input card values are all quadratic residues or all non-residues (depending on the group used). Also players can check that the input card-list have no duplicates. This is not strictly necessary, because the protocol design guarantees it. Nevertheless, these checks can prevent a failure in the protocol itself to expose players' private information.

Ad-Hoc Verification Protocols

Some UniVPs and the VRPs that come with MPF can withstand the malleability of PH cipher, so, in principle, there is no need to provide an ad-hoc protocol. Nevertheless, there are more efficient alternatives to standard non-malleable UniVPs, so PHMP uses a new protocol called HMVP, and Chaum-Pedersen and Schnorr's Id Protocol when possible. HMVP is a hybrid protocol which uses both FI-UniVP and Chaum-Pedersen Protocol to achieve its goal. Some alternatives are provided in Table 9.

TABLE 9

Alternatives for UniVPs Depending on the Type of Verification

|  | With permutation | Without permutation |
| --- | --- | --- |
| Same key | For SMVP and RSMVP:<br>Neff [N04]<br>Groth [G05]<br>FI-UniVP (for a<br>single card only)<br>NI-UniVP<br>HMVP<br>CO-VP<br>VRPs | For UVP, UMVP, and RLVP:<br>CP-UMVP (Chaum-Pedersen<br>protocol)<br>FI-UniVP (for a<br>single card only)<br>NI-UniVP<br>VRPs |
| Different keys | For SLVP:<br>FI-UniVP<br>NI-UniVP | For LVP:<br>S-LVP (one execution of the<br>Schnorr's Id Protocol<br>for each card)<br>FI-UniVP<br>NI-UniVP<br>VRPs |

We've found that the protocol CO-VP can be disrupted in sandwich attacks. Suppose there is a masking round with players Mallory, Alice and Oscar in that exact order. Mallory can, instead of doing a normal shuffle-mask operation, output a card-list using a transformation T (see below), and Oscar can recover a well-formed card list applying another T transformation. We haven't found a way to take advantage of this problem, but we recommend using the S-VRP protocols or any other UniVP instead of CO-VP for homomorphic ciphers.

Transformation T:
T(Card-List X,k,v)→Card-List Y:
  Y[i]=Product($1<=j<=N$:X[j])$^k$*(X[P[i]])$^v$
  where P is a permutation of indexes of Y, and v and k are integers ($0<=v,k<p$)

8.6.1. HMVP

The Homomorphic ShuffleMasking Verification Protocol (HMVP) provides a computational zero knowledge argument for the mix and re-encryption of a set of plaintexts (shuffle-masking), impeding the use of the homomorphic property of the cipher.

Protocol HMVP
Signature: HMVP (private in m:Key, private in T:Permutation, public in X:Card-List,
  public in Y:Card-List, public in p:Player,
  public in RX:Card-List, public in RY:Card-List)
1) The verifier:
  1.1) Chooses a random number s
  1.2) Sends s to the prover
2) The prover:
  2.1) Computes R.p=CreateBlock(H(s))
  2.2) Computes R.c=$E_m$(R.p) (R is a representative of m)
  2.3) Publishes R
3) The verifier checks that R.p and R.c are valid blocks (not marked)
4) Execute S-LVP ([m],[R.p],[R.c],p);
5) Execute FI-SMVP(m,T, X,Y,p, RX+[R.p], RY+[R.c])

8.6.2. Schnorr's Id Protocol Based LVP (S-LVP)

Here is a protocol for the verification of locking rounds based on Schnorr's Id protocol:
Let p=2*q+1 be the Poling-Hellman cipher parameters.

Protocol S-LVP
Signature: S-LVP (private in L:Key-List, public in X:Card-List,
  public in Y:Card-List, public in p:Player)
1) For each player v in increasing order, such as v< >p do
  1.1) For each i, $1<=i<=\#X$ do
    1.1.1) Execute T-S-LVP (L[i], X[i], Y[i], p, v)
Signature: T-S-LVP (public in s:Key, public in a:Card, public in b:Card,
  public in prv:Player, public in v:Player)
1) Player prv:
  1.1) Picks a random number r ($r<=q$) and computes x:=$a^r$ (mod p)
  1.2) Broadcast r
1.3) Player v:
  1.3.1) Chooses a random value e (e<p)
  1.3.2) Broadcast e
1.4) Player prv:
  1.4.1) Computes y:=r+s*e (mod p)
  1.4.2) Broadcasts y
1.5) Player v:
  1.5.1) Verifies that x=$a^y$*$b^{-e}$ (mod p)

8.6.3. Chaum-Pedersen Based UMVP (CP-UMVP)

We can use Chaum-Pedersen protocol to obtain an alternative UMVP. The protocol verifies that the encryptions have been done using the same key. The protocol requires 3 encryptions per card, similar to FI-UniVP. The number of transferred bytes is also equivalent. Here is the protocol:

Protocol CP-UMVP
Signature: CP-UMVP (private in m:Key, public in X:Card-List,
  public in Y:Card-List, public in p:Player,
  public in RX:Card-List, public in RY:Card-List)
1) For each player v in increasing order, such as v< >p do
  1.1) Execute T-CP-UMVP (m, X+RX, Y+RY, p, v)

Protocol T-CP-UMVP
Signature: T-CP-UMVP (public in m:Key, public in X:Card-List,
  public in Y:Card-List,
  public in prv:Player, public in v:Player)
1) Player prv:
  1.1) Picks a random number s (s<q).
  1.2) For each $1<=i<=\#X$, computes Q[i]:=X[i]$^s$ (mod p)
  1.3) Broadcast Q
2) Player v:
  2.1) Chooses a random value c (c<p)
  2.2) Broadcast c
3) Player prv:
  3.1) Computes r:=s+c*m (mod p)
  3.2) Broadcasts r
4) Player v:
  4.1) For each $1<=i<=\#X$, verifies that X[i]$^r$=Q[i]*Y[i]$^c$ Numeric Example This is an example of the PHMP protocol, using the base protocol VM-VL protocol. We assume there are 3 players and 4 cards in the deck. Cards are quadratic residues. Keys are even, although this is not necessarily for QR cards.

Cipher Parameters:
q=509
p=2q+1=1019 (p is a safe prime)

The fixed generator for the QR subgroup is g=3. Note that the size of p chosen is too small to provide any real security. Generally, p is at least 1024 binary digits long or around 350 decimal digits. For simplicity, we show the only action protocols, and we skip the verification sub-protocols. First all players execute the protocol "Create-Deck (Locking)" (section 3.7.2), so the following has the structure of a locking round.

Player 1:
  1. Construct X:=[g, g, g, g]=[3, 3, 3, 3] (a vector with four copies of g, one for each card)
  2. Chooses a random or pseudo-random key-List K (each key is constructed using the protocol "Key Creation".
    Let K:=[7, 123, 441, 9]Computes
    $Y_1$:=LockCards(X,K)
    $Y_1$:=[$g^{k[1]}$ (mod p), $g^{k[2]}$ (mod p), $g^{k[3]}$ (mod p), $g^{k[4]}$ (mod p)]
    $Y_1$:=[$3^7$ (mod 1019), $3^{123}$ (mod 1019), $3^{441}$ (mod 1019), $3^9$ (mod 1019)]
    $Y_1$:=[149, 778, 256, 322]
  3. Broadcasts $Y_1$ Player 2:
  Chooses a random or pseudo-random key-List K (each key is constructed using the protocol "Key Creation" (section 7.3).
  Let K:=[21, 99, 73, 901]
  4. Computes
    $Y_2$:=LockCards($Y_1$,K)
    $Y_2$:=[$Y_1[1]^{k[1]}$ (mod p), $Y_1[2]^{k[2]}$ (mod p), $Y_1[3]^{k[3]}$ (mod p), $Y_1[4]^{k[4]}$ (mod p)]
    $Y_2$:=[958,42,626,345]
  5. Broadcasts $Y_2$ Player 3:
  6. Chooses a random or pseudo-random key-List K (each key is constructed using the protocol "Key Creation" (section 7.3).
    Let K:=[701, 373, 13, 629]
  7. Now computes
    $Y_3$:=LockCards($Y_1$,K)
    $Y_3$:=[$Y_2[1]^{k[1]}$ (mod p), $Y_2[2]^{k[2]}$ (mod p), $Y_2[3]^{k[3]}$ (mod p), $Y_2[4]^{k[4]}$ (mod p)]
    $Y_3$:=[1011,731,118,380]

8. Broadcasts $Y_3$

Let Open-Deck:=$Y_3$. Now we assign a meaning to each open-card value in the deck.

Open-Deck[1]=1011 is the ace of diamonds.
Open-Deck[2]=731 is the two of spades
Open-Deck[3]=118 is the three of hearts
Open-Deck[4]=380 is the four of clubs.

Because we will only shuffle four cards, no additional card is required. Now we shuffle the deck with the protocol "Shuffle-Deck" (section 3.7.3). Previous $Y_i$ values are disposed.

Player 1:
1. Set F:=RandomPermutation(4)
   F:=[2, 3, 1, 4]
2. Set m:=RandomKey( )
   m:=445
3. Compute
   Tmp:=PermuteCards(Open-Deck,F)
   Tmp:=[731,118, 1011, 380]
4. Now $Y_1$:=MaskCards(Open-Deck, m, F)=[Tmp[1]$^{445}$ (mod p), Tmp[2]$^{445}$ (mod p), Tmp[2]$^{445}$ (mod p), Tmp[2]$^{445}$ (mod p)]
   $Y_1$:=[731$^{445}$ (mod 1019), 118$^{445}$ (mod 1019), 1011$^{445}$ (mod 1019), 380$^{445}$ (mod 1019)]
   $Y_1$:=[229,825,358,687]

Player 2:
5. Set F:=RandomPermutation(4)
   F:=[3, 4, 1, 2]
6. Set m:=RandomKey( )
   m:=299
7. Compute
   Tmp:=PermuteCards($Y_1$,F)
   Tmp:=[358, 687, 229, 825]
8. Now $Y_2$:=MaskCards($Y_1$, m, F)=[Tmp[1]$^{299}$ (mod p), Tmp[2]$^{299}$ (mod p), Tmp[2]$^{299}$ (mod p), Tmp[2]$^{299}$ (mod p)]
   $Y_2$:=[668,685,395,42]

Player 3:
9. Set F:=RandomPermutation(4)
   F:=[4, 3, 2, 1]
10. Set m:=RandomKey( )
    m:=101
11. Compute
    Tmp:=PermuteCards($Y_2$,F)
    Tmp:=[42, 395, 685, 668]
12. Now $Y_3$:=MaskCards($Y_2$, m, F)=[Tmp[1]$^{101}$ (mod p), Tmp[2]$^{101}$ (mod p), Tmp[2]$^{101}$ (mod p), Tmp[2]$^{101}$ (mod p)]
    $Y_3$:=[545,283,196,193]

Now, Main-Deck:=$Y_3$=[545,283,196,193].

We now execute the protocol Prepare-Cards-To-Deal (for VM-VL) (section 3.7.5). Because we prepare all the cards in the deck, we won't use the Prepare-Card table, but just modify the Main-Deck as we prepare the cards. We dispose previous $Y_i$ values and K values, and execute a locking round.

Player 1:
1. Chooses a random or pseudo-random key-List K (each key is constructed using the protocol "Key Creation").
   Let K:=[99, 183, 875, 571]
2. Computes
   $Y_1$:=LockCards(X,K)
   $Y_1$:=[Main-Deck$^{k[1]}$ (mod p), Main-Deck$^{k[2]}$ (mod p), Main-Deck$^{k[3]}$ (mod p), Main-Deck$^{k[4]}$ (mod p)]
   $Y_1$:=[545$^{99}$ (mod 1019), 283$^{183}$ (mod 1019), 196$^{875}$ (mod 1019), 193$^{571}$ (mod 1019)]
   $Y_1$:=[768,45,239,917]
3. Broadcasts $Y_1$ Player 2:
4. Chooses a random or pseudo-random key-List K (each key is constructed using the protocol "Key Creation").
   Let K:=[601, 47, 867, 29]
5. Computes
   $Y_2$:=LockCards($Y_1$,K)
   $Y_2$:=[$Y_1$[1]$^{k[1]}$ (mod p), $Y_1$[2]$^{k[2]}$ (mod p), $Y_1$[3]$^{k[3]}$ (mod p), $Y_1$[4]$^{k[4]}$ (mod p)]
   $Y_2$:=[168,530,55,755]
6. Broadcasts $Y_2$ Player 3:
7. Chooses a random or pseudo-random key-List K (each key is constructed using the protocol "Key Creation").
   Let K:=[107, 95, 925, 461]
8. Computes
   $Y_3$:=LockCards($Y_1$,K)
   $Y_3$:=[$Y_2$[1]$^{k[1]}$ (mod p), $Y_2$[2]$^{k[2]}$ (mod p), $Y_2$[3]$^{k[3]}$ (mod p), $Y_2$[4]$^{k[4]}$ (mod p)]
   $Y_3$:=[142,76,100,462]
9. Broadcasts $Y_3$ Now we set Main-Deck:=$Y_3$=[142,76,100,462]. All cards have been masked and locked. Now we deal the first card in the Main-Deck to player 3. We'll execute the protocol "Single-Card-Deal (for VM-L-OL, VM-VL and VM-VL-VUM)" (section 3.7.14).

Let x:=Main-Deck[1]=142.

Player 1:
1. Set $q_1$:=99*445 (mod 1018)=281 and broadcast $q_1$. ($q_1$ is the card key: the product of the key used for the first card in the locking round and the masking key)

Player 2:
1. Set $q_2$:=601*299 (mod 1018)=531 and broadcast $q_2$.

Player 3:
1. Set $q_3$:=107*101 (mod 1018)=627 and keeps $q_3$ secret.
2. Computes w:=$q_1$* ... *$q_n$. (the q values broadcast by the players)
   w:=281*531*627 (mod 1018)=79
3. Computes y:=OpenCard(x,w)=$D_w$(x). First we compute the v, the key inverse of w.
   v:=$w^{-1}$=$79^{-1}$ (mod 1018)
   v:=567
   y:=$x^v$
   y:=$142^{567}$=118
4. Now we can see that 118=Open-Deck[3] so the card dealt to player 3 is the "three of hearts". No other player knows this card, because $q_3$ was kept secret.

If we compose the three permutations we see that this is correct. These are the movements the third card (3) has done while being shuffled:

Open-Deck[3]=118 (the first third place in the open deck)
$F1^{-1}$[3]=2 (the second place after player 1 shuffles)$F_2^{-1}$[2]=4 (then the fourth place after player 2 shuffles)
$F_3^{-1}$[4]=1 (then the first place of the Main-Deck, after player 3 shuffles)

And we dealt the first card (1) of the Main-Deck, so the dealt card is the correct one.

Performance

A disadvantage of prior protocols is their poor performance for current home PCs. MPF overcomes this problem. We've analyzed an implementation of MPF and simulated other implementations and compared them against theoretical performance of other protocols as described in [CR05].

First we'll analyze the VRPs. The UniVP represents a special mode of operation of the VRP. To allow an comparison between UVP and RVP protocols, we compare n executions of an UVP against a single execution of a VRP, excluding the n*c encryptions of X into Y.

The possible operating modes are:

| Mode | Description |
| --- | --- |
| $n*(n-1)*(1\to l)$ | Repeat $n*(n-1)$ times a VRP that has a single prover an a single verifier. |
| $n*(1\to(n-1))$ | Repeat n times a VRP where each players proves the correctness to the rest. (The UVP case) |
| $n*((n-1)\to 1)$ | Repeat n times a VRP where (n − 1) players prove correctness to the remaining player. |
| $(n \to n)$ | All players are both provers and verifiers. |

The costs are given using these variables:

| Variable | Description |
| --- | --- |
| n | Number of players |
| c | Number of cards in the deck |
| s | Security threshold specified as cheating probability. |

Table 10 table summarizes the cost of each protocol.

TABLE 10

Costs of VRP protocols.

| Protocol Name | Mode | Number of Encryptions |
| --- | --- | --- |
| S-VRP | $n(n-1)*(1\to 1)$ | $\log_c(s^{-1})c4(n^2-n)$ |
| S-VRP | $n*(1\to(n-1))$ | $\log_c(s^{-1})c2n^2$ |
| S-VRP | $n*((n-1)\to 1)$ | $\log_c(s^{-1})c2n^2$ |
| S-VRP | $(n \to n)$ | $\log_c(s^{-1})c4n$ |
| S-VRP-MC$_1$ | $(n\to n)$ | $c4n$ |
| S-VRP-MC$_2$ | $(n\to n)$ | $c5n + 5n$ |
| S-VRP-MC$_3$ | $(n\to n)$ | $c4n$ |
| R-VRP | $n(n-1)*(1\to 1)$ | $\log_c(s^{-1})c3(n^2-n)$ |
| R-VRP | $n*(1\to(n-1))$ | $\log_c(s^{-1})c(3n^2-3n)$ |
| R-VRP | $n*((n-1)\to 1)$ | $\log_c(s^{-1})c(n^2+n)$ |
| R-VRP | $(n \to n)$ | $\log_c(s^{-1})c(n^2+n)$ |
| R-VRP-MC$_1$ | $(n \to n)$ | $c(n^2+n)$ |
| R-VRP-MC$_2$ | $(n \to n)$ | $c(n^2/2 + 5/2n)$ |
| P-VRP | $n(n-1)*(1\to l)$ | $\log_c(s^{-1})c4(n^2-n)$ |
| P-VRP | $n*(1\to(n-1))$ | $\log_c(s^{-1})c2n^2$ |
| P-VRP | $n*((n-1)\to 1)$ | $\log_c(s^{-1})c(3n^2-2n)$ |
| P-VRP | $(n \to n)$ | $\log_c(s^{-1})c(n^2+3n)$ |
| P-VRP-MC | $(n\to n)$ | $c(n^2+3n)+n^2$ |
| CC-VRP | $n(n-1)*(1\to 1)$ | $\log_2(s^{-1})c2(n^2-n)$ |
| CC-VRP | $n*(1\to(n-1))$ | $\log_2(s^{-1})cn^2$ |
| CC-VRP | $n*((n-1)\to 1)$ | $\log_2(s^{-1})cn^2$ |
| CC-VRP | $(n\to n)$ | $\log_2(s^{-1})c2n$ |

Our aim has been to compare the protocols on a realistic environment, which should take into account that:

the protocol is run over the Internet, and users are spread all over the world;
user computers are home PCs;
there is no hardware acceleration;
users will play several games together; and
CPU usage for the GUI during game play is 10%.

Instead of actually running the protocol on the Internet (which makes results very difficult to repeat), we used a LAN but forced restrictions on the latency of packets (simulating high round-trip time) and throughput (simulating low bandwidth). Because users send each other data, the limiting factor in bandwidth is up-stream direction and not down-stream bandwidth, which is considerably higher for an average ISP. We've tried to be conservative in numbers not to over-estimate performance. We simulated a simple poker-like game where cards are dealt and afterwards there is a showdown. During game play we used the free CPU time to pre-compute the following shuffles. Processors were not left idle, either they were computing or sending/receiving data, and not both at the same time. Verification protocols were run in parallel, so as to maximize CPU use. Amortized game time represents the time users waited for a new game to begin, after the first game had been completed, which took into account pre-calculation. Values are presented in Table 10.

TABLE 10

Table Simulation Scenario

| | |
| --- | --- |
| Computer type | 1.8 Mhz CPU, single core. |
| Number of users | 10 |
| Number of cards in the deck | 52 |
| Number of games to play | 10 |
| Average game time (not including protocol computation time) | 40 seconds (*) |
| Time of 1024-bit modular exponentiation | 1.5 ms (using GMP) |
| Time of 1024-bit modular multiplication | 87 uS |
| Security threshold for interactive protocols | $2^{-20}$ |
| Security threshold for non-interactive proofs | $2^{-80}$ |
| Cards dealt to each player | 5 |
| Internet round-trip time | 150 ms |
| Up-stream bandwidth | 20 Kb/sec |
| Multiplication time on an Elliptic Curve over the Z/pZ finite field with a 160-bit prime. | 1.5 ms |

(*) This is an average online poker game time, according to Wikipedia.

For classical cryptography we use a 1024 modulus, which provides adequate security for current communications as stated [NIST800-57]. For Elliptic Curve Cryptography (ECC) we use a 160-bit modulus and assume multiplication performance comparable to Z/pZ modular exponentiation. It may be a matter of discussion which method is faster for 1024 bit finite fields (ECC Diffie-Hellman vs. Diffie-Hellman). It is widely agreed that ECC performance is superior when p becomes larger, such as 2048 bits, but here we limit our analysis to 1024 bit modulus. It should be noted that we assume the figures given in [CR05] also take into account full CPU utilization due to parallelization. Also all protocols assume computers have access to a broadcast medium or there is central server with unlimited input and output bandwidth which broadcasts received messages to all the remaining players, but bandwidth will still be limited by senders and receivers. We also assume the broadcasting server can also send private messages, without consuming the remaining players' bandwidth. We have not taken into account Internet round-trip time and the performance penalty (overhead) in sending and receiving a message due to the difficulty of calculating how the other protocols can benefit from parallelization. For example, Cre86 protocol sends large amounts of tiny messages and so its protocol time may be greater than the value shown by the fact that message overhead is not accounted for. In the following table we've not included the use of VRPs, which would increase the protocols performance considerably. Table 11 summarizes the results of the comparison.

TABLE 11

Comparison of Protocol Times

| Operation | MPF over ECC base VSM-VL using CO-VP | MPF over ECC base VSM-VL using HMVP | MPF over PH base VSM-VL using CO-VP | MPF over PH base VSM-VL using HMVP | KKOT90 | BS03 | Cre86 | CSD04b |
|---|---|---|---|---|---|---|---|---|
| Shuffle Time | 14.61 s | 27.31 s | 36.26 s | 57.97 s | 333.80 s | 273.39 s | 415.54 s | 102.29 s |
| All cards draw time (5 cards for each player) | 0.17 s | 0.17 s | 0.43 s | 0.43 s | 21.00 s | 35.94 s | 17.28 s | 46.29 s |
| All cards show time (showdown) | 0.12 s | 0.12 s | 0.39 s | 0.39 s | 0.78 s | 46.30 s | 0.08 s | 46.30 s |
| Total processing time for first game | 14.90 s | 27.60 s | 37.08 s | 58.79 s | 355.58 s | 355.63 s | 432.89 s | 194.88 s |
| Amortized processing time per game | 1.60 s | 2.87 s | 4.06 s | 22.79 s | 319.58 s | 319.63 s | 396.89 s | 158.88 s |

In table 11 we compare the best VRPs against FI-UniVP for two different scenarios:

TABLE 11

Comparison of FI-UniVP and VRPs for two different scenarios

| Protocol Name | Mode | Encryptions | Scenario 1, encryptions (n = 10) | Scenario 1 Shuffle Time (*) | Scenario 2, encryptions (n = 2) |
|---|---|---|---|---|---|
| FI-UniVP | $n(n-1)*(1\to 1)$ | $c4(n^2 - n)$ | 18720 | 2.808 s | 416 |
| S-VRP-MC1 | $(n\to n)$ | $c4n$ | 2080 | 0.312 s | 416 |
| S-VRP-MC2 | $(n\to n)$ | $c5n + 5n$ | 2650 | 0.3975 s | 530 |
| S-VRP-MC3 | $(n\to n)$ | $c4n$ | 2080 | 0.312 s | 416 |
| R-VRP-MC1 | $(n\to n)$ | $c(n^2 + n)$ | 5720 | 0.858 s | 1040 |
| R-VRP-MC2 | $(n\to n)$ | $c(n^2/2 + 5n/2)$ | 3900 | 0.585 s | 364 |
| CC-VRP | $(n\to n)$ | $\log_2(s^{-1})c2n$ | 20800 | 3.12 s | 4160 |

Computer System

Figure 16:
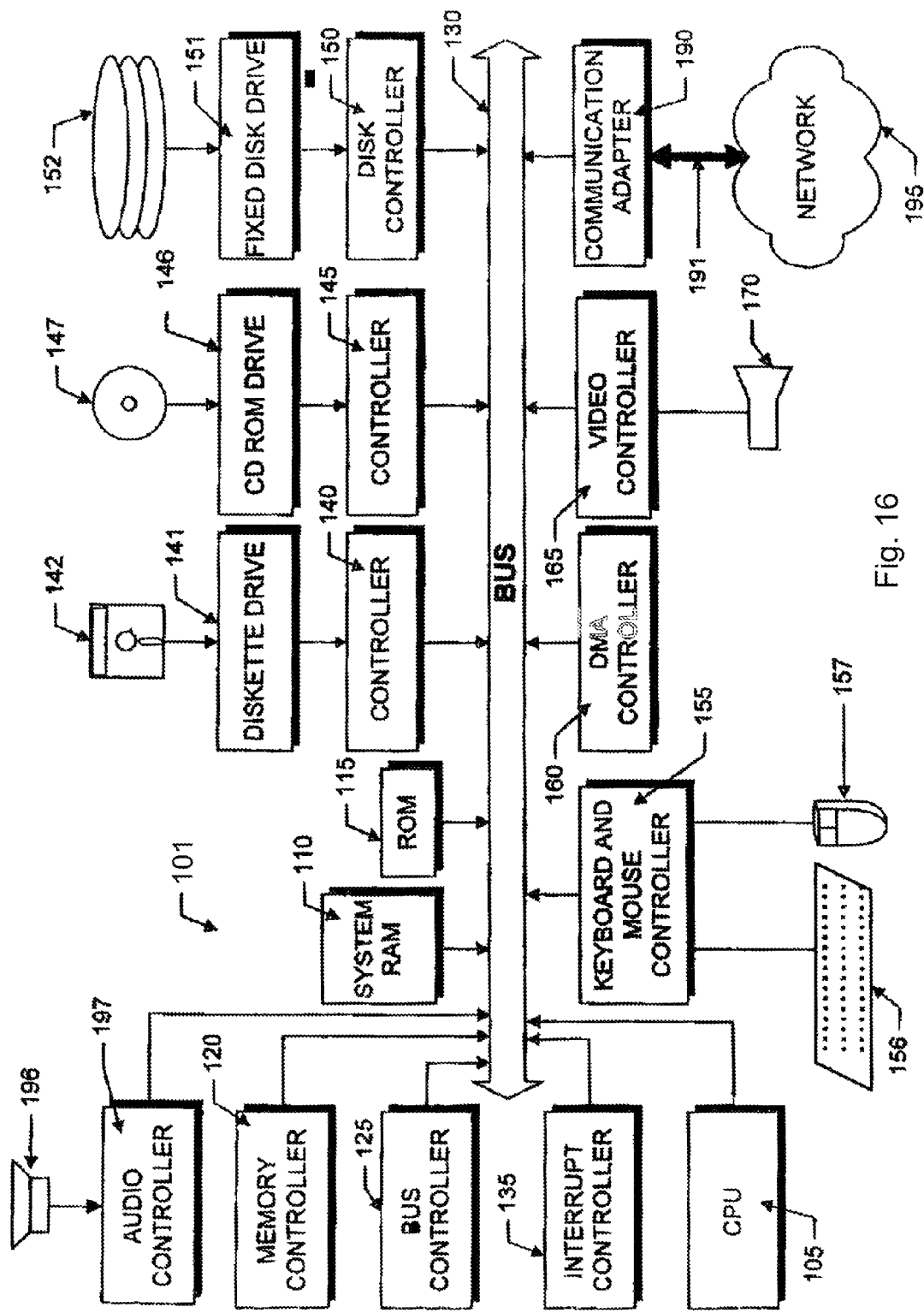
FIG. 16 depicts a computing system upon which an embodiment may be implemented.

FIG. 16 illustrates the system architecture for a computer system 100 such as a server, work station or other processor on which an embodiment may be implemented. The exemplary computer system of FIG. 16 is for descriptive purposes only. Although the description may refer to terms commonly used in describing particular computer systems, the description and concepts equally apply to other systems, including systems having architectures dissimilar to FIG. 16.

Computer system 101 includes at least one central processing unit (CPU) 105, or server, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD or DVD ROM 147, flash or rotating hard disk drive 152. Data and software, including software 400 of embodiments herein, may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150. It should be understood that other storage, peripheral, and computer processing means may be developed in the future, which may advantageously be used with an embodiment.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tablet, Personal Digital Assistant (PDA), mobile/cellular phone and other devices, may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 105 coordinates the operation of the other elements of computer system 100. The present disclosure may be implemented with any number of commercially available operating systems.

One or more applications, such as an HTML page server, or a commercially available communication application, may execute under the control of the operating system, operable to convey information to a user.

SUMMARY

The disclosure presents a new framework and creates secure mental poker protocols. The framework addresses theoretical and practical issues, such as security, performance, drop-out tolerance, and has a modular design. We've also built PHMP and ECMP protocols derived from MPF. The performance of PHMP and ECMP were analyzed theoretically and PHMP was then implemented and tested successfully. PHMP/ECMP provides acceptable performance for real life card games. In the design of MPF, the following attributes, at least, contribute to improved performance: the use of the CUOC property, the use of double encryptions per player (masking/locking), the VRPs and FI-UniVP protocols, and the abrupt drop out recovery protocol.

It will be appreciated by persons skilled in the art that the present disclosure is not limited to what has been particularly shown and described herein above. A variety of modifications and variations are possible in light of the above teachings without departing from the scope and spirit of embodiments herein.

All references cited herein are expressly incorporated by reference in their entirety. In addition, unless mention was made above to the contrary, it should be noted that all of the accompanying drawings are not to scale. There are many different features to the present disclosure and it is contemplated that these features may be used together or separately. Thus, embodiments herein should not be limited to any particular combination of features or to a particular application. Further, it should be understood that variations and modifications within the spirit and scope of embodiments herein might occur to those skilled in the art to which the disclosure herein pertains. Accordingly, all expedient modifications readily attainable by one versed in the art from the disclosure set forth herein that are within the scope and spirit of the present disclosure are to be included as further embodiments.

What is claimed is:

1. A method for enabling a plurality of parties to create, hide, and reveal tokenized information over a network among parties, comprising:
    using at least one computer executing software stored on non-volatile media, the software configured for:
        implementing a private key commutative group cipher (CGC), wherein said CGC is secure against ciphertext-only attack (COA) and secure against known plaintext attacks (KPA), and that is deterministic, and wherein encryption operations commute, decryption and encryption are equivalent operations, and where for every two composed encryptions with two keys there exists a single equivalent encryption with a single key; and
        implementing a first subprotocol operative upon the CGC to enable a sending party to securely reveal information associated with a token by sending a unique key pertaining to a revealed token to a receiving party whereby the receiving party is enabled to decrypt the token without revealing information regarding other tokens of the first party during or after a lifetime of the subprotocol, the subprotocol further operative to not require the sending or receiving party to reveal other tokens after the lifetime of the subprotocol.

2. The method of claim 1, further including a second protocol configured to render said first protocol tolerant of abrupt drop-out of other parties, wherein:
    each non-dropping party creates their own recovery set of tokens by shuffle-masking the unencrypted original deck;
    each non-dropping party vetoes the tokens in their possession from their own recovery set of tokens by providing a proof, leaving a set of un-vetoed tokens;
    at least two sets of un-vetoed tokens are shuffle-masked by other parties generating new sets of un-vetoed tokens;
    at least two sets of un-vetoed tokens are intersected generating a new set of un-vetoed tokens;
    a new deck is built using one of the sets of un-vetoed tokens.

3. The method of claim 1, wherein said CGC includes algorithms to block plaintext attacks (CPA).

4. The method of claim 1, wherein said CGC provides historical security.

5. The method of claim 1, wherein said CGC is non-malleable, with the exception of malleability imposed by commutativity.

6. The method of claim 1, wherein computational uniqueness of open cards (CUOC) is achieved by a sub-protocol in an initial stage, and computational uniqueness invariant (CUI) is guaranteed by verification sub-protocols at one or more subsequent stages.

7. The method of claim 1, whereby said tokenized information is representative of playing cards, and wherein the parties are engaged in a Mental Poker protocol enabling a property selected from the group consisting of: uniqueness of cards, uniform random distribution of cards, cheating detection with a very high probability, complete confidentiality of cards, minimal effect of coalitions, complete confidentiality of strategy, absence of a requirement for a trusted third party (TTP), polite drop-out tolerance, abrupt drop-out tolerance.

8. The method of claim 1, wherein tokenized information is representative of playing cards organized into one or more decks, and can be used as a Mental Poker protocol.

9. The method of claim 1, further including protocols to support a deck having indistinguishable duplicated cards, the protocol configured to:
    create an unencrypted deck for each subset of the tokens that represent the same value;
    enabling allowing parties to prove ownership of duplicated tokens by re-encrypting with a single key and shuffling the deck of tokens representing the same value to form a value deck;
    proving the correctness of the shuffle and re-encrypting operation to the remaining parties; and
    proving the possession of a key that encrypts the possessed duplicated token to one of the tokens in the value deck which corresponds to the same value of the token having possession proven.

10. The method of claim 1, wherein said method is encoded on a computer readable non-transitory storage medium readable by a processing circuit operative to execute said CGC and sub-protocols.

11. The method of claim 1, wherein said CGC preserves the size of the plaintext in ciphertext.

12. The method of claim 1, wherein said sharing of tokenized information is associated with a playing card game including wagering for money.

13. The method of claim 1, wherein a protocol is selected from the group consisting of VSM-L-OL, VSM-VL, VSM-VPUM, and VSM-VL-VUM.

14. The method of claim 1, wherein said CGC includes a cipher selected from the group consisting of: Pohlig-Hellman symmetric cipher, Pohlig-Hellman analogs, Massey-Omura, Pohlig-Hellman symmetric cipher analog on elliptic curves, RSA and RSA analogs, Exponentiation over any Galois field where DDH assumption holds.

15. The method of claim 1, wherein said at least one sub-protocol includes a sub-protocol selected from the group consisting of: locking verification protocol, shuffle-masking verification protocol, undo verification protocol, re-locking protocol, re-shuffle-masking verification protocol, shuffle-locking verification protocol, and unmasking verification protocol.

16. The method of claim 1, wherein said at least one protocol includes a round selected from the group consisting of shuffle-masking round and locking round.

17. The method of claim 1, wherein each party performs masking and locking operations.

18. The method of claim 1, wherein said sub-protocols include at least one protocol selected from the group consisting of: CO-VP, FI-UniVP, CC-VRP, S-VRP, S-VRP-IC, S-VRP-MC1, S-VRP-MC2, S-VRP-MC3, P-VRP, P-VRP-MC, R-VRP, R-VRP-MC1, and R-VRP-MC2.

19. The method of claim 1, further including implementing a shuffle-masking round followed by a locking round.

20. The method of claim 1, wherein said plurality of sub-protocols includes a sub-protocol that enables a subset of verifying parties to verify one or more encryption or permutation operations performed by proving parties are correct, under a protocol which is not based on a cut-and-choose technique.

21. The method of claim 1, wherein said plurality of sub-protocols includes a sub-protocol that enables the storage of digital representations in digital decks, keeping tokenized information associated with digital representations of the deck hidden, and allowing any party to shuffle a digital deck.

22. The method of claim 1, wherein said plurality of sub-protocols do not require a trusted third party (TTP).

23. The method of claim 1, wherein said plurality of sub-protocols includes a protocol to transfer tokenized information from one party to another with the consent of other parties, without revealing which tokenized information has been transferred.

24. The method of claim 1, wherein said plurality of sub-protocols includes a protocol to reshuffle a deck of tokenized information.

25. The method of claim 1, wherein said plurality of sub-protocols includes a protocol to return tokenized information to a deck of tokenized information.

26. The method of claim 1, wherein said plurality of sub-protocols includes one or more protocols to generate and transfer tokenized information representative of indistinguishable duplicated cards.

27. The method of claim 1, wherein said plurality of sub-protocols includes a protocol operative to provide protection against suicide cheating.

28. The method of claim 1, wherein message transfers are performed according to a DMPF protocol wherein when a token is to be transferred from the sending party to one or more receiving parties, the sending party re-encrypts every token in use with a new private masking key in a masking operation, including each deck of tokens that contains the list of unencrypted tokens for equal represented values in value decks, and each shuffled deck in use is re-shuffled at the same time the masking operation is performed, and each masking and shuffling operation is proven for correctness by the sending party and verified by all the receiving parties, and then the new private key that decrypts the transferred token into a token in one of the value decks is sent privately to the receiving parties.

29. The method of claim 1, further including a shuffling sub-protocol, wherein:
sending and receiving parties are enabled to shuffle a deck of tokens, wherein each party must encrypt and shuffle the tokens on the deck with a single private masking key, replacing the previous tokens in turns, in order to build a shuffle-masked deck; and
sending and receiving letting parties are enabled to prepare all or a subset of tokens to be delivered to parties by copying those tokens to form a prepared deck, wherein each preparing party must re-encrypt this prepared deck using a different private locking key for each token, replacing the previous tokens on the prepared deck in turns in a locking stage, thereby building a prepared deck that is masked, shuffled and at least one time locked.

30. The method of claim 1, wherein the software is further includes a protocol to:
shuffle a deck of the tokens, implementing a shuffle-masking round followed by two locking rounds before tokens of the deck are delivered, wherein if the two locking round are not immediately proven to be correct, the shuffle-masking round consist of the shuffle and re-encryption of a list of tokens, replacing them in turns, where each party uses a single private masking key, and letting parties prepare all or a subset of tokens to be delivered to parties, by copying a subset of the masked deck into a prepared deck; and then forcing each party to re-encrypt the prepared deck with a different private locking key for each token, replacing the previous tokens on the prepared deck in turns in the locking stage, after which parties repeat this locking stage again over the prepared deck using another set of locking keys, in order to build a prepared deck that is masked, shuffled and locked twice, and so this prepared deck is ready to be used to deliver the tokens to parties, and allowing the remaining unprepared deck to undergo the locking stages at any time afterward if more tokens are required to be prepared in order to be delivered to parties.

31. A method for enabling a plurality of parties to share message information in a playing card game context, over a network, comprising:
using at least one computer executing software stored on non-volatile media, the software configured for:
using a commutative group cipher (CGC), wherein the underlying CGC resists ciphertext-only attack (COA), resists known plaintext attacks (KPA), and is deterministic, and wherein said plurality of protocols do not require a trusted third party (TTP) by a protocol in which sharing takes place in real-time, among two or more participants, and where a first participant may not improve a position of a second participant by violating a sharing rule, without a real-time detection of said violation, and wherein the protocol uses a locking-Round.

32. A method for enabling a plurality of parties to share message information in a rule based context, over a network, comprising:
   using at least one computer executing software stored on non-volatile media, the software configured for:
   a plurality of protocols collectively defining a commutative group cipher (CGC), wherein the underlying CGC resists against ciphertext-only attack (COA), resists against known plaintext attacks (KPA), and is deterministic, and wherein said plurality of protocols do not require a trusted third party (TTP);
   wherein a protocol is selected from the group consisting of VSM-L-OL, VSM-VL, VSM-VPUM, and VSM-VL-VUM, wherein the letters V, 0, SM, P, and UM represent, respectively, Verified, Locking Round, Open, Shuffle-Masking Round, Partial, and Unmasking Round.

33. A method for enabling a plurality of parties to securely create, transfer, and reveal tokenized information over a network, comprising:
   using at least one computer executing software stored on non-volatile media, the software configured for:
   providing a commutative group cipher (CGC), wherein said CGC includes algorithms to defend against ciphertext-only attack (COA) and includes algorithms to defend against known plaintext attacks (KPA);
   providing a plurality of sub-protocols useful to a Mental Poker protocol; and
   providing a sub-protocol to securely provide abrupt drop-out tolerance.

34. A method for enabling a plurality of parties to securely create, transfer, and reveal tokenized information over a network, comprising:
   using at least one computer executing software stored on non-volatile media, the software configured for:
   using a commutative group cipher (CGC) that is a private key encryptor, where encryption operations commute, and where decryption and encryption are equivalent operations, and where for every two composed encryptions with two keys, there exists a single equivalent encryption with a single key, and where the encryptor resists ciphertext-only attack (COA), and resists known plaintext attacks (KPA), in accordance with the formula: for all $x \in X$, and any $k \in K$, $D_k(x) = E_j(x)$ for $j = k^{-1}$;
   providing a plurality of sub-protocols collectively defining a Mental Poker protocol; and
   providing at least one sub-protocol from the group consisting of: secure abrupt drop-out tolerance protocol, secure transfer of hidden tokenized information between parties protocol.

35. A method for enabling a plurality of parties to create, hide, and reveal tokenized information over a network among parties, comprising:
   using at least one computer executing software stored on non-volatile media, the software configured for:
   implementing a commutative group cipher (CGC) that is deterministic, and wherein decryption and encryption are equivalent operations;
   implementing a plurality of sub-protocols wherein said sub-protocols include at least one protocol selected from the group consisting of: CO-VP, FI-UniVP, CC-VRP, S-VRP, S-VRP-IC, S-VRP-MC1, S-VRP-MC2, S-VRP-MC3, P-VRP, P-VRP-MC, R-VRP, R-VRP-MC1, and R-VRP-MC2.

* * * * *